US009384349B2

(12) United States Patent
Kapoor et al.

(10) Patent No.: US 9,384,349 B2
(45) Date of Patent: Jul. 5, 2016

(54) NEGATIVE LIGHT-WEIGHT RULES

(75) Inventors: Aditya Kapoor, Beaverton, OR (US); Guy Roberts, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 550 days.

(21) Appl. No.: 13/476,869

(22) Filed: May 21, 2012

(65) Prior Publication Data
US 2013/0312098 A1 Nov. 21, 2013

(51) Int. Cl.
*G06F 21/00* (2013.01)
*G06F 21/56* (2013.01)
*G06F 21/55* (2013.01)

(52) U.S. Cl.
CPC .............. *G06F 21/56* (2013.01); *G06F 21/554* (2013.01)

(58) Field of Classification Search
None
See application file for complete search history.

(56) References Cited

U.S. PATENT DOCUMENTS

| | | | | | |
|---|---|---|---|---|---|
| 5,448,045 | A * | 9/1995 | Clark | .......................... | 235/382 |
| 5,696,822 | A * | 12/1997 | Nachenberg | .......... | G06F 21/566 380/1 |
| 5,854,916 | A * | 12/1998 | Nachenberg | .......... | G06F 21/564 703/21 |
| 6,742,124 | B1 * | 5/2004 | Kilpatrick et al. | ............... | 726/23 |
| 6,973,577 | B1 * | 12/2005 | Kouznetsov | .................... | 726/25 |
| 7,150,045 | B2 * | 12/2006 | Koelle et al. | .................... | 726/26 |
| 7,162,741 | B2 * | 1/2007 | Eskin et al. | ....................... | 726/25 |
| 7,281,268 | B2 * | 10/2007 | Hollander et al. | .............. | 726/22 |
| 7,290,282 | B1 * | 10/2007 | Renert et al. | .......... | G06F 21/562 726/22 |
| 7,594,271 | B2 * | 9/2009 | Zhuk et al. | ...................... | 726/24 |
| 7,694,150 | B1 * | 4/2010 | Kirby | ........................... | 713/188 |
| 7,979,889 | B2 * | 7/2011 | Gladstone et al. | ................ | 726/1 |
| 8,006,305 | B2 * | 8/2011 | Aziz | ............................... | 726/24 |
| 8,595,170 | B2 * | 11/2013 | Gladstone et al. | ............. | 706/47 |
| 8,677,493 | B2 * | 3/2014 | Singh et al. | ...................... | 726/24 |
| 9,165,142 | B1 * | 10/2015 | Sanders | ................ | G06F 21/566 |
| 2002/0162015 | A1 * | 10/2002 | Tang | .................. | G06F 21/565 726/24 |
| 2005/0138427 | A1 * | 6/2005 | Cromer et al. | ................ | 713/201 |
| 2006/0230454 | A1 * | 10/2006 | Achanta et al. | .................. | 726/24 |
| 2007/0107052 | A1 * | 5/2007 | Cangini et al. | .................. | 726/22 |
| 2009/0044274 | A1 * | 2/2009 | Budko et al. | .................... | 726/24 |
| 2010/0313271 | A1 * | 12/2010 | Johnson | ................. | G06F 21/79 726/24 |
| 2011/0047618 | A1 * | 2/2011 | Evans | ................... | G06F 21/566 726/23 |
| 2011/0265181 | A1 * | 10/2011 | Jiang | ............................... | 726/22 |
| 2012/0072987 | A1 * | 3/2012 | Koelle et al. | ................... | 726/23 |
| 2012/0144488 | A1 * | 6/2012 | Sankruthi | ....................... | 726/24 |

* cited by examiner

*Primary Examiner* — Peter Poltorak
(74) *Attorney, Agent, or Firm* — Baker Botts L.L.P.

(57) ABSTRACT

A method for securing an electronic device includes, at a level below all of the operating systems of an electronic device, trapping a first attempt and second attempt to access sensitive system resources of the electronic device. The method also includes identifying the first attempt and second attempt as representing a potential malware attack, comparing the sequence of the first attempt and second attempt against a first anti-malware rule, and, based on the comparison of the sequence of the first attempt and second attempt against the first anti-malware rule, allowing the second attempt. The first attempt and second attempt originate from code of the same operating entity. The first anti-malware rule includes a requirement of a sequence of attempts including the first attempt followed by the second attempt.

16 Claims, 15 Drawing Sheets

PROCESSOR RESOURCE CONTROL STRUCTURE

| TRIGGER FLAG | RESOURCE | TYPE | TRIGGER TYPE | WHEN TO TRIGGER | EXECUTION STAGE TO TRIGGER |
|---|---|---|---|---|---|
| ON \| ~~OFF~~ | DATA REGISTER | REGISTER | SYNCHRONOUS / ~~ASYNCHRONOUS~~ | WHEN WRITTEN TO | BEFORE INSTRUCTION FETCH |
| ON \| ~~OFF~~ | CONTROL REGISTER | REGISTER | SYNCHRONOUS / ~~ASYNCHRONOUS~~ | WHEN VALUE XXX IS WRITTEN | AFTER INSTRUCTION FETCH |
| ON \| ~~OFF~~ | JMP | INSTRUCTION | SYNCHRONOUS / ~~ASYNCHRONOUS~~ | WHEN JMP IS EXECUTED | AFTER EXECUTE |
| ON \| ~~OFF~~ | TLB | CACHE | SYNCHRONOUS / ~~ASYNCHRONOUS~~ | WHEN CACHE IS INVALIDATED | AFTER ACCESS MEMORY |
| ON \| ~~OFF~~ | LOGICAL CORE$_N$ | PROCESSOR | SYNCHRONOUS / ~~ASYNCHRONOUS~~ | WHEN CORE IS IDLE | N/A |
| ON \| ~~OFF~~ | TSC | COUNTER | SYNCHRONOUS / ~~ASYNCHRONOUS~~ | WHEN READ | AFTER WRITE BACK |
| ON \| ~~OFF~~ | ZZZ MEMORY ADDRESS | PHYSICAL MEMORY ADDRESS | SYNCHRONOUS / ~~ASYNCHRONOUS~~ | WHEN READ | AFTER EXECUTE |
| ~~ON~~ \| OFF | YYY MEMORY ADDRESS | VIRTUAL MEMORY ADDRESS | ~~SYNCHRONOUS~~ / ASYNCHRONOUS | WHEN EXECUTED | AFTER EXECUTE |
| ~~ON~~ \| OFF | INTERRUPT-SLEEP | INTERRUPT | ASYNCHRONOUS | BEFORE SENT | N/A |
| ... | | | | | |

FIG. 10

NEGATIVE LIGHT-WEIGHT RULES

TECHNICAL FIELD

The present invention relates generally to computer security and malware protection and, more particularly, anti-malware light-weight rules for preventing false positive identification.

BACKGROUND

Native operating system services can prevent security software from installing arbitrary hooking within the kernel of operating systems. Security software is thus prevented from filtering all behaviors of an electronic device, including potentially malicious actions by malware. Malware may include, but is not limited to, spyware, rootkits, password stealers, sources of spam, sources of phishing attacks, sources of denial-of-service-attacks, viruses, loggers, Trojans, adware, or any other digital content that produces malicious activity.

An operating system's filtering functionality may be limited, and may only available on timelines decided by the operating system vendor. Malware can operate and reside at the same level as security software, particularly in the operating system kernel and thus compromise both the operating system and the integrity of the security software itself.

Many forms of aggressive kernel mode malware tamper with user mode memory to accomplish malicious tasks such as injecting malicious code dynamically, modifying user mode code sections to alter execution paths and redirect into malicious code, and modify user mode data structures to defeat security software. Additionally, some malware may attack anti-malware applications and processes from the kernel by tampering with process memory code and data sections to deceive the detection logic.

Kernel mode rootkits and other malware employ various methods to hide their presence from user mode applications and kernel mode device drivers. The techniques used may vary depending upon where the infection takes place. For example, malware attacking the kernel active process list of an operating system to delist or unlink a rootkit or other malware process. Other malware may tamper with the code sections of process access and enumeration functions.

SUMMARY

In one embodiment, a method for securing an electronic device includes, at a level below all of the operating systems of an electronic device, trapping a first attempt and second attempt to access sensitive system resources of the electronic device. The method also includes identifying the first attempt and second attempt as representing a potential malware attack on the electronic device, comparing the sequence of the first attempt and second attempt against a first anti-malware rule, and, based on the comparison of the sequence of the first attempt and second attempt against the first anti-malware rule, allowing the second attempt. The first attempt and second attempt originates from code of the same operating entity. The first anti-malware rule includes a requirement of a sequence of attempts including the first attempt followed by the second attempt.

In another embodiment, a system for securing an electronic device includes a memory, a processor, a plurality of sensitive system resources, and one or more security agents. The security agents include instructions resident in the memory and operable for execution by the processor. One of the security agents is configured to trap, at a level below all of the operating systems of the electronic device, a first attempt and a second attempt to access one of the sensitive system resources. Further, one of the security agents is configured to identify the first attempt and second attempt as representing a potential malware attack on the electronic device, compare the sequence of the first attempt and second attempt against a first anti-malware rule, and, based on the comparison of the sequence of the first attempt and second attempt against the first anti-malware rule, allow the second attempt. The first attempt and second attempt originate from code of the same operating entity. The first anti-malware rule includes a requirement of a sequence of attempts including the first attempt followed by the second attempt.

In yet another embodiment, an article of manufacture includes a computer readable medium and computer-executable instructions carried on the computer readable medium. The instructions readable by a processor. The instructions, when executed, cause the processor to trap, at a level below all of the operating systems of an electronic device, a first attempt and a second attempt to access one of a plurality of sensitive system resources of the electronic device. The processor is further caused to identify the first attempt and second attempt as representing a potential malware attack on the electronic device, identify the second attempt as representing a potential malware attack on the electronic device, compare the sequence of the first attempt and second attempt against a first anti-malware rule, and, based on the comparison of the sequence of the first attempt and second attempt against the first anti-malware rule, allow the second attempt. The first attempt and second attempt originate from code of the same operating entity. The first anti-malware rule includes a requirement of a sequence of attempts including the first attempt followed by the second attempt.

BRIEF DESCRIPTION OF THE DRAWINGS

For a more complete understanding of the present invention, and the advantages thereof, reference is now made to the following written description taken in conjunction with the accompanying drawings, in which:

FIG. 10 is an example embodiment of a processor resource control structure;

DETAILED DESCRIPTION OF THE INVENTION

Figure 1:
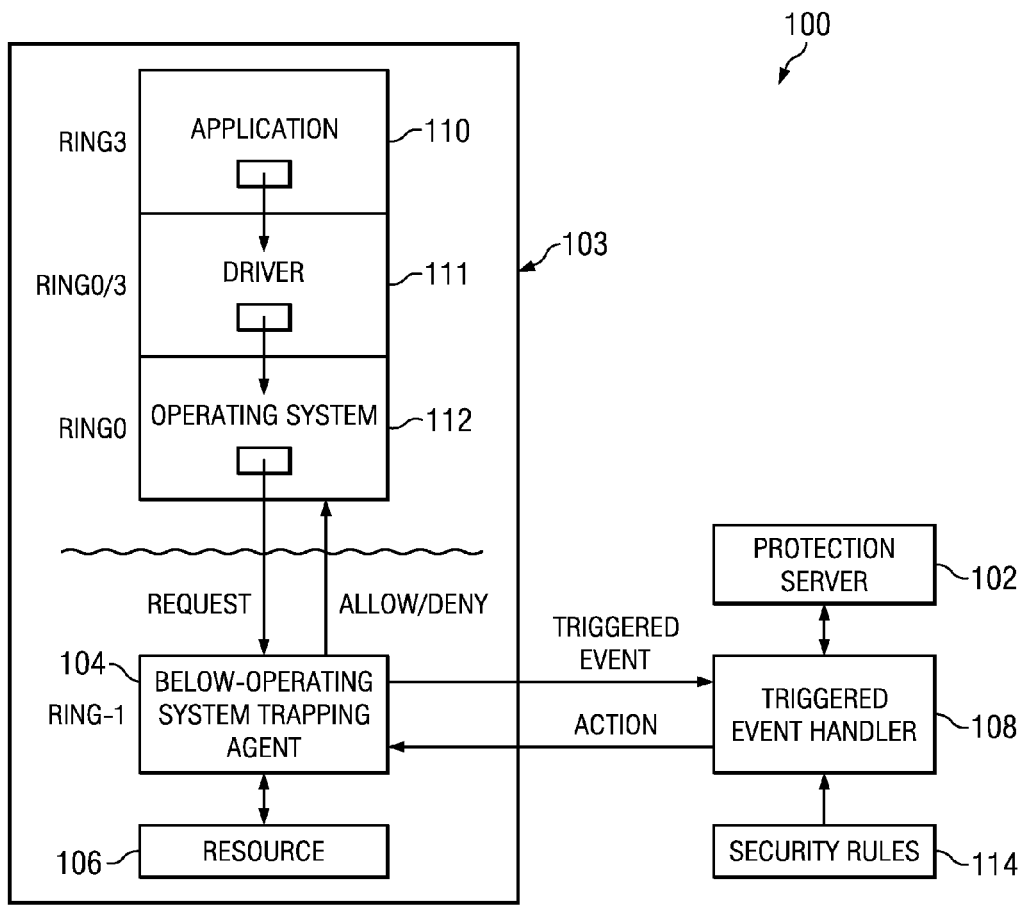
FIG. 1 is an example embodiment of a system for protecting an electronic device from malware.

FIG. 1 is an example embodiment of a system 100 for protecting an electronic device from malware. System 100 may include a below-operating system ("O/S") trapping agent 104 communicatively coupled to a triggered event handler 108. Below-O/S trapping agent 104 may be configured to trap various attempted accesses of a resource 106 of an electronic device 103. Below-O/S trapping agent 104 may be configured to create a triggered event associated with the trapped attempted access, and to send the triggered event to a triggered event handler 108. Triggered event handler 108 may be configured to consult one or more security rules 114 or a protection server 102 to determine how to handle the triggered event. Triggered event handler 108 may also be configured to evaluate the triggered event's propensity to be an indication of malware, or a malicious attempt to subvert the resources or operation of electronic device 103. Furthermore, triggered event handler 108 may be configured to provide a determination to below-O/S trapping agent 104 of whether the triggered event should be allowed or denied, or may be configured to yield another corrective action.

Below-O/S trapping agent 104 may be implemented at a lower functional level than the operating systems in electronic device 103. For example, below-O/S trapping agent 104 may intercept attempted accesses of resource 106 by an operating system 112, a driver 111, or an application 110. Below-O/S trapping agent 104 may be running on a processor of electronic device 103 without use of an operating system. In one embodiment, below-O/S trapping agent 104 may be operating on a bare-metal environment or execution level. In addition, below-O/S trapping agent 104 may be running at a higher execution priority, as defined by a processor of electronic device 103, than all operating systems of electronic device 103. For example, in the context of a hierarchical protection domain model using protection rings, wherein a lower number represents a higher priority, operating system 112 may be operating at "Ring0" while below-O/S trapping agent 104 may be operating at "Ring-1." Drivers 111 and applications 110 may be operating at "Ring0" or "Ring3." In some embodiments of processors, the concept of "Ring-1" may be known as "Ring0 privileged mode," and the concept of "Ring0" may be known as "Ring0 non-privileged mode." Operation in "Ring-1" or "Ring0 privileged mode" may entail additional overhead and expense than "Ring0" or "Ring0 privileged mode." Operating systems of electronic device 103 may run at Ring0. On processors such as INTEL processors, the mode of "VMX Root" may be equivalent to "Ring0 privileged mode" and the mode of "VMX Non-root" may be equivalent to "Ring0

Below-O/S trapping agent 104 may operate transparently to entities running at Ring0 or higher. Thus the attempted access of resource 106 may be requested by operating system 112 or another entity in the same manner whether below-O/S trapping agent 104 is present or not. Below-O/S trapping agent 104, when enforcing a received action, may allow the request to happen, may deny the request, or take other corrective action. To deny the request, below-O/S trapping agent 104 may simply not pass the request to the resource 106 or processor, or may provide a spoofed or dummy reply to the request to convince operating system 112 that the action has occurred.

By running at "Ring-1," at a higher priority than the pertinent operating systems of electronic device 103, or below the pertinent operating systems of electronic device 103, below-O/S trapping agent 104 may avoid much of the malware that plagues operating systems such as operating system 112. Malware may trick operating system 112 or even anti-malware software running at "Ring0," as malware may also be running at "Ring0" priority. However, malware on electronic device 103 must still make requests of resource 106 if it is to carry out malicious activities. Thus, trapping operations linked to sensitive resources may be better accomplished by a trapping agent running below the level of operating systems in electronic device 103.

Below-O/S trapping agent 104 may be implemented in any suitable manner. In one embodiment, below-O/S trapping agent 104 may be implemented in a virtual machine monitor. Such an embodiment may operate below the level of operating systems as described for below-O/S trapping agent 104. Descriptions of an example of such an embodiment may be found in, for example, discussions of FIG. 2, below, of a security virtual machine monitor 216. In another embodiment, below-O/S trapping agent 104 may be implemented in firmware. Such an embodiment may operate below the level of operating systems as described for below-O/S trapping agent 104. Descriptions of an example of such an embodiment may be found in, for example, discussions of FIGS. 4 and 5, below, of a firmware security agent 440, 516, or PC firmware security agent 444. In yet another embodiment, below-O/S trapping agent 104 may be implemented in microcode. Such an implementation may operate below the level of operating systems as described for below-O/S trapping agent 104. Descriptions of an example of such an embodiment may be found in, for example, discussions of FIG. 7, below, of a microcode security agent 708. Below-O/S trapping agent 104 may be implemented in a combination of these embodiments.

Triggered event handler 108 may be embodied by one or more event handlers or security agents communicatively coupled together. Triggered event handler 108 and below-O/S trapping agent 104 may be implemented in the same security agent. In one embodiment, triggered event handler 108 may be operating at the same priority ring as below-O/S trapping agent. In another embodiment, triggered event handler 108 may be operating at the same priority as operating system 112, driver 111, or application 110. In still yet another embodiment, triggered event handler 108 may be implemented by two or more triggered event handlers wherein at least one triggered event handler operates at the same priority ring as below-O/S trapping agent, and at least one triggered event handler operates at the level of operating system 112, driver 111, or application 110. By running at the level of below-O/S trapping agent 104, triggered event handler 108 may similarly avoid the problems of "Ring0" or "Ring3"

malware infecting the agent itself. However, a triggered event handler 108 running at "Ring0" or "Ring3" with operating system 112, driver 111, or application 110 may be able to provide context information about an attempted access of resource 106 that may be unavailable from the viewpoint of "Ring-1" agents.

Triggered event handler 108 may be implemented in any suitable manner. In one embodiment, triggered event handler 108 may be implemented in a virtual machine monitor or virtual machine monitor security agent. Such an embodiment may operate below the level of operating systems as described for triggered event handler 108. Descriptions of an example of such an embodiment may be found in, for example, discussions of FIG. 2, below, of a security virtual machine monitor 216 or security virtual machine monitor security agent 217. In another embodiment, triggered event handler 108 may be implemented fully or in part in firmware. Such an embodiment may operate below the level of operating systems as described for triggered event handler 108. Descriptions of an example of such an embodiment may be found in, for example, discussions of FIGS. 4 and 5, below, of a firmware security agent 440, 516, or PC firmware security agent 444. Triggered event handler 108 may also be implemented in the below-O/S agent 450 in FIG. 4, which may itself be implemented in such ways as in a virtual machine monitor, firmware, or microcode. In yet another embodiment, triggered event handler 108 may be implemented in microcode. Such an implementation may operate below the level of operating systems as described for triggered event handler 108. Descriptions of an example of such an embodiment may be found in, for example, discussions of FIG. 7, below, of a microcode security agent 708. Triggered event handler 108 may also be implemented in the below-O/S agent 712 of FIG. 7, which may itself be implemented in such ways as in a virtual machine monitor, firmware, or microcode. Triggered event handler 108 may be implemented in a combination of these embodiments.

In one embodiment, below-operating system trapping agent 104 and/or triggered event handler 108 may operate in a bare metal layer of electronic device 103. Below-operating system trapping agent 104 and/or triggered event handler 108 may operate without use of an operating system between them and the resource 106 that they are configured to protect. The resource 106 may include a processor, features of the processor, memory, the entities residing in the memory such as data structures, or the entities residing in the memory for execution by the processor such as functions, processes, or applications. Below-operating system trapping agent 104 and/or triggered event handler 108 may operate directly on the hardware of electronic device 103. Below-operating system trapping agent 104 and/or triggered event handler 108 may not require the use of an operating system such as operating system 112 to execute nor gain full access to resource 106.

Other operating systems may exist on electronic device 103 which do not participate in the relationship between entities at the level operating system 112, below-operating system trapping agent 104 and triggered event handler 108, and resource 106. For example, a pre-boot operating system may securely launch portions of electronic device, but not participate in the normal operation of electronic device in terms of handling requests from application 110, driver 111, and operating system 112 made of resource 106. In another example, electronic device 103 may contain motherboard components, plug-in cards, peripherals, or other components which contain their own sets of operating systems and processors to perform functions outside of the relationship between entities at the level operating system 112, below-operating system trapping agent 104 and triggered event handler 108, and resource 106. These operating systems may be embedded operating systems. Any of these operating systems might not be used for the execution of below-operating system trapping agent 104 and triggered event handler 108. Further, any of these operating systems might not access the resource 106 protected by trapping agent 104 and triggered event handler 108.

System 100 may include any combination of one or more below-operating system trapping agents 104 and one or more triggered event handlers 108. Descriptions of the below-operating system trapping agents 104 and triggered event handlers 108 may be found in descriptions of trapping agents, event handlers, and security agents in the figures that follow.

Figure 4:
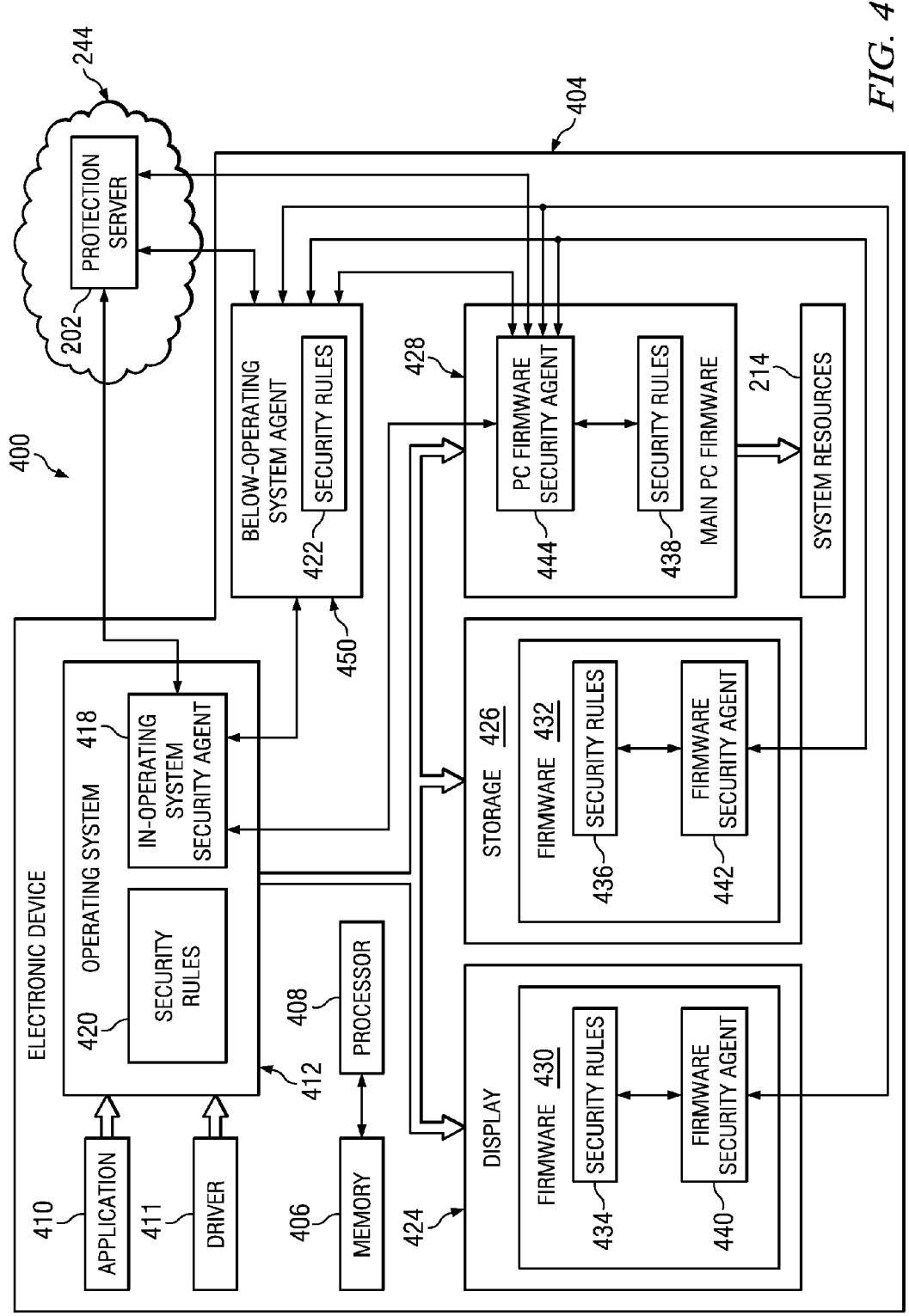
FIG. 4 is an example embodiment of a firmware-based and security-rule-based system for protecting an electronic device from malware.

Resource 106 may include any suitable resource of an electronic device. For example, resource 106 may include registers, memory, controllers, or I/O devices. Descriptions of example embodiments of resource 106 may be found in descriptions of, for example, the system resources 214 of FIG. 2, components such as display 430 and storage 432 as shown in FIG. 4, or the system resources 724 of FIG. 7 below.

Security rules 114 may include any suitable rules, logic, commands, instructions, flags, or other mechanisms for informing below-O/S trapping agent 104 about what actions to trap, or for informing triggered event handler 108 to handle an event based on a trapped action. Triggered event handler 108 may be configured to provide one or more of security rules 114 to below-O/S trapping agent. Descriptions of example embodiments of some or all of security rules 114 may be found, for example, in descriptions of security rules 222 of FIG. 2, security rules 422, 434, 436, 438 of FIG. 4, security rules 518 of FIG. 5, or security rules 707, 723 of FIG. 7 below.

Kernel mode and user mode entities such as application 110, driver 111, and operating system 112 of system 100 may be implemented in any suitable manner. Descriptions of example embodiments of application 110, driver 111, and operating system 112 of system 100 may be found in descriptions of, for example, application 210, driver 211 and operating system 212 of FIG. 2; application 410, driver 411, and operating system 412 of FIG. 4; and application 709, driver 711, and operating system 713 of FIG. 7 below.

Electronic device 103 may be implemented in any suitable manner, such as in a computer, a personal data assistant, a phone, mobile device, server, or any other device configurable to interpret and/or execute program instructions and/or process data. Descriptions of example embodiments of electronic device 103 may be found in discussions of, for example, electronic device 204 of FIG. 2, electronic device 404 of FIG. 4, or electronic device 701 of FIG. 7.

System 100 may be implemented in any suitable system for trapping attempted access of resources at a level underneath the operating systems of electronic device 103. System 100 may also be implemented in any suitable means for handling the attempted access by consulting security rules to determine whether the attempted access is malicious or not. For example, system 100 may be implemented by the systems and methods 200, 300, 400, 500, 600, 700, and 800 as described in FIGS. 2-8 below.

Figure 2:
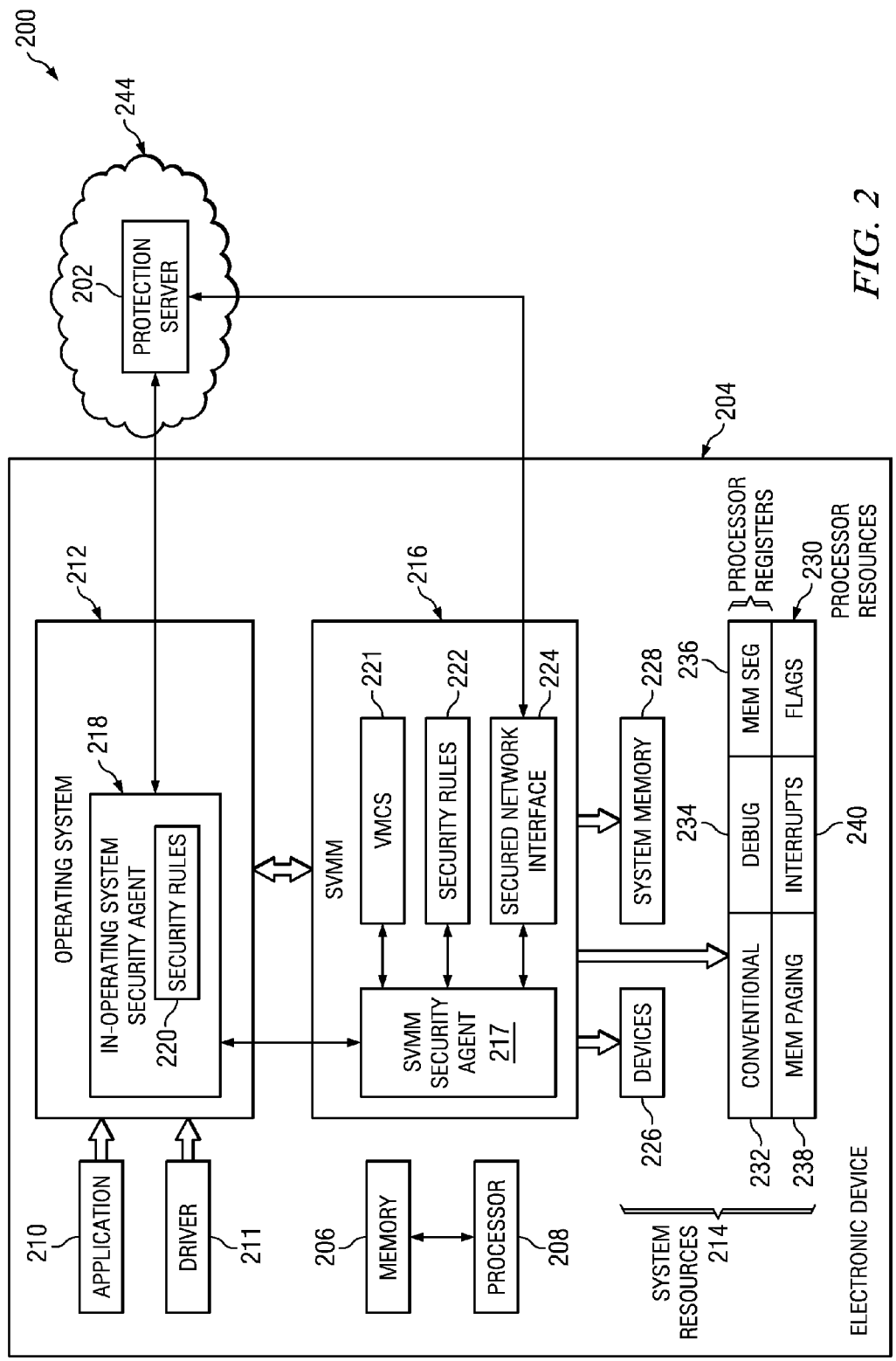
FIG. 2 is an example embodiment of a system for a virtual-machine-monitor-based and security-rule-based configurable security solution for protecting an electronic device from malware.

FIG. 2 is an example embodiment of a system 200 for a virtual-machine-monitor-based and security-rule-based configurable security solution for protecting an electronic device from malware. System 200 may be an example embodiment of a system 100, implementing certain elements of system 100 in a virtual machine monitor. System 200 may include an electronic device 204 which is to be protected against malware by a configurable security solution. The configurable security solution of system 200 may include a security agent running below all operating systems, a security virtual machine monitor, a cloud-based security agent and an in-O/S behavioral security agent. The below-O/S security agent and security virtual machine monitor may be configured to guard access to system resources of the electronic device 204, including the resources used by the in-O/S behavioral security agent. The below-O/S security agent may be running in the security virtual machine monitor. The cloud-based security agent may be configured to provide malware detection information to the below-O/S security agent and to the in-O/S behavioral security agent, and to receive information regarding suspicious behavior possibly-associated with malware from the security virtual machine monitor and in-O/S behavioral security agent. The in-O/S behavioral security agent may be configured to scan the electronic device 204 for evidence of malware operating on the electronic device. System 200 may include one or more below-O/S security agents configured to trap attempted use of access to the resources of the electronic device 204, generate a triggered event corresponding to the attempt, consult security rules regarding the triggered event, and take corrective action if necessary regarding the attempt.

In one embodiment, system 200 may include protection server 202 communicatively coupled to one or more in-O/S security agents 218 and a security virtual machine monitor ("SVMM") security agent 217. SVMM security agent 217 may reside in a SVMM 216. SVMM 216 may reside and operate upon electronic device 204. In-O/S security agent 218 and SVMM security agent 217 may be communicatively coupled. Protection server 202, in-O/S security agent 218, SVMM security agent 217 and SVMM 216 may be configured to protect electronic device 204 from infections of malware.

SVMM security agent 217 may be an example embodiment of the triggered event handler 108 of FIG. 1. SVMM 216 may be an example embodiment of the below-O/S trapping agent 104 of FIG. 1.

Electronic device 204 may include a memory 206 coupled to a processor 208. Electronic device 204 may include one or more applications 210 or drivers 211 executing on electronic device for any suitable purpose. Electronic device 204 may include an operating system 212. Operating system 212 may be configured to provide access to system resources 214 of electronic device 204 to applications 210 or drivers 211. SVMM 216 may be configured to intercept such calls of operating system 212 of system resources 214. SVMM 216 and SVMM security agent 217 may operate below the level of operating system 212. For example, SVMM 216 and SVMM security agent 217 may operate directly on processor 208 in a privileged mode such as "Ring-1."

Processor 208 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 208 may interpret and/or execute program instructions and/or process data stored in memory 206. Memory 206 may be configured in part or whole as application memory, system memory, or both. Memory 206 may include any system, device, or apparatus configured to hold and/or house one or more memory modules; for example, memory 206 may include read-only memory, random access memory, solid state memory, or disk-based memory. Each memory module may include any system, device or apparatus configured to retain program instructions and/or data for a period of time (e.g., computer-readable non-transitory media).

Protection server 202 may be operating on a network 244. Protection server 202 operating on network 244 may implement a cloud computing scheme. Protection server 202 may be configured to communicate with elements of electronic device 204 to update malware detection rules and information. Protection server 202 may be configured to receive information regarding suspicious activities originating from electronic device 204 and determine whether or not such suspicious activities are indications of malware infection. Operating system 212 may include one or more in-O/S security agents 218. In-O/S security agent 218 may be configured to receive monitoring and detection rules from protection server 202, such as in-O/S security rules 220. In-O/S security agent 218 may be configured to use the in-O/S security rules 220 received by protection server 202 to monitor and prevent suspicious activities on electronic device 204. In-O/S security agent 218 may be configured to report detected suspicious activities back to protection server 202. In-O/S security agent 218 may be configured to prevent malware operations and to report such preventions to protection server 202. If more than one in-O/S security agent 218 is present in system 200, each in-O/S security agent 218 may be configured to perform a designated portion of the trapping, validating, or other tasks associated with in-O/S security agent 218. Such portions may be defined by below-operating-system security agents. For example, one in-O/S security agent 218 may validate or investigate MOV instructions, while another in-O/S security agent 218 may validate or investigate JMP instructions. In-O/S security agent 218 may be configured to determine the life cycle of a particular page in memory. For example, in-O/S security agent 218 may know the processes and steps typically used by operating system 212 to allocate a page of memory. Similarly, in-O/S security agent 218 may know the processes and steps typically used by operating system 212 to load an image of an application in its loader. Such processes may follow a static pattern of operation. Thus, in-O/S security agent 218 may be configured to track the operation of operating system 212 to determine whether for a given action standard procedures were followed. In-O/S security agent 218 may communicate with SVMM security agent 217 to determine whether or not an operation trapped by SVMM security agent 217 generated the corresponding expected actions observed by in-O/S security agent 218. A discrepancy may indicate that malware has attempted to perform a system function outside of the normal operation of the operating system 212. Thus, for example in-O/S security agent 218 and SVMM security agent 217 may determine whether a page in question was loaded in memory directly by malware or was loaded by the operating system loader. Such a behavior may cause in-O/S security agent 218 or SVMM security agent 217 to report information to protection server 202, employ more aggressive trapping and checking, or take any other corrective measures.

In one embodiment, in-O/S security agent 219 may be configured to provide contextual information by embedding itself within operating system 212. For example, in-O/S security agent 219 may be configured to register itself or a subcomponent as a driver filter, and attach itself to a main driver to determine what the driver sees or does not see. By attached as a filter to NTFS.SYS, for example, in-O/S security agent 219 may be configured to report the file I/O operations seen by the operating system 212 drivers.

In another embodiment, in-O/S security agent 219 may be configured to provide such information observed from within operating system 219 to SVMM security agent 216 or other below-O/S security agents for comparison with information observed below the operating system. Discrepancies between the two sets of information may indicate a presence of malware attempting to hide itself. For example, in-O/S security agent 219 may hook or filter NDIS.SYS, and monitor for file writes to a particular file. SVMM security agent 216 may monitor input and output commands. If SVMM security agent 216 determined more writes than should have been seen based on the list of function calls seen by in-O/S security agent 219, then malware may be clandestinely writing to disk outside of the functions provided by operating system 212.

Network 244 may be implemented in any suitable network for communication, such as: the Internet, an intranet, wide-area-networks, local-area-networks, back-haul-networks, peer-to-peer-networks, or any combination thereof. Protection server 202 may use the reports submitted from various security agents 218 running on various electronic devices 204 to further detect malware by applying prevalence and reputation analysis logic. For example, a suspicious behavior identified on electronic device 204 may be synthesized into a rule for protection server 202 to proactively protect other electronic devices 204. Such a rule may be determined, for example, based on the number of times that a suspicious driver has been reported. For example, an unknown driver with a narrow or slow distribution pattern may be associated with malware. On the other hand, an unknown driver with a wide and fast distribution may be associated with a patch of a popular and widely available application. In another example, such a detected driver may have been determined by security software running on another electronic device to have accessed a website known to host malware. Such a driver may be determined to be associated with malware.

SVMM 216 may implement some or all of the security virtual machine monitoring functions of system 200. SVMM 216 may be configured to intercept access to system resources—such as registers, memory, or I/O devices—to one or more operating systems running on an electronic device. The security virtual machine monitoring functions of system 200 may be implemented using SVMM 216, or any other virtual machine monitor configured to protect electronic device 204 according to the teachings of this disclosure. SVMM 216 may be configured to control and filter actions taken by operating system 212 while operating system 212 attempts to access system resources 214, on behalf of itself or on behalf of applications 210 running through operating system 212. SVMM 216 may run underneath operating system 212 on electronic device 204 and may have control over some or all processor resources made available to operating system 212 and application 210 or driver 211. Application 210 may comprise any application suitable to run on electronic device 204. Driver 211 may comprise any driver suitable to run on electronic device 204. The processor resources made available for control by SVMM 216 may include those resources designated for virtualization. In one embodiment, SVMM 216 may be configured to virtualize system resources 214 for access by operating system 212, application 210, or driver 211. As examples only, such system resources 214 may include input-output devices 226, system memory 228, or processor resources 230. As examples only, processor resources 230 may include conventional registers 232, debug registers 234, memory segmentation 236, memory paging 238, interrupts 240 or flags 242. I/O devices 226 may include access to such devices such as keyboard, display, mice, or network cards.

SVMM 216 may be configured to trap the execution of operations originating from operating system 212 to access system resources 214. SVMM 216 may include a control structure configured to trap specific attempted accesses of system resources 214. Any suitable control structure may be used. In one embodiment, such a control structure may include virtual machine control structure ("VMCS") 221. SVMM 216 may be configured to trap such execution by manipulating flags inside of VMCS 221. SVMM 216 may be configured to trap any suitable operation of operating system 212, application 210, or driver 211 involving an access of system resources 214. Such trapped operations may include, for example: reading, writing and execution of particular pages of memory in system memory 228; loading and storing a value to or from a processor register 230; or reading and writing to or from I/O devices 226. Any such operations may cause a Virtual Machine Exit ("VM Exit"), which may be trapped by SVMM 216. SVMM 216 may be configured to trap the generation of interrupts 240, which may be generated by the processor 208 or initiated by elements of operating system 212. SVMM 216 may be configured to trap the attempted reading and writing to or from I/O device 226 by trapping IN and OUT instructions. SVMM may be configured to trap such instructions by trapping access to mechanisms, for example, of Virtualization Technology Directed I/O ("VTd"). VTd may allow I/O device virtualization according to processor 208. By accessing VTd facilities, SVMM security agent 217 may be configured to determine devices connected by VTd, determine meta information from operating system 212, ports on the I/O device, or other suitable information. SVMM security agent 217 may be configured to control or trap the operation of such virtualized device access. For example, SVMM security agent 217 may be configured to determine I/O permission maps, containing I/O assignments given to programmable I/O ports. SVMM security agent 217 may be configured to trap access to such permission maps, which may be done by malware, or use such permission maps to determine the relationship of entities on operating system 212 and a request of an I/O device.

In one embodiment, SVMM security agent 217 may be operating in SVMM 216. In another embodiment, SVMM security agent 217 may be operating outside of SVMM 216, but may be communicatively coupled to SVMM 216. In such an embodiment, SVMM security agent 217 may be operating below the level of operating systems of electronic device 204 such as operating system 212. SVMM security agent 217 may be operating at the same level and/or the same priority of SVMM 216. SVMM security agent 217 may be configured to handle events triggered by or trapped by SVMM 216. SVMM security agent 217 may be configured to access contents of memory 228 or a disk at a level below the operating system 212 so as to examine the contents free of interference of kernel-level rootkits. Furthermore, some operations of SVMM security agent 217 may be implemented by SVMM 216, and some operations of SVMM 216 may be implemented by SVMM security agent 217.

SVMM security agent 217 may be configured to set the operation of SVMM 216 in terms of what actions will cause a trap or trigger. In one embodiment, SVMM 216 may be configured to communicate the detection of trapped actions to SVMM security agent 217. SVMM security agent 217 may be configured to consult security rules 222 to determine whether the trapped actions indicate malware or malicious activities, and based upon security rules 222 may provide indications to SVMM 216 about what subsequent action to take. Such subsequent action may include allowing the attempted action, disallowing the attempted action, or taking other corrective steps.

The operation of trapping the attempted access and execution of system resources 214 by SVMM 216 and SVMM security agent 217 may be coordinated through information gathered by in-O/S security agent 218. In-O/S security agent 218 may be configured to provide context to the trapping and handling operations of SVMM 216 and SVMM security agent 217. For example, a particular operating system data structure may normally only be written to by a specific application or service. In-O/S security agent 218 may determine what applications or processes are currently visibly running on operating system 212 and communicate the information to SVMM security agent 217. If the specific application or service is not listed as visibly running, then the attempted write to the data structure may have come from an unauthorized application or process.

In-O/S security agent 218 may be configured to communicate with SVMM 216 and/or SVMM security agent 217 via hypercalls. Hypercalls may be implemented with a descriptor table defining available requests that may be used, as well as associated input and output parameters. Such a descriptor table may define one or more requests possible for in-O/S security agent 218 to communicate with SVMM 216 and/or SVMM security agent 217. Such a descriptor table may also define where input and output parameters for such a request may be located in memory.

In-O/S security agent 218, SVMM security agent 217, and protection server 202 may be configured to authenticate each other. Each of security agent 212, SVMM security agent 217 and protection server 202 may be configured to not continue communications with each other unless each of the entities is authenticated. SVMM 216 may be configured to locate the in-O/S security agent 218 image in memory 206, and use cryptographic signing algorithms to verify the in-O/S security agent 218 image in memory 206. Authentication between protection server 202, in-O/S security agent 218 and SVMM security agent 217 may use any suitable method, including cryptographic hashing and/or signing algorithms. In one embodiment, such authentication may involve the exchange of a private secret key. In-O/S security agent 218 may be configured to receive a secret key from protection server 202 to verify the instance of SVMM security agent 217.

In-O/S security agent 218 may have contextual information regarding the operation of operating system 212. In-O/S security agent 218 may be configured to communicate with SVMM security agent 217 to provide such contextual information. SVMM security agent 217 may instruct SVMM 216 on, for example, how to define certain pages of memory, or which registers to trap.

SVMM 216 may be configured to trap access attempts to system resources 214 defined by SVMM security agent 217. For example, for traps of memory access, SVMM 216 may be configured to trap operations such as read, write or execute. For trapping access to processor registers 230, SVMM 216 may be instructed to trap operations including load, store, or read register values. For trapping I/O operations, I/O devices 226, SVMM 216 may be instructed to trap operations such as input or output to keyboards, mice, or other peripherals. SVMM security agent 217 and/or other below-operating system security agents in the figures below may, in conjunction with in-operating system security agents, may be configured to determine for an I/O operation, the identity of a target I/O device 226, target operation to be performed upon the I/O device 226, and the data to be transferred.

SVMM security agent 217 may be configured to determine contextual information, such as what entity of operating system 212 has attempted to access a resource of electronic device 204, or to what entity of operating system 212 a resource may belong. SVMM security agent 217 may be configured to make such determinations through any suitable method. In one embodiment, SVMM security agent 217 may be configured to access contextual information for such determinations from in-operating system security agent 218. In another embodiment, SVMM security agent 217 may be configured to, directly or indirectly, access a call stack of operating system 212 and/or an execution stack of processor 208 to determine the order of calls made by different processes or applications of operating system 212. An Execution Instruction Pointer may point to the instruction causing the trigger, while an Execution Stack Pointer and Execution Base Pointer may point to the stack frames. By walking through the Execution Base Pointer through the stack, previous function calls may be identified providing context for the operation at hand. Such stacks may indicate the operation that was attempted as well as a source memory location. In yet another embodiment, SVMM security agent 217 may be configured to use a memory map in conjunction with security rules 222 to determine whether an attempt is malicious or indicative of malware. Such a memory map may, for example, indicate the entity that made an attempted access of resources, given a memory location of the attempted access. Such a memory map may be defined, for example, in virtual memory page identifiers and/or physical memory addresses. Such a memory map may, in another example, indicate the entity corresponding to the memory location of the target of the attempt. Using the memory map, SVMM security agent 217 may be configured to determine the identities of the source and targets, or entity owners thereof, of an attempted access. The memory map may be created in part by SVMM security agent 217 or other below-O/S security agents in the figures below in conjunction with in-operating system security agents through monitoring the execution of the system. SVMM security agent 217 and/or other below-operating system security agents in the figures below may, in conjunction with in-operating system security agents, determine for a given memory page or physical address whether such a location belongs to a particular code section or data section; to which module, process, application, image, or other entity it belongs; or whether it is associated with user mode or kernel mode entries. SVMM security agent 217 and/or other below-operating system security agents in the figures below may, in conjunction with in-operating system security agents, determine metadata for the mapping of virtual memory and physical memory indicating the identification, location, and permissions of various entities running on the electronic device 204. Similarly, SVMM security agent 217 and/or other below-operating system security agents in the figures below may use a mapping of sectors in a mass storage device to determine the location of images of such entities in the mass storage device. SVMM security agent 217 and/or other below-operating system security agents in the figures below may, in conjunction with in-operating system security agents, determine for a given entity the sectors, files, directories, and volumes on which they reside.

SVMM security agent 217 may be configured to allocate memory such as system memory 228 as required for operation of in-O/S security agent 218, SVMM security agent 217, and SVMM 216. SVMM security agent 217 may be configured to request that SVMM 216 secure such allocated memory against unauthorized read and write operations. SVMM 216 may be configured to initialize the allocated memory after protection of the memory is established to eliminate the opportunity for malware to add malicious code between the time when the memory is allocated by in-O/S security agent 218 and the protection is established by SVMM 216.

SVMM security agent 217 may be configured to communicate with protection server 202 to securely receive SVMM security rules 222. SVMM security rules 222 may comprise instructions, logic, rules, shared libraries, functions, modules, or any other suitable mechanism for instructing SVMM 216 about what security policies to employ. SVMM security agent 217 may be configured to transfer information to protection server 202 regarding suspicious activities and detected malware from electronic device 204.

In-O/S security agent 218 may be configured to communicate with protection server 202 to receive in-O/S security rules 220. In-O/S security rules 220 may comprise instructions, logic, rules, shared libraries, functions, modules, or any other suitable mechanism for in-O/S security agent 218 to detect malware on electronic device 204. In-O/S security agent 218 may be configured to transmit information to protection server 202 regarding suspicious activities and detected malware on electronic device 204.

In-O/S security rules 220 and SVMM security rules 222 may each comprise protection rules for protecting electronic device 204 against malware infections, and for detecting suspicious activities that may comprise malware. In-O/S security agent security rules may contain rules executed by and within in-O/S security agent 218. SVMM security rules 222 may contain rules executed by and within SVMM 216 and/or SVMM security agent 217.

SVMM security rules 222 may be configured to provide information to SVMM security agent 217 with definitions of how to observe and detect malware infections of electronic device 204. For example, SVMM security rules 222 may include categorizations of what types of function calls or behaviors from entities such as application 210 or driver 211 that SVMM security agent 217 may monitor for indications of malware. As another example, SVMM security rules 222 may include definitions of how SVMM security agent 217 may process such triggered function calls, including what parameters to use, how to extract values from such calls, or how to validate the operation of such calls. Furthermore, SVMM security rules 222 may include information for in-SVMM security agent 217 on how to monitor the behavior of entities electronic device such as application 210 or driver 211, as well as exceptions to such behavioral detection rules. As yet another example, SVMM security rules 222 may include information for SVMM security agent 217 on how to prevent and repair malicious behaviors detected by such behavioral detection rules. SVMM security rules 222 may include details of what data that SVMM security agent 217 should monitor, collect, and send to protection server 202.

Similarly, in-O/S security rules 220 may be configured to provide information to in-O/S security agent 218 with definitions of how to observe and detect malware infection of electronic device 204, as well as how to coordinate such activities with SVMM security agent 217.

SVMM security rules 222 may also include rules regarding what actions SVMM 216 will trap. SVMM security agent 217 may be configured to apply such rules to SVMM 216. For example, SVMM security agent 217 may be configured to convert the address for a function to be trapped into an identifiable virtual or physical page of memory, create a request for SVMM 216 to trap the execution of such a page, and subsequently call the security agent 217 after trapping the execution. SVMM security agent 217 may be configured to receive SVMM security rules 222 through its interface with the SVMM 216. Such an interface may comprise a hypercall-based interface. SVMM security agent 217 may be configured to push any resulting detections or reports to SVMM 216 through the same hypercall based interface.

In one embodiment, SVMM 216 may be configured to process triggered actions without consulting SVMM security agent 217. In such an embodiment, SVMM 216 may be configured to install additional triggers that are processed within SVMM 216 which might not be passed to SVMM security agent 217. Such additional triggers may be defined by SVMM security rules 222. In one embodiment SVMM security rules 222 may define memory pages scanning rules for SVMM 216. Such rules may include a listing of entities or modifications which are malicious and should not be allowed to reside in memory. Such rules may also include a whitelist, configured to include a listing of pages that are specifically allowed to exist within system memory 228. In another embodiment, SVMM security rules 222 may define to the SVMM 216 memory pages access rules. Such rules may include definitions of what code pages are allowed, or conversely, prohibited to access a given code or data page. Consequently, SVMM security rules 222 may be configured to instruct SVMM 216 to act as a memory scanner, and/or control access to memory pages.

SVMM 216 may be configured to protect SVMM security agent 217, SVMM 216, and in-O/S security agent 218 by preventing unauthorized read and write access to their respective code and data pages in system resources 214. For example, if application 210 or driver 211 make a request to a portion of system memory 228, processor registers 230 or I/O devices 226 which would result in affecting the integrity or operation of SVMM security agent 217, SVMM 216, and in-O/S security agent 218, then SVMM 216 may be configured to intercept such an attempted request, and subsequently re-route the request, deny it, or take other appropriate action. In another example, SVMM 216 may be configured to authorize read access for portions of system memory 228, processor registers 230 or I/O devices 226 affecting SVMM security agent 217, SVMM 216, and in-O/S security agent 218 for memory security software applications, such as SVMM security agent 217 itself, or other corresponding or affiliated programs. Such an authorization may be defined within SVMM security rules 222, which may define to SVMM 216 how to handle access to system resources 214 such as system memory 228. In one embodiment, SVMM security rules 222 may include a whitelist of trusted security programs, which may include SVMM security agent 217.

To communicate with protection server 202, SVMM 216 may include a secured network interface 224. Secured network interface 224 may be configured to provide secure access between a network server such as protection server 202 and an element of electronic device 204 such as SVMM 216 or SVMM security agent 217. SVMM 216 may include a logical TCP/IP driver or other communication interface, which may implement secured network interface 224. The protection server 202 may be configured to communicate via secured network interface 224 to instruct SVMM 216 or SVMM security agent 217 to update itself, as well as provide protection rules such as SVMM security rules 222 or in-O/S security rules 220. Protection server 202 may be configured to deliver customized rules for a particular electronic device 204, or a particular SVMM 216. Such customization may include the type of malicious activities that have been reported on electronic device 204, along with other protection mechanisms within electronic device 204 such as an anti-virus program, firewall, or other protection mechanism. In one embodiment, protection server 202 may be operated by an administrator of electronic device 204 on, for example, a local network. In such a case, the administrator may set global or personalized policies for handling suspicious behavior that may be implemented by rules received from protection server 202. SVMM 216 may include an update engine that informs SVMM 216 or SVMM security agent 217 how to update itself through a new image delivered securely via protection server 202.

In-O/S security rules 220 and SVMM security rules 222 may each be configured to request that particular or classes of observed actions or operations on electronic device 204 be passed to protection server 202. There, protection server may examine and verify the observations before the action is allowed to proceed on electronic device 204. Protection server 202 may be configured to accept such an action to be examined synchronously or asynchronously. In one embodiment, in-O/S security agent 218 may be configured to pass questionable activities, segments of code or data, or actions to SVMM 216 for verification by protection server 202. For example, in-O/S security agent 218 may detect a suspected instance of malware by detecting an unsigned driver loaded within memory. SVMM 216 may receive the information about the suspicious software from in-O/S security agent 218, and may provide it to protection server 202.

SVMM security rules 222 may be configured to allow or deny access to any suitable system resource of electronic device. Such resources available to be monitored may depend upon the resources exposed by processor 208. For example, in one embodiment SVMM security rules 222 may be configured to allow SVMM 216 to restrict access to system memory 228, I/O devices 226, and interrupts 140. Restricted access to system memory 228 may be accomplished, for example, using EPT or the operating system's page tables. Such a restriction may prevent unauthorized access to I/O devices such as keyboard displays or removable discs. In another embodiment, SVMM security rules 222 may be configured to allow SVMM 216 to restrict access to interrupt descriptor table entries, including entries in processor registers such as interrupt 240. In yet another embodiment, SVMM security rules 222 may be configured to allow SVMM 216 to monitor Extended Page Tables ("EPT"), or any other mechanism handling the mapping of virtual memory (real memory from the perspective of a guest operating system) to host physical memory. Changes to permissions or other access in EPT may trigger an event in a VMCS.

If electronic device 204 contains one or more processors besides processor 208 that support virtualization, SVMM 216 or another instance of SVMM 216 may be configured to intercept attempts to access the virtualized resources of such other processors. If electronic device 204 contains, for example, a quad-processor containing processor 208, the resources of the quad-processor may be protected by SVMM 216. If the one or more other processors do not support virtualization, SVMM 216 might not be able to secure access to their resources. If the one or more other processors support a different virtualization technology from processor 208, SVMM 216 may be configured to secure access to their resources if SVMM 216, but in a different manner than as processor 208 is secured, since the manner in which resources are virtualized may differ.

In operation, protection server may be running on network 244. In-O/S security agent 218 may be running on electronic device 204 to protect electronic device 204 from malware infections, by scanning electronic device 204 for malware, observing the behavior of entities such as application 210 and driver 211 on electronic device 204 for suspicious behavior, and by repairing any such infections that were found. In-O/S security agent 218 may be running at the same priority or level as operating system 212, and may be running in operating system 212. SVMM 216 may be operating on electronic device 204 to protect electronic device 204 from malware infection by trapping the attempted access of system resources of electronic device 204. SVMM security agent 217 may be running on electronic device 204, or another suitable electronic device, to set the trapping operation of SVMM 216 and to handle some or all of the trapped attempted accesses of system resources. SVMM 216 and SVMM security agent 217 may be running below the operating system 212 with a priority of "Ring-1." SVMM security agent 217 may be running on SVMM 216.

Protection server 202 may send security rules, such as SVMM security rules 222 and in-O/S security rules 220, to electronic device 204. Such rules may be received by SVMM security agent 217, which may provide in-O/S security rules 220 to SVMM 216. Such rules may be received by in-O/S security agent 218.

Protection server 202, security agent 218 and SVMM security agent 217 may each authenticate each other. SVMM security agent 217 may locate the image of security agent 218 in memory and use cryptographic signing algorithms to verify the image of security agent 218 resident in memory. Protection server 202 and SVMM security agent 217 may authenticate each other using cryptographic hashing and signing algorithms to correctly identify each other. SVMM security agent 217 and protection server 202 may also exchange a private secret key to authenticate the identity of each other. Security agent 218 may receive a secret key from protection server 202 to verify the instance of SVMM security agent 217. Communication between security agent 218, SVMM security agent 217, and 202 may not be fully established unless each of the agents is authenticated with each other. Similarly, SVMM security agent 217 and SVMM 216 may verify and authenticate each other if they are running as separate entities.

SVMM 216 and SVMM security agent 217 may be running underneath operating system 212 and all operating systems of electronic device 204. SVMM 216 may monitor access to system resources 214, including I/O devices 226, system memory 228, and processor registers 230 by operating system 212, security agent 218, application 210, and driver 211. SVMM 216 may trap the execution of key operations requested by operating system 212, security agent 218, application 210, driver 211, or any other entity of electronic device 204. SVMM 216 may trap such execution by manipulating flags inside of VMCS 221. When VMCS 221 intercepts a request for a protected resource, operation may be handed off to SVMM 216 for further operation, diagnosis and repair. In one embodiment, operation may be subsequently handled by SVMM security agent 217. In another embodiment, handling of the trapped operation may be conducted by SVMM 216 itself. SVMM 216 may trap any necessary operation of electronic device 204 to provide protection against malware. Such operations may include, but are not limited to: reading, writing and execution of particular code or data pages in system memory 228; loading and storing of value from a system register and processor registers 230; or reading to or from I/O devices 226. The specific operations which will be trapped by SVMM 216 may be defined by SVMM security rule 222.

Protection server 202 may communicate with SVMM security agent 217 or in-O/S security agent 218 to provide security rules to each. In one embodiment, protection server 202 may deliver SVMM security rules 222 to SVMM security agent 217. In another embodiment, protection server 202 may deliver in-O/S security rules 220 to in-O/S security agent 218. In yet another embodiment, protection server 202 may deliver in-O/S security rules 220 to SVMM security agent 217, which may then provide the rules to in-O/S security agent 218.

Application 210, driver 211 or other entities operating an electronic device 204 may be observed by in-O/S security agent 218. In-O/S security agent 218 may use in-O/S security rules 220 to observe the behavior of such processing entities to determine whether their behavior constitutes suspicious behavior indicating a possible infection of malware. Upon such a detection of suspicious activities, in-O/S security agent 218 may provide the suspicious information to protection server 202 for further analysis and instruction. In-O/S security rules 220 may indicate to in-O/S security agent 218 that such behaviors are suspicious, as well as indicate corrective action. For example, application 210 may communicate with a network destination which is known to host malware. In-O/S security agent 218 may notice the activity of application 210, and subsequently block the network access of application 210 to the network destination. In-O/S security agent 218 may also scan electronic device 204 for malware. For example, in-O/S security agent 218 may examine the contents of memory 206, or system memory 228 for patterns that correspond to signatures of malware. Such an examination may reveal that, for example, application 210 contains a block of code corresponding to a known segment of malware. In-O/S security agent 218 may then clean electronic device 204 of the infection of malware by repairing application 210, removing application 210, or taking any other suitable action. In-O/S security agent 218 may communicate with protection server 202 regarding any detected suspicious behaviors, or other indications of malware, and may receive instructions from protection server 202 on how to deal with such malware.

In one embodiment, SVMM security agent 217 may be configured to evaluate a trapped operation based on the origin of the entity that made the attempted operation. For example, if a driver was downloaded from an unknown domain, or has a certificate from an unknown guarantor, then the ability of the driver to subsequently operate may be limited. For example, a driver whose status is unknown may be denied the ability to attach itself to another driver. If the driver was downloaded from a domain known to host malware or contains fraudulent credentials, then the driver may be not permitted to even load. Similarly, if a driver is known to be from a particular domain or created by a particular author, then SVMM security agent 217 may be configured to recognize services in electronic device 204 authorized to update the driver, and to limit the ability to write or access the driver to those services. For example, a kernel driver from Company X may only be written to from Company X's update service software resident on electronic device 204. SVMM security agent 217 may be configured to validate the operation and integrity of the update service. In another embodiment, SVMM security agent 217 may be configured to evaluate a trapped operation based on the target of the attempt. For example, an attempt to update software from a service may be trapped for kernel drivers, but not for application software.

Once an entity has been determined to be suspicious, or an attempt determined to indicate malware, the process causing the attempt and the memory housing the process may be linked. Other processes accessing the same portion of memory may similarly be determined to be malware. A trapped attempt to access a resource may be stored, and a subsequent attempt to access a protected resource may be evaluated in light of the original event. For example, a malicious operation may require that code be written to a data segment then executed. Thus, SVMM security agent 217 may trap the original write access to the data segment, allow the write, but record the source of the write access. Subsequently, SVMM security agent 217 may trap a subsequent attempt to execute the data segment, and evaluate the malicious status of the attempt in light of the previously trapped operation, the entity which attempted it, or other suitable forensic information.

SVMM security agent 217 may instruct SVMM 216 concerning which of system resources 214 that SVMM 216 is to trap through a control structure such as VMCS 221 or through EPT. SVMM 216 may then trap access requests to system resources 214 originating from entities of electronic device 204 such as operating system 212, application 210 or driver 211. For example, if a request is made to read, write or execute portions of system memory 228, SVMM 216 may intercept such a request through a flag set for the designated portion of system memory in VMCS 221 or by intercepting a change detected by EPT. In another example, access requests made of I/O devices 226 may be intercepted by VMCS 221, such as input or output operations. In yet another example, requests of process registers 230, such as load or store commands, may be trapped by VMCS 221. Any such traps may result in the notification of SVMM 216 of the attempted access. Once SVMM 216 has trapped an attempted operation upon system resources 214, SVMM 216 may communicate such a trapped execution to SVMM security agent 217.

In-O/S security agent 218 and SVMM security agent 217 may communicate to determine the context of operations conducted within operating system 212. For example, a trapped system call from operating system 212 to a particular resource of electronic device 204 may have originated from a particular part of memory. SVMM security agent 217 may communicate with in-O/S security agent 218 to determine what application, process, or other entity resides within the particular part of memory.

Based on SVMM security rules 222, and the trapped operation and/or contextual information from in-O/S security agent 218, SVMM security agent 217 may then determine whether such an access constituted a suspicious action such as those indicative of an infection of malware. For example, an attempted change of system memory 228 of a protected memory space by an unauthorized application may be a suspicious activity, and thus such an attempted change detected by SVMM 216 may be interpreted by SVMM security agent 217 to be an operation of malware. Such an activity may be reported to protection server 202 for further instruction, or action may be directed by in-O/S security rules 220. The result of such a detection may be to block the attempted change in system memory 228, or triggering additional cleaning operations upon the entity of electronic device 204 which generated the attempted change.

SVMM 216 may monitor additional calls to system resources 214 to protect the integrity of the SVMM 216, SVMM security agent 217 and/or in-O/S security agent 218. SVMM 216 may conduct scanning operations, defined by SVMM security rules 222, to scan portions of system memory 228 to determine whether portions of such memory have been modified by malware. SVMM 216 may make use of signatures, hashes, or other rules indicating that a given pattern of memory is known as unsafe or safe.

For example, SVMM 216 may protect in-O/S security agent 218 by preventing unauthorized read and write access to code and data pages corresponding to in-O/S security agent 218 in system memory 228. Some malware may attempt to attack in-O/S security agent 218 by making memory modifications or other modifications to system resources 214 associated with system memory 228. SVMM 216 may read a whitelist contained in SVMM security rules 222 of authorized applications and other entities of electronic device 204 that may be permitted to alter the code or data or other system resources 214 corresponding to in-O/S security agent 218. If a modification originates from an entity not contained within the whitelist, then SVMM 216 may determine that such a modification is associated with malware. Unauthorized access to system resources 214 corresponding to in-O/S security agent 218 may be handled by SVMM in any suitable manner, including blocking access, creating a honeypot process, reporting violations to protection server 202, or any other suitable remedy.

SVMM 216 may also trap access to system resources 214 belong to other entities of electronic device 204. For example, a target memory page in system memory 228 may contain sample code or data belonging to a part of the kernel operation of operating system 212. SVMM 216 and SVMM security rules 222 may limit access to such a target page to only code sections that are authorized. Consequently, if a code page in system memory 228 attempts to read or alter the target memory page, and the code page belongs to a non-authorized entity of electronic device 204, such an access may be blocked by SVMM 216. Thus, SVMM 216 may act to control access to memory pages in system memory 228.

SVMM security agent 217 may be able to update SVMM security rules 222 or in-O/S security rules 220 by contacting protection server 202 for updated rules. Protection server 202 may configure the rules to be delivered to SVMM security agent 217 based upon the particular malware observed, administrator settings, or other characteristics of electronic device 204. SVMM security agent 217 may update the rules of electronic device 204 upon demand by a user, periodically, or upon the occurrence of a significant event, such as the encounter of new suspicious activities that may be linked to malware.

SVMM security agent 217 may set flags in VMCS corresponding to compound conditions. Such flags may span across different types of resources to be trapped. For example, VMCS may be configured to trap the combination of a write of a certain value to page in memory, and a subsequent move of the page to a buffer of an I/O device.

System 200 may contain one or more advantages over other implementations of anti-malware systems and software. For example, some anti-malware solutions may hook various portions of an operating system to trap and evaluate low-level operations of the applications. However, these solutions themselves may operate inside of the operating system, or in another operating system in the case of two guest operating systems. By operating within the confines of the operating system, even at a kernel-level priority, the anti-malware solution may be susceptible to malware attacks from malware also running on the same operating system, perhaps running at the same priority. If trapping or triggering upon certain events is conducted at the level of an operating system, such trapping or triggering may be phished, hooked, reverse engineered, compromised, or otherwise defeated by malware running at the same or lower priority for the operating system. For example, an anti-malware solution running on an operating system that detects and removes a malicious hook in the operating system may be observed by malware running at the same priority. In another example, an anti-malware solution registering as a filter driver to detect the operation of a certain routine may be defeated by malware that registers a malicious filter driver lower on the driver stack than the anti-malware solution. Similarly, if handling of certain trapped or triggered events occurs at the level of an operating system, malware may be able to affect the such handling. For example, the malware may undo the corrections of the anti-malware solution, or even disable the operation of the anti-malware solution.

In another example, hypervisors may work to virtualize access to system resources such as system memory 228, but may not conditionally guard access to the system resources and thus act as a security hypervisor. Such hypervisors may not have access to anti-malware rules, such as behavioral rules in security rules 222, to identify malicious activities, entities, or malicious attempted access of system resources. Such hypervisors may be running within an operating system themselves, which may be prone to malware running at the same priority level as the operating system. Such hypervisors may not be running in a "Ring0 privileged mode," because such a mode may require the hypervisor to intercept too many attempted accesses of system resources. The hypervisor may be tasked with virtualizing all aspects of a guest operating system, and the demands of such virtualization may be too expensive to simultaneously access security rules to check for malicious behavior.

Figure 3:
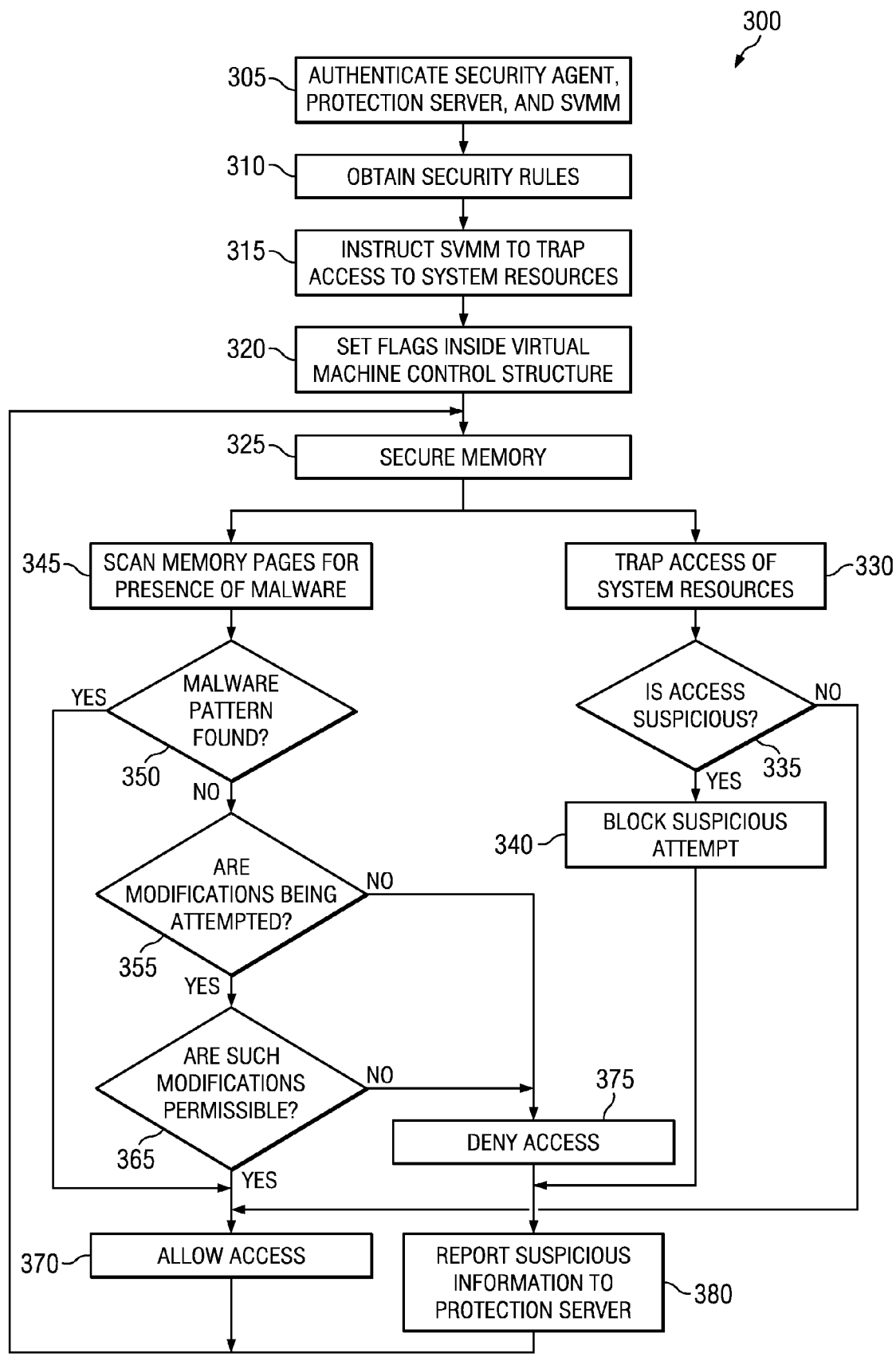
FIG. 3 is an example embodiment of a method for virtual machine monitor-based protection for an electronic device from malware.

FIG. 3 is an example embodiment of a method 300 for virtual machine monitor-based protection for an electronic device from malware. In step 305, the identity and security of a below-O/S security agent, in-O/S security agent, protection server, and virtual machine monitor may be authenticated. Such authentication may be done through any suitable method, including by locating and verifying the images of each located in memory, cryptographic hashing, or secret keys. Until step 305 is completed, operation of other steps may be withheld.

In step 310, a protection server may be accessed to determine security rules. Such security rules may be used to make decisions in steps 315-380. In step 315, the virtual machine monitor may be instructed to trap access to system resources. Such access may arise from applications, drivers, or operating systems running on the electronic device. The virtual machine monitor may be instructed as to what system resources of the electronic device are to be monitored. The virtual machine monitor may also be instructed as to what operations on the monitored system resources are to be trapped. For example, read, write or execute operations on system memory may be trapped. In another example, load or store operations on registers may be trapped. In yet another example, input or output actions on I/O devices may be trapped.

In step 320, flags corresponding to such operations to be trapped may be set inside a control structure such as a virtual machine control structure. Such trapped operations may generate a VM exit, wherein a triggered event is created upon the access of the flagged resource. In step 325, as system memory is allocated for the virtual machine monitor, the in-O/S security agent, and the below-O/S security agent, such memory may be secured against unauthorized read and write operations.

The electronic device may operate and be protected by one or more of the trapping of access of system resources in steps 330-340, scanning memory for the presence of malware in steps 345-355, and scanning memory for attempted memory modifications in steps 360-365. Each of trapping the access of system resources, scanning memory for the presence of malware, and scanning memory for attempted memory modifications may be conducted in parallel. Further, each of these may be repeated as necessary to protect the operation of the electronic device.

In step 330, the access of a system resource such as system memory, registers, or I/O devices may be trapped. The access may be trapped using a VMCS flag generating a VM exit. Such trapping may be conducted below the level of operating systems running on the electronic device. In step 335, the access may be analyzed to determine whether the requesting entity has permission to access the requested resource. Contextual information associated with the attempted access may be accessed to make such a determination. Security rules may be accessed to make such a determination. An unauthorized access may be determined to be suspicious. Such handling and determinations may be made below the level of operating systems running on the electronic device. If the access is suspicious, then in step 340, a suspicious attempted access of the system resources may be blocked. Such an attempt may be reported to the protection server. If the access is not suspicious, then the access may be allowed in step 370.

In step 345, memory pages of the electronic device may be scanned for the presence of malware. While scanning the memory of electronic device, a whitelist may be used to determine whether patterns of memory, reflecting entities resident on electronic device, are known to be safe. If a pattern of memory known to be safe is encountered, then in step 370, the memory may be allowed to continue to have access to electronic device and may remain. While scanning the memory of electronic device, a blacklist may be used to determine whether patterns of memory are known to comprise or be associated with malware. The whitelist and blacklist may be accessed by accessing the security rules. In step 350, if a pattern of memory known to be associated with malware is found, then in step 375 the pattern of memory may be denied access to electronic device by being repaired, removed, or neutralized.

In step 355, memory may be scanned to determine whether modifications to memory have been or are being attempted. Such scanning may be conducted below the level of operating systems in the electronic device. Such memory may include kernel memory, system data structures, or any other portion of memory of the electronic device that may be modified by malware. For example, a list of active threads running on the electronic device may be modified to hide the presence of a malicious process. If a modification is detected, then in step 365 it may be determined whether such modifications are permissible. Whether such modifications are permissible may be defined by the security rules. For example, the code or data page of an anti-malware process may be protected against modification or access by any other process. If the memory modification is deemed as authorized, then in step 370, the modification may be allowed. If the memory modification is determined to be unauthorized and not allowed, then in step 375, the modification may be denied.

In step 370, if an access or modification is allowed, then the access or modification may be stored for later reference. Some detections of malware may utilize information regarding past accesses or modifications to determine whether such past access and a presently detected access together comprise a malicious access of a resource.

In step 375, if a modification, access, or other operation is denied, then such an event may be reported to the protection server in step 380. Such a report may include information regarding any associated malware or suspicious behavior.

The steps of method 300 may be repeated as necessary to protect the electronic device continuously, periodically, or upon demand.

FIG. 4 is an example embodiment of a firmware-based and security-rule-based system 400 for protecting of an electronic device 404 from malware. System 400 may be an example embodiment of system 100, wherein certain elements of system 100 are implemented in firmware. The trapping operations of system 400 may be conducted below the level of operating systems of electronic device 404. System 400 may include one or more below-O/S security agents configured to trap requests, such as I/O commands, for use or access to resources of the electronic device 404. Such below-O/S security agents may be configured to manage the exchange of input and output data between devices or with the main processor of electronic device 404. Such below-O/S security agents may be embodied in firmware of components, such as device controllers, of electronic device 404 or in the firmware of electronic device 404 itself. Such firmware may reside in non-volatile memory. Such resources of electronic device 404 may include the system resources 106 of FIG. 1 or its various possible embodiments, or resources coupled to or embodied by devices in system 400. System 400 may include one or more below-O/S security agents configured to trap attempted use of access to the resources of the electronic device 404, generate a triggered event corresponding to the attempt, consult security rules regarding the triggered event, and take corrective action if necessary regarding the attempt.

In one embodiment, the below-O/S security agents of system 400 may be embodied only in firmware of components of electronic device 404, as described below and in the discussions of FIG. 5. In another embodiment, the below-O/S security agents of system 400 may be embodied in firmware of electronic device 404 itself such as main PC firmware 428. In such an embodiment, main PC firmware 428 may be implemented on a motherboard of electronic device 404. In yet another embodiment, the below-O/S security agents of system 400 may also be embodied in below-O/S agent 450. Below-O/S agent 450 may be implemented in any suitable manner for providing triggering of access of resources, or handling of such triggers, below the level of operating systems of electronic device 404 such as operating system 412. For example, below-O/S agent 450 may be an embodiment of SVMM 216 or SVMM security agent 217 of FIG. 2. Below-O/S agent 450 may include security rules 422.

Electronic device 404 may include one or more components for conducting input and output operations from electronic device 404. Electronic device 404 may include any suitable number of such components and types of components. Such components may be implemented by devices with their own processor, memory, and software embedded in firmware. An example embodiment of such a component may be the I/O device 502 of FIG. 5.

Electronic device 404 may include, for example, display 424 and storage 426. Each such component 424, 426 may include firmware 430, 432. Firmware 430, 432 may each embody the firmware 504 of FIG. 5. As described above, each such component 424, 426 may include a firmware-based security agent, such as firmware security agent 440, 442. Firmware security agents 440, 442 may each partially or fully embody the firmware security agent 516 of FIG. 5. In one embodiment, each of firmware security agents 440, 442 may be implemented in their respective firmware 430, 432. In another embodiment, each of firmware security agents 440, 442 may be implemented outside of firmware 430, 432 in each of their respective components 424, 426. Each of such device firmware security agents 440, 442 may be communicatively coupled to a respective set of security rules 434, 436. Each such security rules 434, 436 may embody the security rules 518 of FIG. 5.

Electronic device 404 may include firmware. In one embodiment, electronic device 404 may include main PC firmware 428. Main PC firmware 428 may be embodied by a Basic Input/Output System ("BIOS"). In one embodiment, main PC firmware 428 may be configured as the BIOS of a computer. In such cases, main PC firmware 428 may be configured to initialize the operation of the processor 406 of the computer. Main PC firmware 428 may be configured to allow the main processor 406 to communicate with I/O devices such as display 424 and storage 426. In such embodiments, the computer may also contain a programmable I/O controller, which may be programmed by the firmware or BIOS, and communicates with the firmware of the I/O devices such as 424 and storage 426.

Main PC firmware 428 may include a below-O/S security agent. In one embodiment, main PC firmware 428 may include a PC firmware security agent 444. PC firmware security agent 444 may be configured to intercept requests of system resources 414. To accomplish such functionality, PC firmware security agent 444 may embody fully or in part the functionality of the SVMM security agent 217 or SVMM 216 of FIG. 2, and/or firmware security agent 516 of FIG. 5. PC firmware security agent 444 may embody the functionality of SVMM security agent 217 or SVMM 216 of FIG. 2 to accomplish below-O/S triggering and handling of access to system resources 414, verification and validation of below-O/S agents and in-O/S security agents such as in-O/S security agent 418, and distribution of security rules such as security rules 420, 422. PC firmware security agent 444 may embody the functionality of firmware security agent 516 of FIG. 5 to accomplish below-O/S triggering and handling in firmware, updating of security rules, and to evaluate IN and OUT commands sent to portions of electronic device 404.

Electronic device 404 may include security rules 438. Security rules 438 may be an example embodiment of the security rules 114 of FIG. 1. In one embodiment, security rules 438 may reside in main PC firmware 428. In another embodiment, security rules 438 may reside outside main PC firmware 428, and PC firmware security agent 444 may be coupled to security rules 438.

The security agents of system 400 may be configured to work together to prevent malware and its malicious operations. Attempted access of resources may be trapped, and subsequent events triggered for handling in firmware security agents in devices such as display 424 or storage 426, or in main PC firmware 428. The firmware security agents in such devices or firmware may be configured to handle the triggered events or to pass the triggered event to another security agent for handling. Due to limited execution and update capabilities, some firmware security agents may be limited in handling their own triggered events, and thus it may be advantageous to pass such triggered events to other security agents. The security agents to which firmware security agents may pass events may include, for example, in-O/S security agents such as in-O/S security agent 418, a below-O/S security agent such as below-O/S security agent 450, or another firmware security agent such as PC firmware security agent 444. These other security agents may be configured to receive the triggered event, consult security rules, contextual information, or permissions, and send back a resulting action to be implemented.

Accordingly, while FIG. 4 illustrates an example number of elements for conducting below-O/S triggering and handling by firmware-based security agents, more or less elements may be used in various embodiments. As more or less elements are used, the functionality of each element and of system 400 may change accordingly. In one embodiment, the security agents of system 400 below the level of the operating system 412 may be limited to one or more in-O/S security agents 418 and firmware security agents 440, 442. In such an example, the firmware security agents 440, 442 may rely upon protection server 402 for updates to security rules 434, 436. Firmware security agents 440, 442 may rely upon in-O/S security agent 418 for updates or handling of triggered events, but the operation of the in-O/S security agent 418 may be less secure unless a below-O/S security agent validates in-O/S security agent. Firmware security agents 440, 442 may provide triggering based upon firmware security rules 434 established at installation, manufacture, or configuration. Such security rules may be relatively static. In such a case, firmware security agents 440, 442 may be configured to provide relatively basic event triggering, with little analysis. Such firmware security agents 440, 442 may nonetheless be useful, as such triggering is accomplished below the operating systems of electronic device 404, thus better detecting some malicious or suspicious operations.

In another embodiment, the security agents of system 400 may include either PC firmware security agent 444 or below-O/S agent 450, but not both. In such a case, the functionality of PC firmware security agent 444 may be implemented by below-O/S agent 450, and vice-versa. Either PC firmware agent 444 or below-O/S agent 450 may be coupled to protection server 402 and configured to obtain information such as security rules 420, 422, 438, 434, 436, and to share such information with other security agents in system 400. Such security rules may be tailored to each respective security agent for the purposes of communication, update, or storage expense. Either PC firmware agent 444 or below-O/S agent 450 may be configured to receive triggered events from other security agents such as firmware security agents 440, 442, apply security rules and other information, and take corrective action such as sending a resulting event to the firmware security agents 440, 442 or information to protection server 402. Either PC firmware agent 444 or below-O/S agent 450 may be configured to trap attempted accesses of system resources 414. Either PC firmware agent 444 or below-O/S agent 450 may be configured to communicate with in-O/S security agent 418 to determine the context of triggered events. If more than one in-O/S security agent 418 is present in system 400, each in-O/S security agent 418 may be configured to perform a designated portion of the trapping, validating, or other tasks associated with in-O/S security agent 418. Such portions may be defined by below-operating-system security agents. For example, one in-O/S security agent 418 may validate or investigate MOV instructions, while another in-O/S security agent 418 may validate or investigate JMP instructions.

In yet another embodiment, security agents of system 400 may include both PC firmware security agent 444 and below-O/S agent 450. Nevertheless in such an embodiment, some or all of the functionality of PC firmware security agent 444 may be implemented by below-O/S agent 450, and vice-versa. The delineation of tasks between PC firmware security agent 444 and below-O/S agent 450 may take into account several factors. For example, the operation of a security agent within firmware such as PC firmware security agent 444 may be more secure than the operation of another below-O/S agent 450. However, updating the security rules and the software of below-O/S agent 450 may be simpler and faster than in a PC firmware security agent 444.

In still yet another embodiment, one or more firmware security agents 440, 442 may reside on system 400 independent of a PC firmware security agent 444 or a below-operating system agent 422. In such an example, the firmware security agents 440, 442 may validate the instance of in-operating system security agent 418.

Each of firmware security agents 440, 442, 444 may be configured to reside within firmware logic sufficient to be able to monitor and control firmware logic for external communication. Firmware security agents 440, 442, 444 may thus be configured to trap and/or the communication of specific information or with specific other entities. Firmware security agents 440, 442, 444 may be configured to determine the operation request received, as well as the data to be sent or received. Furthermore, firmware security agents 440, 442, 444 may be configured to control the data to be sent or received, and may be configured to cause additional operations on the data, such as encryption, compression, embedding of watermarks, or decoding of watermarks in the data. Other security agents of system 400 in communication with firmware security agents 440, 442, 444 may be configured to embed watermarks in data to be trapped by firmware security agents 440, 442, 444, or to decode watermarks put into data by firmware security agents 440, 442, 444.

Communication with a firmware security agent 440, 442 or PC firmware security agent 444 may be conducted, for example, through programmable input-output interrupts or programmable input-output registers. Such interrupts or registers may be defined and provided by the maker of the firmware or device in which the firmware security agent 440, 442, 444 resides.

One or more of the below-O/S security agents of system 400 may be configured to serve as a main security agent to coordinate the anti-malware activities of the firmware-based security agents of electronic device 404. In one embodiment, PC firmware security agent 444 may be configured as the main security agent of system 400. In another embodiment, below-O/S agent 450 may be configured to serve as the main security agent. The security agent may be configured to handle triggered events from firmware security agents 440, 442. The main security agent may be configured to validate the operation of firmware security agents 440, 442, as well as other security agents such as in-O/S security agent 418. The main security agent may be configured to notify other security agents about whether one of the security agents has noticed suspicious behavior or detected malware, whether the system 400 is under a malware attack, or whether an administrator of system 400 has changed preferences or settings affecting security. The main security agent may share information about the attack with the other security agents of system 400.

By trapping access to resources of system 400 and/or handling the resulting triggered events below the level of the operating systems of system 400, system 400 may provide increased security against malware. Operation of a security agent in firmware may reduce the opportunity for malware to affect the operation of the security agent. Trapping operations in firmware or at the device level may reduce the ability of malware to spoof or phish elements of system 400 in order to disguise its operation. For example, no matter what portions of operating system 412 are compromised by malware, a request to a component 424, 426 might not be disguised from the device itself.

Figure 5:
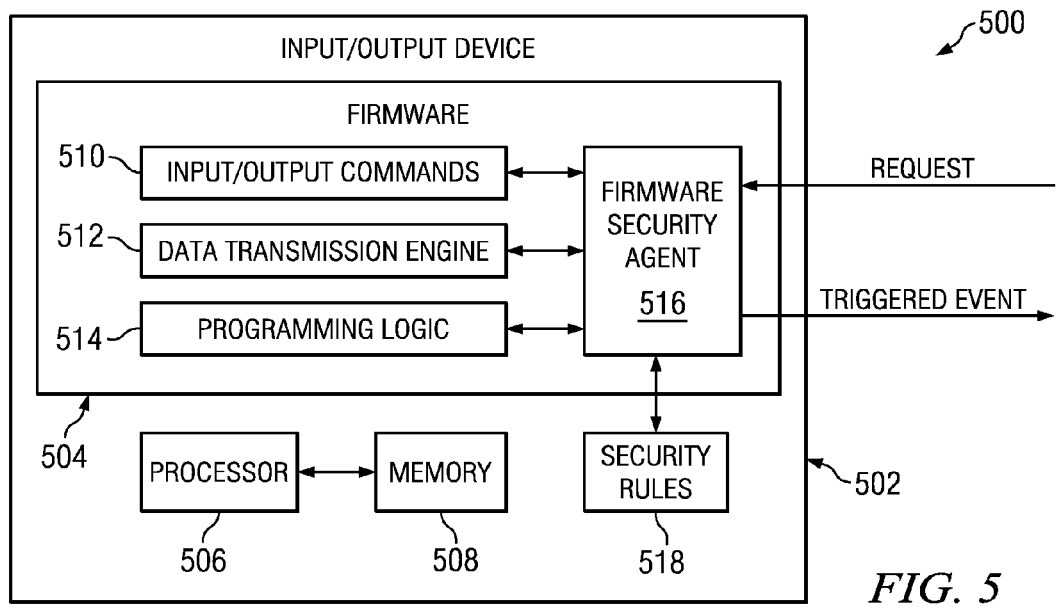
FIG. 5 is a more detailed view of an example embodiment of a firmware-based solution for protecting an electronic device from malware.

FIG. 5 is a more detailed view of an example embodiment of a firmware-based solution for protecting an electronic device from malware. A device such as I/O device 502 may be configured to receive and trap requests for use or access to resources of the device. In one embodiment, I/O device 502 may be configured to process such trapped requests to determine whether the requests indicate a presence of malware. In another embodiment, I/O device 502 may be configured to pass such a trapped request as a triggered event to another portion of a system in which I/O device resides. Such another portion of the system may include a below-O/S security agent. I/O device 502 may include firmware 504 and a processor 506 coupled to a memory 508, wherein the firmware 504 may include instructions that reside in memory 508 for execution by processor 506.

I/O device 502 may include any suitable portion of an electronic device for controlling access to a resource for the electronic device. In one embodiment, I/O device 502 may embody some or all of a peripheral for an electronic device. I/O device 502 may be embodied by, for example, a display controller card, computer bus controller, cache device, I/O controller device, disk controller, memory device, network controller, motherboard, or keyboard controller. I/O device 502 may reside in an electronic device. In one embodiment, I/O device 502 may be coupled to physical components. Such physical components may include, as just examples, a display, a computer bus, memory, I/O controllers, a disk, a network card, or a keyboard. In another embodiment, I/O device 502 may reside separately from the coupled physical components. For example, a keyboard controller may be coupled through a serial interface with a keyboard. In such embodiments, I/O device 502 may reside in an electronic device while such physical components may be communicatively coupled to the electronic device but reside outside the electronic device.

Firmware 504 may be configured to control the operation of I/O device 502. Firmware 504 may include a below-O/S security agent 516 configured to trap requests for resources, operate below the level of operating systems in I/O device 502 or in systems in which I/O device 502 resides. Below-O/S security agent 516 may be configured to handle events resulting from the trapped requests to determine whether to allow, deny, or otherwise handle the request, in order to protect I/O device 502 or systems in which I/O device 502 resides from malware. In one embodiment, firmware 504 may include a firmware security agent 516. Firmware security agent 516 may incorporate some or all of the functionality of SVMM 216 or SVMM security agent 217 of FIG. 2, but is embodied in firmware 504. In such a case, the functionality of SVMM 216 or SVMM security agent 217, such as trapping access to resources and/or handling the trapped request, may be conducted by firmware security agent 516. In one embodiment, firmware security agent 516 may be configured to reside in firmware 504.

Firmware 504 may include I/O commands 510, a data transmission engine 512, and programming logic 514. I/O commands 510 may include instructions for sending or receiving information to the device. Such commands may include variations of IN or OUT commands. The execution of I/O commands 510 may be operable to perform the desired actions of the device. Requests received by the device may be translated into I/O commands. Trapping or triggering upon particular requests for resources may be accomplished by trapping or triggering upon the associated I/O commands 510. Data transmission engine 512 may be configured to handle the communication of requests to the device, and subsequent responses. Data transmission engine 512 may be coupled to the processor 506 and to a programmable I/O controller over an I/O bus, over which I/O commands 510 and data are exchanged. Programmable logic 514 may be configured to provide instructions for firmware 504 to operate I/O commands 510 and data transmission engine 512. The programming logic 514 may be loaded into a processor such as processor 506.

Firmware security agent 516 may be configured to modify the operation of programming logic 514 to detect attempted malicious operations. Firmware security agent 516 may also be configured to monitor the communication of requests to the device to intercept requests of I/O device 502 through data transmission engine 512 and to determine whether such requests are malicious. Firmware security agent 516 may include a control structure in which flags may be set corresponding to operations that are to be trapped. In one embodiment, flags may be set in the structure according to memory address of commands which are to be trapped. Firmware security agent 516 may be configured to set flags for the interception of requests to I/O device 502. Such flags may correspond to, for example, specific commands of I/O commands 510 or such specific commands in combination with specific parameters. Such flags may be configured to intercept particular requests or categories of requests. Upon the triggering of a particular flag corresponding to a trapped attempted operation of an I/O command 510, firmware security agent 516 may be configured to process the event and take a resulting action, pass resulting information to another security agent through the data transmission engine 512, or pass the triggered event through data transmission engine 512.

I/O device 502 may also include security rules 518. Security rules 518 may implement some or all of security rules 222 of FIG. 2. Security rules 518 may be implemented in memory 508. In one embodiment, security rules 518 may reside outside of firmware 504. In another embodiment, security rules 518 may reside inside of firmware 504. Firmware security agent 516 may be communicatively coupled to security rules 518 and configured to access security rules 518 to determine what flags to set in firmware 504 to trap particular requests or categories of requests made to I/O device 502 for access to its resources. For example, firmware security agent 516 may be configured to access security rules 518 to determine whether a triggered event is malicious or not. In one embodiment, security rules 518 may contain instructions for firmware security agent 516 to process the triggered event. Firmware security agent 516 may be configured to use such instructions to determine whether to allow or deny the request, or to take another corrective action. In another embodiment, firmware security agent 516 may be configured to use such instructions to determine whether to report the request to another security agent. Such corrective actions may also include waiting for a response from the other security agent, which may contain instructions on whether to allow or deny the request.

In some embodiments, firmware security agent 516 may reside in firmware 504, which may make it relatively difficult to update firmware security agent 516. In addition, the ever-changing nature of malware attacks may require anti-malware solutions to be flexible. Consequently, firmware security agent 516 may use any suitable mechanism for receiving information for determining what requests to I/O device to trap, and what subsequent actions to take.

In one such embodiment, such a mechanism may include accessing security rules 518 as described above. Firmware security agent 516 may be configured to receive new and updated security rules 518 from other security agents or protection servers. To achieve flexibility, firmware security agent 516 may be configured to store security rules 518 in memory 508 separate from firmware 504, if—for example—storage of such rules in firmware 504 would make updating security rules 518 difficult.

In another such embodiment, firmware security agent 516 may be configured to update security rules 518 upon an update or flash of firmware. In such an embodiment, the flexibility of updating the requests to be trapped may be limited. Consequently, security rules 518 may be directed to very specific, protected resources. For example, security rules 518 of a disk device may include instructions to trap all write requests to the boot sector of the device. In some cases, where communication with other security agents is inexpensive, security rules 518 may include instructions to trap a wide variety of requests, wherein processing may be largely off-loaded to other security agents.

In yet another such embodiment, firmware security agent 516 may be configured to receive instructions from other security agents. In one case such instructions may take the form of parameters to function calls of the firmware 504 or firmware security agent 516. For example, another security agent may call a function of firmware security agent 516 named "UpdateRule(trigger, action)" wherein a request to trap for is detailed in trigger and a subsequent action to take is detailed in action. Firmware security agent 516 may thus update security rules 518 by receiving instructions concerning updates to security rules. In another case, another security agent may write updates for security rules 518 to a reserved memory space of device 502 which may be subsequently accessed by firmware security agent 516. The instructions to be received from other security agents may also direct firmware security agent 516 to use specific sets of security rules 518. For example, during a time-critical operation firmware security agent 516 may be configured by such instructions to use a minimal, core set of security rules 518. If I/O device 502 is a disk device, such a minimal, core set of rules may include instructions to trap access to the boot sector of the disk. In another example, if time-critical operations are not being presently conducted, firmware security agent 516 may be configured by such instructions to employ rules from security rules 518 to trap a much broader range of access attempts and to send corresponding events to other security agents for handling.

Firmware security agent 516 may be configured to control I/O commands 510, scan content or data received or to be sent, and apply access control over the commands and content. Firmware security agent 516 may be implemented as an extension of existing device firmware.

The implementation of firmware security agents 516 may depend upon the type of device 502. For example, display devices and disk devices may trigger on different kinds of content or attempted commands. The creation of firmware security agents 516 in various devices may be tailored to the specific kind of interface with the device. For example, if device 502 is configured to communicate through a Serial Advanced Technology Attachment ("SATA") bus, it may be equipped with firmware security agents 516 similar to other devices communicating through SATA busses. Firmware security agent 516 may be customized to support the architecture of device 502, support an external bus I/O of device 502, or other interfaces of device 502.

Firmware security agent 516 may be configured to trap attempted access of resources in device 502 by intercepting particular read and write commands, which may make up part of a request of a resource. A read or write command may be intercepted, evaluated, and blocked or allowed based on a rule such as one in security rules 518. Security rules 518 for a firmware security agent 516 may include any suitable rules for detecting evidence of malware. Such a read and write command may be the result of, for example, a function call to a driver or an interrupt.

For example, security rules 518 may include rules for firmware security agent 516 to scan data to be written to the device. The content of the data, or a hash of the data, may be evaluated to determine whether the data corresponds to malware data or code. Such evaluations may be made by comparing the content against data or signatures in a whitelist or blacklist. Successive writes may have to be evaluated together to properly evaluate the full scope of the data or content to be written, in order to correctly identify the contents or data as malware or not. For example, a file may be written to in repeated successive calls to device 502. The data to be written may be queued such that a proper scan of the contents of the write command may be evaluated.

In another example, security rules 518 may include rules for firmware security agent 516 to scan existing data in the device. The device 502 may contain content received from outside the system such as in a network card. The contents of the received information, as it resides with the device 502, may be scanned for evidence of malware. Firmware security agent 516 may make evaluations by comparing the content against data or signatures in a whitelist or blacklist.

In yet another example, security rules 518 may include rules for firmware security agent 516 to evaluate a command based upon time or permissions. A device 502 such as a network device or disk may be protected from reads or writes during times when no legitimate activity should be conducted. For example, certain malware may attack disk drives during boot. Thus, firmware security agent 516 may prevent any writes to the device during the time that the disk is being booted. Similarly, permissions may be set by an administrator of the system in which device 502 resides about when or how devices or systems can be used. For example, an administrator of the system in which device 502 resides may set a device to be unusable outside of business hours. A network device on the system may have no legitimate purpose to transport activity outside of business hours, and thus based on the permissions in security rules 518, reads and writes of the network device may be blocked by firmware security agent 516. Such use may block, for example, deliberate activity by an actual user of the device, or by malware using the network device to conduct a denial-of-service attack.

In still yet another example, security rules 518 may include rules for firmware security agent 516 to evaluate a command based upon parameters used with the I/O commands. Such parameters may include, for example, the address to which a write command will write. Security rules 518 may include a rule indicating that a particular portion of a disk device is read-only. Thus, firmware security agent 516 may examine the parameters associated with an OUT command for writing data to the disk to determine the address to which the data will be written, and block the command if the attempted write is to a portion of disk that is write-protected by a rule in security rules 518. Firmware security agent 516 may consider such a parameter in conjunction with other bases such as content or the entity which originated the call. For example, scanning the content of data to be written may be expensive, and accordingly a security rule 518 may configure firmware security agent 516 to scan data to be written only if data is to be written to certain ranges of addresses. In another example, security rules such as security rule 518 may only allow certain calling entities to write or read from certain portions of the disk device. Thus, firmware security agent 516 may trap the attempted write or read and not allow the attempt until the identity of the calling entity may be securely determined. Such a determination may be made by evaluating information in the parameters used to call the device function, as some such functions may identify the calling device driver or application. In such a case, firmware security agent 516 may take any appropriate steps to determine the validity of the call. In one embodiment, firmware security agent 516 may consult a whitelist or blacklist in security rules 518 to determine whether the calling entity is authorized to make such a call. In another embodiment, firmware security agent 516 may communicate with other security agents in the system containing device 502 to determine whether the calling application or device driver is valid. Such other security agents may have validated the operation of the calling application or device driver, or may communicate with in-O/S security agents that may have verified such operations. In yet another example, the existing driver calls to a device such as device 502 may not identify the calling entity. Accordingly, no parameters may be available. In such an example, firmware security agent 516 may be configured to pass the triggered event or otherwise consult with other security agents in the system to determine the context of the call which resulted in the attempted access. Such other security agents may be able to provide suitable context for the call to determine whether an authorized entity made the attempt.

In a further example, security rules 518 may include rules for firmware security agent 516 to evaluate a command based on information from the environment in which device 502 resides. Other security agents in the system may have detected a malware infection that is difficult to remove, or may require direct intervention from an administrator to clean. The other security agents in the system may have observed suspicious behavior, and the nature of the behavior has not yet been completely analyzed. In such a case, firmware security agent 516 may receive notification of such an existing threat from the other security agents. Security rules 518 may thus dictate preventative actions for firmware security agent 516 depending upon the type of infection. For example, firmware security agent 516 in a keyboard device may receive notification that evidence of a particular type of malware known for keylogging has been detected but cannot yet be removed. Security rules 518 may thus dictate that firmware security agent 516 disallow all reads and writes from the keyboard device to prevent a compromise of the information being communicated with the keyboard.

Firmware security agents 516 may protect the I/O of different types of devices in different ways. For example, a firmware security agent 516 of a display device may shut down portions of the display, depending upon the malware threat. Firmware security agent 516 may block the display of certain patterns, causing a watermark to be produced on the screen. Firmware security agent 516 may trap the attempted display of a particular pattern. Firmware security agent 516 may intercept attempted reads of information from the device in order to prevent screen-captures.

In another example, a firmware security agent 516 for a keyboard device may optionally encode or decode its results in communication with the rest of the system. Such encryption may be set by the firmware security agent 516 upon notification that a malware threat such as a keylogger is present.

In yet another example, a firmware security agent 516 for a network device may trap based upon source Internet Protocol ("IP") address, source port number, data to be sent or received, destination IP address, or destination port number. Once such an attempt to use the network device is trapped, firmware security agent 516 may scan the data payload of packets to be sent or received for evidence of malware. In one embodiment, such data payloads may be sent to another security agent or a protection server, wherein the contents may be scanned for evidence of malware. The contents of the data payload may be encrypted such that a packet sniffer may not successfully intercept the contents. Attempted operations on the network device may be trapped due to security risks associated with communicating with unsafe network destinations, wherein network communication with a malicious destination may compromise the security of the system in which device 502 resides. Attempted operations may be trapped due to the sensitive nature of particular sets of data, such as a banking website. In such a case, upon receipt of data from such a website, the data may be encrypted by firmware security agent 516 before being passed to another security agent or to the calling entity. Such encryption may prevent a packet sniffer or filter in the system of device 502 from successfully intercepting the information.

The specific I/O commands 510 to be trapped may depend on the specific device and the operations of that device. Thus, the maker of device 502 may decide how to configure the operation of a firmware security agent 516 for a particular device 502. The maker of device 502 may decide how much to expose the functionality of device 502 to other security agents. For example, device 502 may be configured to require validation with other security agents before handing off triggered events to such security agents.

In operation, one or more below-O/S security agents may be running in the firmware of system 400 or of the components of system 400. Firmware security agent 440 may be operating in display 424, firmware security agent 442 may be operating in storage 426, and PC firmware security agent 444 may be operating in main PC firmware 408. Below-O/S agent 450 and in-O/S agent 412 may be operating in system 400. Each security agent may communicate with one or more other security agents in system 400. Each such security agent may validate the instance of another security agent before accepting communication. Protection server 402 may communicate with one or more of the security agents after validating the security agent.

PC firmware security agent 444 or below-O/S agent may be designated as a main security agent. The main security agent may communicate with protection server 402 to determine security rules. The main security agent may store the security rules locally to the main security agent. The main security agent may distribute security rules to each of the security agents, wherein the security rules may be stored locally to the security agent. The security rules may be customized for the type, make, or model of the device to reduce the expense of a large set of security rules.

Upon receipt of security rules such as rules 434, a device such as display 424 may set flags in a control structure within the device firmware 430 corresponding to operations of the device that are to be trapped. Similar tasks may be performed by storage 426.

An application 410 or driver 411 may try to access a device such as display 424 or storage 426. Application or driver 411 may make such an attempt by calling the kernel of operating system 412, which in turn may call operating system device drivers, which in turn may send the request to the component 424, 426.

The request may arrive at a device such as storage 426. Firmware security agent 442 running on the device may filter such a request through monitoring data transmission engine 412 of the storage 426 with a control structure. The request may take the form of an I/O command 510 made available by the storage 426. If the request matches any flags that have been set by firmware security agent 442, the request may be trapped and a resulting event may be triggered. Firmware security agent 442 may consult security rules 436 to determine how to handle the triggered event.

In one embodiment, the triggered event may be handled by firmware security agent 442, and based upon the information available such as associated data, the command, contextual information, time, or environmental information, corrective action many be taken. Such corrective action may include allowing or denying the request, removing malicious code or data, or encrypting data to be transferred. Other corrective action may include sending information to be passed to protection server 402 concerning the trapped event. Firmware security agent 442 may inform other security agents about the status of the trapped event, so that other such agents may also take corrective action after consulting their respective security rules. For example, if firmware security agent 442 detects a malware attack of unknown origin, firmware security agent 440 may lock out additional access to the display 424.

In another embodiment, the triggered event may be transferred to another security agent for handling, such as in-O/S security agent 418, PC firmware security agent 444, or below-O/S agent 450. The receiving security agent, for example, PC firmware security agent, 444, may handle the triggered event by consulting security rules 438. Based upon the information available such as the data, command, contextual information, time, or environmental information, the request represented by the triggered event may be allowed or denied by PC firmware security agent 444. PC firmware security agent 444 may communicate with in-O/S security agent 418 to determine contextual information concerning the attempted access of resources. PC firmware security agent 444 may communicate with protection server 402 for additional information on how to handle the triggered event. PC firmware security agent 444 may send instructions for resulting action back to the originating firmware security agent 442. PC firmware security agent 444 may send information concerning the triggered event to protection server 402 to be analyzed or recorded. Such analysis or recording may be conducted when the malicious nature of a triggered event is unknown. PC firmware security agent 444 may notify the security agents of system 400 that a particular kind of malware has been detected, a kind of suspicious activity has been detected, or that the system 400 is under a malware attack.

Upon receipt of information from PC firmware security agent 444, firmware security agent 440 may take corrective action. Such action may include allowing or denying the attempted access, encrypting data to be transferred, or removing malicious code or data.

Figure 6:
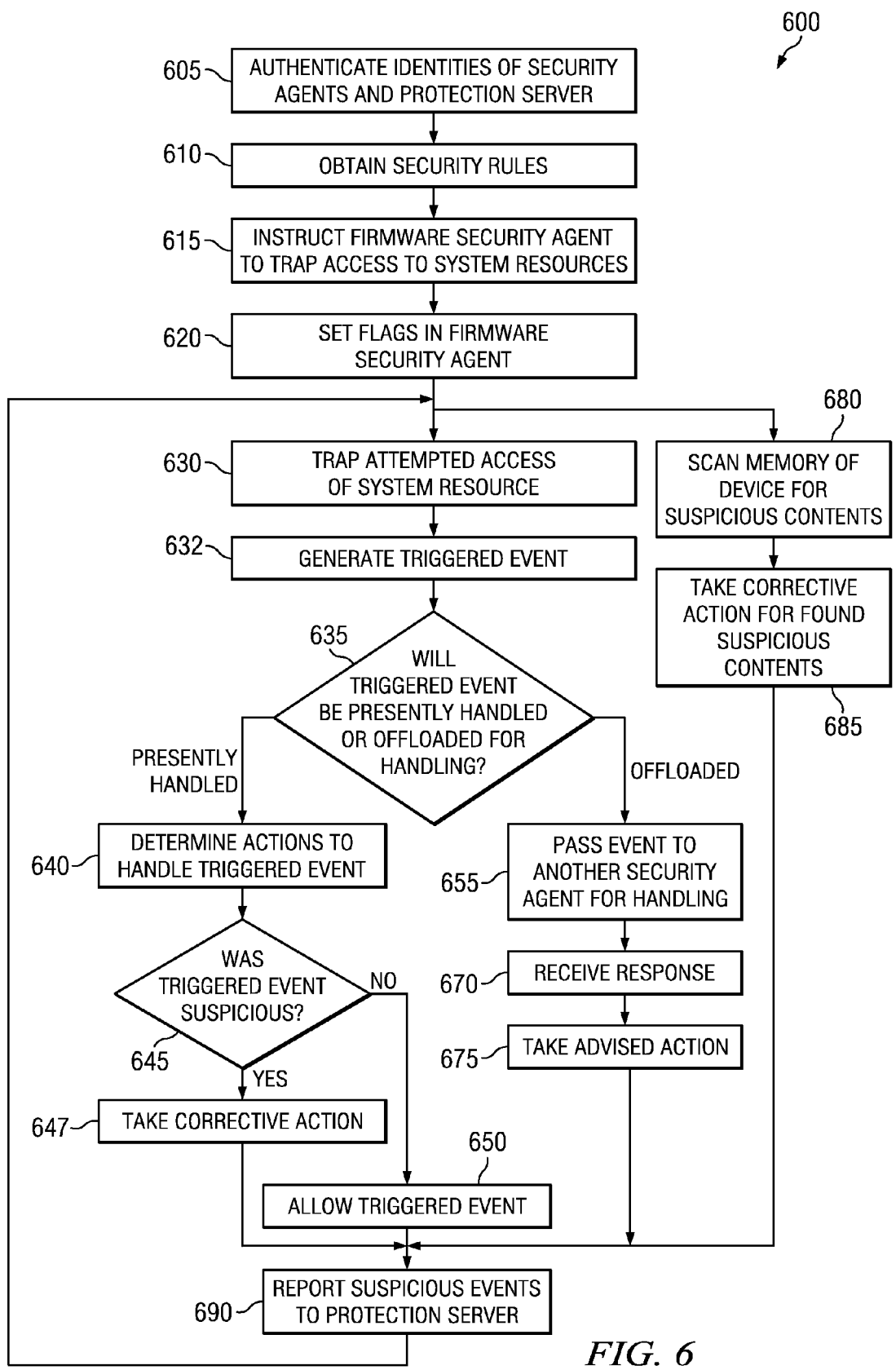
FIG. 6 is an example embodiment of a method for firmware-based protection for an electronic device from malware.

FIG. 6 is an example embodiment of a method 600 for firmware-based configurable protection for an electronic device from malware. In step 605, the identity and security of a below-O/S security agent, in-O/S security agent, protection server, and firmware security agent may be authenticated. Such authentication may be done through any suitable method, including by locating and verifying the images of each located in memory, cryptographic hashing, or secret keys. Until step 605 is completed, operation of other steps may be withheld.

In step 610, a protection server may be accessed to determine security rules. Such security rules may be used to make decisions in the following steps. In step 615, the firmware security agent may be instructed to trap access to system resources. Such access may arise from applications, drivers, or operating systems running on the electronic device. The firmware security agent may be instructed as to what system resources of the electronic device are to be monitored. The firmware security agent may also be instructed as to what operations on the monitored system resources are to be trapped. For example, read and write commands to a device on which the firmware security agent is running may be identified to be trapped. In step 620, flags corresponding to such operations to be trapped may be set in a control structure. Such trapped operations may generate a triggered event.

The electronic device may operate and be protected by one or more of the trapping of access of system resources in steps 630-675, or scanning data for the presence of malware in steps 680-685. Each of trapping the access of system resources and scanning data for the presence of malware may be conducted in parallel. Further, each of these may be repeated as necessary to protect the operation of the electronic device.

In step 630, the access of a system resource such as system memory, registers, or I/O devices may be trapped. Such trapping may be conducted below the level of operating systems running on the electronic device. Such trapping may be conducted within firmware. In step 632, a resulting triggered event may be generated associated with the trapped attempt, as well as any associated information. In step 635, it may be determined whether the triggered event should be presently handled or passed to another security agent for handling. Such a determination may be made by accessing one or more security rules. If the triggered event should be presently handled, then in step 640 the security rules may be accessed to determine what actions to take based on the trapped event and other information, such as associated data, the command, contextual information, time, or environmental information. For example, the data to be written or read may be scanned for sensitive or malicious content; the calling entity may be identified to see if the entity has permission; the parameters used to call the command may be examined; or alerts about malware in the system from other security agents may be referenced.

In step 642 it may be determined whether the attempted access was suspicious or not. If accessing the security rules in combination with information associated with the attempted access yields a determination that the attempted access is not suspicious, then in step 645 the attempt may be allowed. If it is determined that such an attempt is suspicious, then in step 647 corrective action may be taken. Such corrective action may include removing malicious content from data, informing a protection server or other security agents about the presence of a malicious attempt, disallowing the attempted access, or encrypting data to be transferred. If the attempt is not suspicious, then in step 650 the triggered event may be allowed.

In step 655, if it is determined that another security agent is to handle the triggered event, the triggered event is passed to another security agent for handling. In step 670, a response from the security agent may be received indicating appropriate action to be taken. In step 675, such action may be taken, such as corrective action or allowing the operation of the triggered event.

In step 680, memory of a device may be scanned for the presence of malware. Such memory may contain contents that have arrived from another entity, such as another network card or the results of a previously executed file read. If the contents of the memory are known to be malicious, suspicious, or unknown, then in step 685, the contents of the memory may be removed.

In step 690, if an attempted access was denied, or if suspicious contents were found, then such an event may be reported to another security agent or a protection server. Such a report may include information regarding any associated malware or suspicious behavior.

The steps of method 600 may be repeated as necessary to protect the electronic device continuously, periodically, or upon demand.

Figure 7:
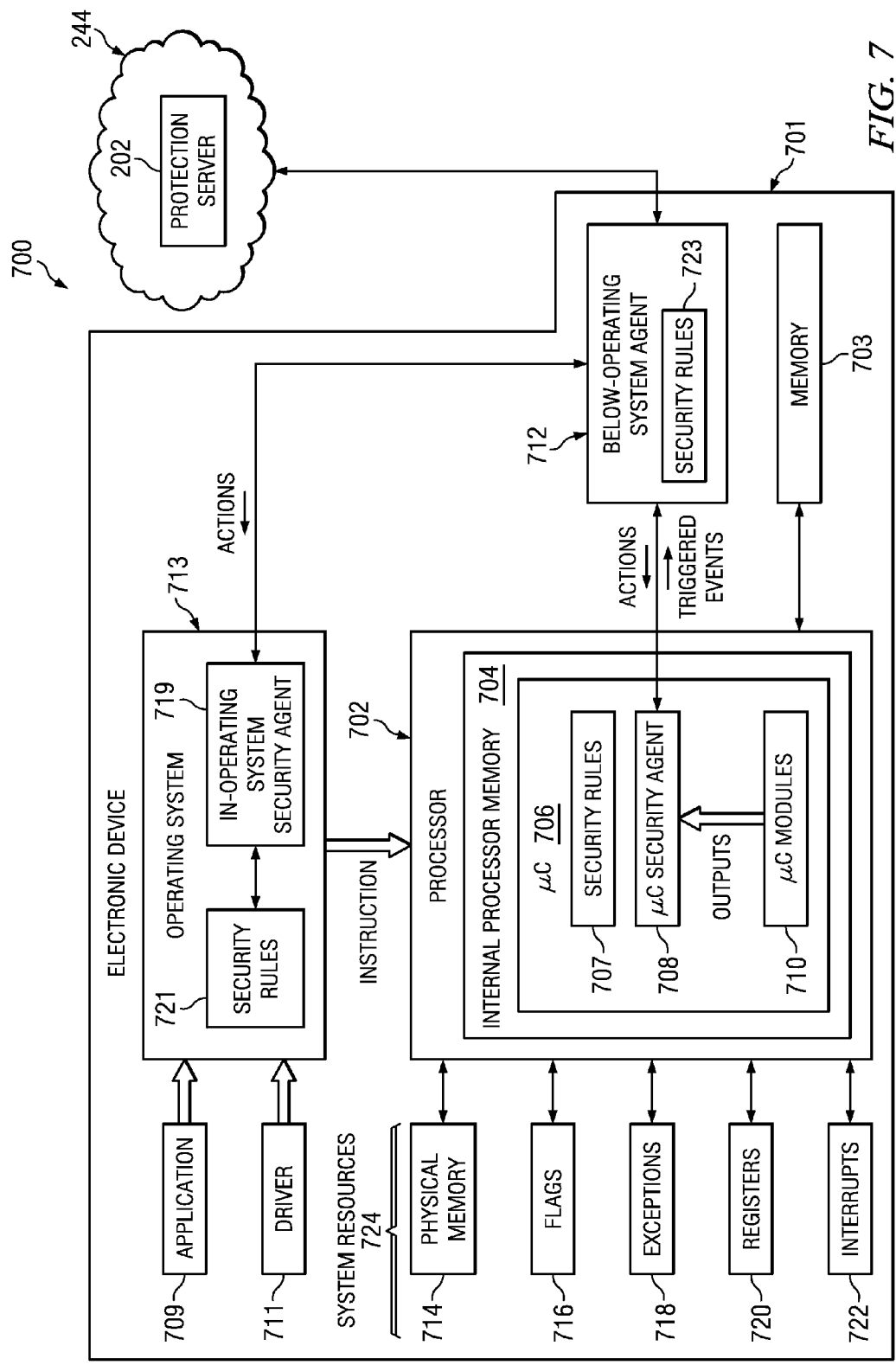
FIG. 7 is an example embodiment of a microcode-based system for protection of an electronic device against malware.

FIG. 7 is an example embodiment of a microcode-based system 700 for protection of an electronic device 204 against malware. System 700 may be an example embodiment of system 100, implementing certain elements of system 100 in a microcode. The trapping operations of system 700 may be conducted below the operating systems of electronic device 701. System 700 may include one or more below-O/S security agents configured to trap attempted use of access to the resources of the electronic device 204, generate a triggered event corresponding to the attempt, consult security rules regarding the triggered event, and take corrective action if necessary regarding the attempt. Such below-O/S security agents may be configured to intercept information generated from resources of the electronic device 701, generate a triggered event corresponding to the generation, consult security rules regarding the triggered event, and take corrective action if necessary regarding the attempt. One or more of such below-O/S security agents may be implemented fully or in part in a processor of system 700. The below-O/S security agents may be implemented fully or in part in microcode ("μC") of such a processor. The system resources 724 of electronic device 701 that may be protected by system 700 may include, for example, resources similar to the system resources 224 of FIG. 2, physical memory 714, processor flags 716, exceptions 718, registers 720, or interrupts 722.

System 700 may include a microcode-based below-O/S security agent such as microcode security agent 708. Microcode security agent 708 may reside within the microcode 708 of a processor such as processor 704. In one embodiment, microcode security agent 708 may be configured to trap attempted access of system resources 724 made by portions of system 700 such as application 710, driver 711, or operating system 713. Microcode security agent 708 may be configured to create a triggered event based on such an attempted access of system resources 724. For example, operating system 713 may attempt to launch a program by attempting to execute a segment of code in an address in physical memory 714. In another example, operating system 713 may attempt to read or write an address in physical memory 714. Although physical memory 714 is shown, microcode security agent may be configured to trap an attempt to access virtual memory. In another embodiment, microcode security agent 708 may be configured to trap attempted communication of information from other portions of processor 702, such as microcode modules 710. Microcode modules 710 may include other portions of processor 702 configured to conduct the operation of processor 702 to execute instructions. Such attempted communication of information may include the results of operations from system resources 724. For example, during the processing of code, and divide-by-zero operation may be intercepted by a microcode module 710 and may attempt to generate and communicate an exception 718.

Microcode 706 may include hardware-level instructions for carrying out higher-level instructions received from elements of system 700 such as operating system 713. Microcode 706 may translate such higher-level instructions into circuit-level instructions to be executed by processor 702. Microcode 706 may be specific to the electronic circuitry or type of processor embodied by processor 702. Microcode 706 may be configured with the specific contents of microcode 706 upon the creation of processor 702. The ability to update or reprogram microcode 706 on processor 702 may be limited. Microcode 706 may reside in an internal processor memory 704. Internal processor memory 704 may be a high-speed memory separate from the system memory of system 700, such as memory 703. In one embodiment, internal processor memory 704 may be read-only-memory. In another embodiment, microcode 706 may reside in a programmable logic array included in internal processor memory 704. In yet another embodiment, internal processor memory 704 may include or be implemented as a memory store or a control store. In such an embodiment, internal processor memory 704 may be implemented partially or in full by static-random-access-memory or flash memory. In such an embodiment, microcode 706 may be configured to be loaded into the memory store from some other storage medium, such as memory 703, as part of the initialization of the processor 702, and may be configured to be updated, reinstalled, or receive new information such as security rules or machine instructions through data written to the memory store.

Microcode security agent 708 may be configured to access security rules 707 to determine what operations, commands, communications, or other actions to trap. Security rules 707 may reside within microcode 706, or another suitable portion of processor 702 or system 700. Security rules 707 may be implemented by functional calls from entities outside processor 702, such as other security agents making calls to microcode security agent 708 and passing information through parameters. Microcode security agent 708 may be communicatively coupled to security rules 707. In one example, a security rule 707 may have logic such as:

- If address (x) is executed by code in virtual memory range (X1-->X2) or physical memory range (Y1-->Y2), then generate a triggered event to below-O/S agent for handling;
- If address (x) is executed by code in physical memory range (Z1-->Z2), then skip instruction;
- If A, B, and C; then memory range (Y1-->Y2) may access memory range (X1-->X2); and
- Only code from memory ranges (Y1->Y2) and (T1->T2) may write to (Z1-->Z2).

Microcode 706 may include a state machine to understand the context of instructions that have been received. Such information may be needed to carry out certain security rules 707 which, for example, evaluate successive operations within the context of each other. Such information may be passed with a triggered event.

One or more of the below-O/S security agents of system 700 may also be embodied in below-O/S agent 712. Below-O/S agent 712 may be implemented in any suitable manner for providing triggering of access of resources, or handling of such triggers, below the level of operating systems of electronic device 701 such as operating system 713. Below-O/S agent 712 may embody some or all of the functionality of SVMM 216 or SVMM security agent 217 of FIG. 2; firmware security agent 440, 442 or PC firmware security agent 444 of FIG. 4; or firmware security agent 516 of FIG. 5. Below-O/S agent 712 may be communicatively coupled to security rules 723.

In one embodiment, one or more of the below-O/S security agents of system 700 such as below-O/S agent 712 may be configured to handle triggered events generated by microcode-based security agents such as microcode security agent 708. Below-O/S agent 712 may be configured to also trap access to resources or handle triggered events in a similar fashion as below-O/S agents in FIGS. 1-2 and 4-5. Below-O/S agent 712 and microcode security agent 708 may be communicatively coupled. Microcode security agent 708 may be configured to send triggered events to below-O/S agent 712. Below-O/S agent 712 may be communicatively coupled to other security agents such as in-O/S security agent 719, and may be communicatively coupled to protection server 202. Below-O/S agent 712 may be configured to receive contextual information from other security agents such as in-O/S security agent 719. Such information may provide information about the entity which generated an attempted access to system resources 724. If more than one in-O/S security agent 719 is present in system 700, each in-O/S security agent 719 may be configured to perform a designated portion of the trapping, validating, or other tasks associated with in-O/S security agent 719. Such portions may be defined by below-operating-system security agents. For example, one in-O/S security agent 719 may validate or investigate MOV instructions, while another in-O/S security agent 719 may validate or investigate JMP instructions.

Below-O/S agent 712 may also be configured to receive security rules or just-in-time information from protection server 202. Furthermore, below-O/S agent 712 may be configured to consult security rules such as security rules 723, any received contextual information from other security agents such as in-O/S security agent 719, or protection server 202 in order to determine how to handle a received triggered event from microcode security agent 708.

In particular embodiments, below-O/S agent 712 may contain a behavioral state machine, to understand the context of operations encountered in system 700. Below-O/S agent 712 may then be configured to determine an appropriate action to be executed by microcode security agent 708 based upon the context. Such action may include a corrective action, allowing an operation, denying an operation, or taking other steps in furtherance of the requirements of a security rule. Microcode security agent 708 may be configured to take such actions as received from below-O/S agent 712.

Below-O/S agent 712 may be also be configured to determine an appropriate action to be executed by another security agent, such as in-O/S security agent 719. For example, if a triggered event from microcode security agent 708 indicates a particular kind of malware threat, or a threat to a particular portion of the kernel or user mode of electronic device 701, below-O/S agent 712 may be configured to instruct in-O/S security agent 719 to take a corrective action. Thus, below-O/S agent 712 may control in-O/S security agent 719.

Below-O/S agent 712 may be configured to validate the instance of microcode security agent 708, and vice-versa. Below-O/S agent 712 may be configured to communicate with microcode security agent 708 to share or set security rules such as those from security rules 723 to be implemented in security rules 707, status information regarding system 700, administrator or environmental settings and preferences, or other suitable information for microcode security agent 708 to trap operations, generate triggers, and handle such triggers or send them to other security agents.

Below-O/S agent 712 may be configured to communicate such information to microcode security agent 708 through any suitable mechanism. Below-O/S agent 712 may call functions of the processor 702, microcode 706, or microcode security agent 708, and pass information as parameters to the functions. Such functions may be created specifically to pass such changes to microcode security agent 708. For example, to ban the access of a range of physical memory "A" from any entity operating from the memory from another range of physical memory "B," a function such as "Bar_Memory(A, B)" could be used. Microcode security agent 708, as a result of this function being called, may be configured to set parameters within microcode 706. Calling such microcode instructions may be privileged, such that microcode security agent 708 may be configured to validate below-O/S agent 712 before calling such microcode instructions on behalf of below-O/S agent 712. In another example, below-O/S agent 712 or microcode security agent 708 may communicate such information by writing data to a memory store, control store, or other writeable portions of processor 702 or microcode 706.

Processor 702 may have limited resources for microcode security agent 708 to fully implement all necessary trapping and handling to protect system 700 from malware. In one embodiment, microcode security agent 708 may be configured to implement only trapping of actions to be conducted by processor 702, and may offload triggers associated with such trapping to other security agents or components of system 700 for subsequent handling. Microcode security agent 708 may take subsequent action, such as allowing or disallowing a request or communication, or may take other action such as reporting information. In another embodiment, microcode security agent 708 may be configured to implement handling of a small portion of triggered events. Suitable triggered events for such handling may include those not requiring significant contextual information. For example microcode security agent 708 may receive information through security rules 707 that a particular range of memory addresses is to be protected from all reads and writes, unless an instance of below-O/S agent 712 has been validated. Such a security rule may be implemented because the contents are quite sensitive, and without the operational assistance of below-O/S agent 712, the identity of the entity accessing the memory contents cannot be identified. Thus, after validating the instance and operation of below-O/S agent, microcode security agent 708 may set a bit indicating such validation. If an attempted access of the memory is triggered, and the bit has not yet been set, then microcode security agent 708 may be configured to disallow the reading, writing, or execution of the contents of the memory range. If the bit has been set, then microcode security agent 708 may be configured to then trap the attempted access to the memory range, generate a triggered event to be sent to below-O/S agent 712, which would evaluate from contextual information and other settings whether the calling entity was allowed to access the memory range. Below-O/S agent 712 may then send a resulting action back to microcode security agent 708, perhaps indicating whether to allow or deny the access.

A triggered event may include any suitable information that may be used for identification of the source, method, or destination of the attempted action. The triggered event may be used by microcode security agent 708 or below-O/S security agent 712 to apply security rules. The triggered event may be generated by microcode security agent 708. For example, the triggered event may detail precisely what resource was accessed, what instruction was called, what instruction operands were used, from what memory address the attempt or instruction came from (i.e. the source memory), into what memory the operation's result was to be stored in (i.e. the target memory) or what memory will be affected, or any other information leading to identification of the source, method, or destination of the attempted action. Microcode security agent 708 may also be configured to include information regarding processor 702 such as processor states of active, sleep, idle, halt, and reset; interprocessor communications; and power consumption.

Another security agent such as below-O/S agent 712 may be configured to use such information in a triggered event to determine the scope of the event when applying a security rule 722. Below-O/S agent 712 may have access to additional clues such as information about the entities operating in operating system 713, new information in protection server 202, malware or other threats detected by other security agents, administrator settings, etc. For example, given a trapped request originating from a particular address in physical memory, below-O/S agent 712 may be able to determine the thread, process or application associated with the particular address. Then, below-O/S agent 712 may be configured to determine whether such an entity is authorized to take the action in question. Below-O/S agent 712 may be configured to determine the identity of the entity. Below-O/S agent 712 may be configured to classify the entity as known to be safe (e.g., by consulting a whitelist), known to be malicious (e.g., by observing behavior or consulting a blacklist of known malware), or unknown. Below-O/S agent 712 may be configured to report information about unknown and malicious entities to protection server 202.

Microcode security agent 708 may have access—for trapping purposes—to certain processor 702 resources and other system resources 724 that may be unavailable to other security agents. In one embodiment, implementation of microcode security agent 708 within the microcode 706 may avoid limitations created by limited exposure of such resources to calling entities outside of the processor. For example, a virtual machine monitor may be limited to trapping operations on resources which have been exposed by processor 702 for virtualization purposes. Take as a further example the ability to trap an attempted read, write, or execute upon memory. A virtual-machine-monitor-based security agent may only have access to memory as it is available to be virtualized, and, as a consequence, may only be able to trace attempted read, write, or execution attempts to a memory page. In contrast, microcode security agent 708 may be able to intercept and handle a read, write, or execute request to a specific physical memory address, and evaluate the request based upon security rules 707. The smaller granularity may provide greater flexibility in providing security solutions in system 700. The instruction-level awareness of what instruction was used in context with a specific physical memory address informs system 700 of which entity called what resource, and not merely that a memory page was accessed. This flexibility may be very valuable. For example, microcode security agent 708 may monitor two adjacent memory addresses for read, write, or execute attempts, but may be directed by security rules 707 to take completely different actions based upon which of the two memory addresses were accessed. With a view only into the memory page on which an attempt is made, such a distinction in rules may fail to be applied. In another example, other methods by hypervisors for monitoring and setting debug registers did not have the context of the instructions which were used to access the debug registers, as does system 700. In addition, some other entities for setting or watching such debug registers do not run below the level of the operating system, making them more prone to malware. Finally, some other entities for setting or watching such debug registers are not directed towards security, and are not capable of accessing security rules, evaluating the access, and taking a corrective action.

Corrective actions to be taken by microcode security agent 708 may include any suitable action determined by security rules 707 or received from below-O/S agent 712. Commands or instructions may be allowed or denied. Information generated from microcode modules 710 may be allowed or suppressed. Any such commands, instruction, or information may be modified.

Microcode security agent 708 may be configured to trap the generation of interrupts. The interrupts may be trapped by trapping, for example, an execution of an "INT" instruction, followed by reading relevant registers known to host information associated with an interrupt. For example, general purpose registers may be read to learn the code identifier of the interrupt, as well as the parameters used to call it. For example, interrupt 13 may be a disk interrupt, and a known set of registers may identify the interrupt as a read or write, as well as relevant sectors and locations of data.

Microcode security agent 708 may be configured to trap values being written to input and output ports of processor 702. Microcode security agent 708 may be configured to trap values being written to input and output devices by processor 702. Microcode security agent 708 may be configured to trap on instructions for making such writes or reads.

Microcode security agent 708 may also be configured to trap certain operations of an arithmetic logic unit ("ALU") of processor 702. A series of operations on the processor corresponding to the steps of a protected hashing algorithm may be trapped to determine unauthorized access of the function. Some arithmetic operations are used by malware to disguise or morph themselves. Certain arithmetic instructions, bitwise instructions, or MOV instructions are all instructions that might cause a change in the content of a memory page or address range. By trapping such instructions, changes to a code section or data section may be recorded. If subsequent analysis shows that the code section or data section was modified as part of self-modifying malware, then the trapped and recorded instructions may be used to track the encryption algorithm used by the malware. For example, it may be determined that the malware uses an XOR function with a particular key to morph itself. Such information may yield better security rules for detecting self-modifying malware. Further, by keeping track of memory modifications, repair logic may be achieved by reversing the application of the instructions.

In addition, microcode security agent 708 may be configured to conduct digital-rights-management operations. For example, microcode security agent 708 may be configured to receive a security rule 707 indicating that authorization to run a particular program is required. The particular program may be located at a specific address in memory. Such an authorization may take the form of the microcode security agent 708 receiving, for example, an authorization code, key, or byte from below-O/S security agent 712. Such an authorization may be accomplished by microcode security agent 708 trapping attempted access on the memory or loading of the programs instructions, and sending the triggered event to below-O/S security agent 712, which in turn may have access to the authorization code, key, or byte. The below-O/S security agent 712 may return the decision to the microcode security gent 712. Thus, operation of the program may be allowed or disallowed based on the authorization code.

Furthermore, microcode security agent 708 may be configured to stop the execution of specific code in memory based upon a hash or a checksum of the memory. Such a hash or checksum may be indicated by a security rule 707 as malicious. As the code is loaded from memory, microcode security agent 708 may conduct the hash or checksum of the contents, compare it with those of known malicious code, and then deny the attempt to load and load a repair function to eliminate the offending code.

Below-O/S agent 712 may be configured to inform other security agents of system 700, including microcode security agent 706 that it has been determined that system 700 has been infected with malware, encountered suspicious behavior, or otherwise been compromised. In such a case, microcode security agent 706 may be configured to disable operation of portions of processor 702. Microcode security agent 706 may be configured to disable such operations by trapping and denying requests to specific system resources 724, or generated communication from microcode modules 710. Portions of processor 702 may be disabled because they are sensitive, or likely to be misused by malware.

Microcode security agent 706 may be configured to protect a memory address or a range of memory addresses from attempts to load, read, write, or execute attempts. Such memory may include sensitive data, or may be the initialization point for a restricted, sensitive, or protected function. Microcode security agent 706 may prevent access to such memory where there is no verification that the accessing software is safe or neutral. In such a case, security agents such as below-O/S agent 712 may identify specific memory addresses to be protected, perhaps because such memory addresses may correspond to the example sensitive information or protected routines. Below-O/S agent 712 may send microcode security agent 708 information such as security rules 707 regarding which addresses to protect. Microcode security agent 708 may trap attempted loading, executing, reading or writing to such memory addresses and send a corresponding triggered event to below-O/S agent 712. Below-O/S agent 712 may determine whether the calling software is safe or neutral according to security rules 723, information from protection server 202, a whitelist, or any other suitable information source. Below-O/S agent 712 may return an action to be implemented back to microcode security agent 708. Microcode security agent 706 may be configured to protect a page or range in virtual memory and/or an address or range in physical memory. Microcode security agent 706 may be configured to translate virtual memory pages, locations, or addresses into physical memory locations or addresses. Thus, given a virtual memory location to trap, or a virtual memory location from where an attempt originated, microcode security agent 706 may be configured to determine the corresponding physical memory locations, or vice-versa.

Furthermore, microcode security agent 708 may be configured to protect the access of sensitive code. In one embodiment, microcode security agent 708 may be configured to protect the access of sensitive code in the manner described above by monitoring access of a particular address, wherein the address represents the beginning of the code as it is stored in memory. In another embodiment, microcode security agent 708 may be configured to monitor the execution of "JMP" or similar branching instructions which would move the operation of processor 304 into the middle of sensitive data or code. In such a case, microcode security agent 708 may be configured to trap the execution of "JMP" instructions in combination with the sensitive memory ranges. Microcode security agent 708 may be configured to analyze from where the "JMP" instruction originated. The microcode security agent 708 may be configured to generate a triggered event corresponding to the trapped "JMP" attempted execution, which may be handled by below-O/S agent 712. The below-O/S agent 712 may be configured to take into account where the "JMP" instruction originated, and whether such memory where the "JMP" instruction originated is authorized to access the memory in question.

Microcode security agent 708 itself, or the trapping functionality therein may also be configured to be enabled or disabled by other portions of system 700. Such capabilities may be useful if trapping and handling events are expensive, thus possibly harming system performance. Such enabling and disabling may be based upon the use of particularly sensitive programs or data, detection of a malware threat, administration preferences, or any other suitable reason. In one embodiment, microcode security agent 706 may be configured to receive a MSAOn signal, VMXOn signal, or other instruction from below-O/S agent 712 to begin security processing and trapping. Microcode security agent 708 may receive an MSAOff signal, "VMWrite VMXOff" signal, or other instruction to stop security processing and trapping. Before beginning or stopping security processing and trapping, microcode security agent 708 may validate the identity and instance of the security agent making the request.

Furthermore, microcode security agent 708 may be configured to intercept interprocessor messages and commands between processor 702 and other processors of electronic device 701. Such interprocessor commands may be received by an appropriate microcode module 710 or be attempted by an entity of electronic device 701 accessing particular system resources 724. In one embodiment, interprocessor commands may be sent from software accessing processor 702 from operating system 713 by way of a machine state register.

Malware may try to send such messages, for example, to turn off processors or put them in sleep mode. Microcode security agent 708 may be configured to trap the attempted writes to, for example, the MSR register that correspond to interprocessor commands. A triggered event for the trapped command may be sent to below-O/S agent 712 for handling to verify the source of the attempt.

Microcode security agent 708 may be configured to intercept the generation and communication of messages from the processor such as software interrupts 722. Microcode security agent 708 may be configured to control the execution of an interrupt such that they may be accessed by authorized software only. For example, drivers without a known identity (such as determined by hashes, source of driver in memory, etc.) or a malicious identity will not be allowed to execute software interrupts. Microcode security agent 708 may trap the access of the interrupt and pass the triggered event to the below-O/S agent 712 for handling.

In another example, microcode security agent 708 may be configured to trap the generation of exceptions 718 by processor 702. Exceptions may include, for example, divide-by-zero operations, page faults, and debug signals. Read access to the memory addresses containing these may be trapped by microcode security agent 708 and handled by below-O/S agent 712.

Microcode security agent 708 may be configured to protect various data structures of the processor 702. For example, malware may attack the Interrupt Descriptor Table ("IDT"). In one embodiment, microcode security agent 708 may trap write access attempts to memory locations containing the IDT itself. In another embodiment, microcode security agent 708 may protect the memory locations where functions for changing the IDT are stored, such as "LOAD IDT" and "STORE IDT." In another example, microcode security agent 708 may be configured to protect the EFLABS or similar data structure, or flags associated with interrupt handlers. Malware may attempt to subvert the operation of interrupt handlers through the alteration of such resources by unauthorized sources.

Although microcode security agent 708 may be specific to the particular instances of a specific type of processor, as different circuitry arrangements may necessitate different microcode instructions, a set of security rules 707 may be valid for all processors using a given instruction set. This may be possible because microcode security agent 708 may trap certain instructions, which would not change between different processors implementing the same instruction set, but the circuitry where the associated resources may vary and depend upon the circuitry. For example, a main desktop central processing unit ("CPU") and an embedded system CPU may both be ISA processors from the same manufacturer, and thus security rules 707 may be shared at least in part between the two types of processors. In contrast, a graphics processing unit on a graphics processor or an automobile embedded processor with a different instruction set may not be able to share security rules 707.

In operation, microcode security agent 708 may be running in the processor 702 of electronic device 701 and below-O/S agent 712 may be running below the level of operating system of electronic device 104. Microcode security agent 708 and below-O/S agent 712 may authenticate each other. Microcode security agent 708 may initiate trapping of access to system resources 724 and outputs or communication generated by microcode modules 710. Microcode security agent 708 may be so initiated upon demand from below-O/S agent 712, upon a security rule 707, or upon startup of processor 702. Below-O/S agent 712 may send a security enablement request to microcode security agent 708 because of an occurrence in system 700, an administrator or system setting, or because of a triggered security rules 723. Such a request may be generated, for example, because a particular program is to be executed, sensitive data is to be accessed, or a malware threat has been detected elsewhere in system 700. In-O/S security agent 719 and/or below-O/S system agent 712 may authenticate itself to microcode security agent 708. To authenticate itself, in-O/S security agent 719 and/or below-O/S system agent 712 may call a privileged instruction provided by processor 702 to initiate the authentication process. The call may cause microcode security agent 708 measure and authenticate, with a signature or hash, for example, in-O/S security agent 719 and/or below-O/S system agent 712.

Microcode security agent 708 may receive security rules 707 from below-O/S agent 712. Microcode security agent 708 may be updated by function calls, or by writes to shared memory such as a memory store. Microcode security agent 708 may apply flags based on security rules 707 to a control structure of microcode 706 configured to trap specific instructions, operands to such instructions, target addresses, source addresses, or any combination thereof. Microcode security agent 708 may trap attempted accesses of system resources by entities running above the processor, such as operating system 713, application 710, or driver 711. The operation of microcode security agent 708 may be transparent to such entities. Microcode security agent 708 may trap the generation of information such as outputs from instances of other microcode modules 710. Such microcode modules 710 may include other portions of microcode configured to perform various tasks for processor 702. For example, some of microcode modules 710 may detect when a processor exception or interrupt is to be generated, how to route input and output data, or perform mathematical operations. The operation of microcode security agent 708 may be transparent to such modules. Microcode security agent 708 may use a state machine to perform certain trapping predicated on previous events observed.

Upon trapping an access to a resource or a generation of information, microcode security agent 708 may created a triggered event associated with the trapping. Such a triggered event may contain information about the trapping, including contextual information such as the instruction trapped, parameters used, originating memory locations, and target memory locations.

In one embodiment, microcode security agent 708 may handle the triggered event. In another embodiment, microcode security agent 708 may pass the triggered event to below-O/S agent 712 or another security agent for handling. Microcode security agent 708 may consult security rules 707 to determine whether and how to handle the triggered event, or to pass the triggered event to below-O/S agent 712. Microcode security agent 708 may wait for a reply from below-O/S agent 712, or may allow the trapped action if no follow-up is required by security rules 707. Microcode security agent 708 may take corrective action based on security rules 707, such as allowing or denying an instruction, or replacing a value or parameter to be executed.

Below-O/S agent 712 may receive a triggered event from microcode security agent 708. Below-O/S agent 712 may consult security rules such as security rules 723 to determine an appropriate action to take based on the triggered event. Below-O/S agent 712 may use triggered event information from microcode security agent 708, contextual information from in-O/S security agent 719, information from protection server 202, determinations from other security agents, administrator settings, time, or other information to determine the appropriate action that should be taken. Below-O/S agent 712 may send actions to be taken to in-O/S security agent 719 and/or microcode security agent 708. Below-O/S agent 712 may send information regarding the triggered event and resultant actions to protection server 202.

Microcode security agent 708 may receive an action to be taken from another security agent, such as below-O/S agent 712. Microcode security agent 708 may execute the received action, such as allowing or denying an instruction, or replacing a value or parameter to be executed.

Figure 8:
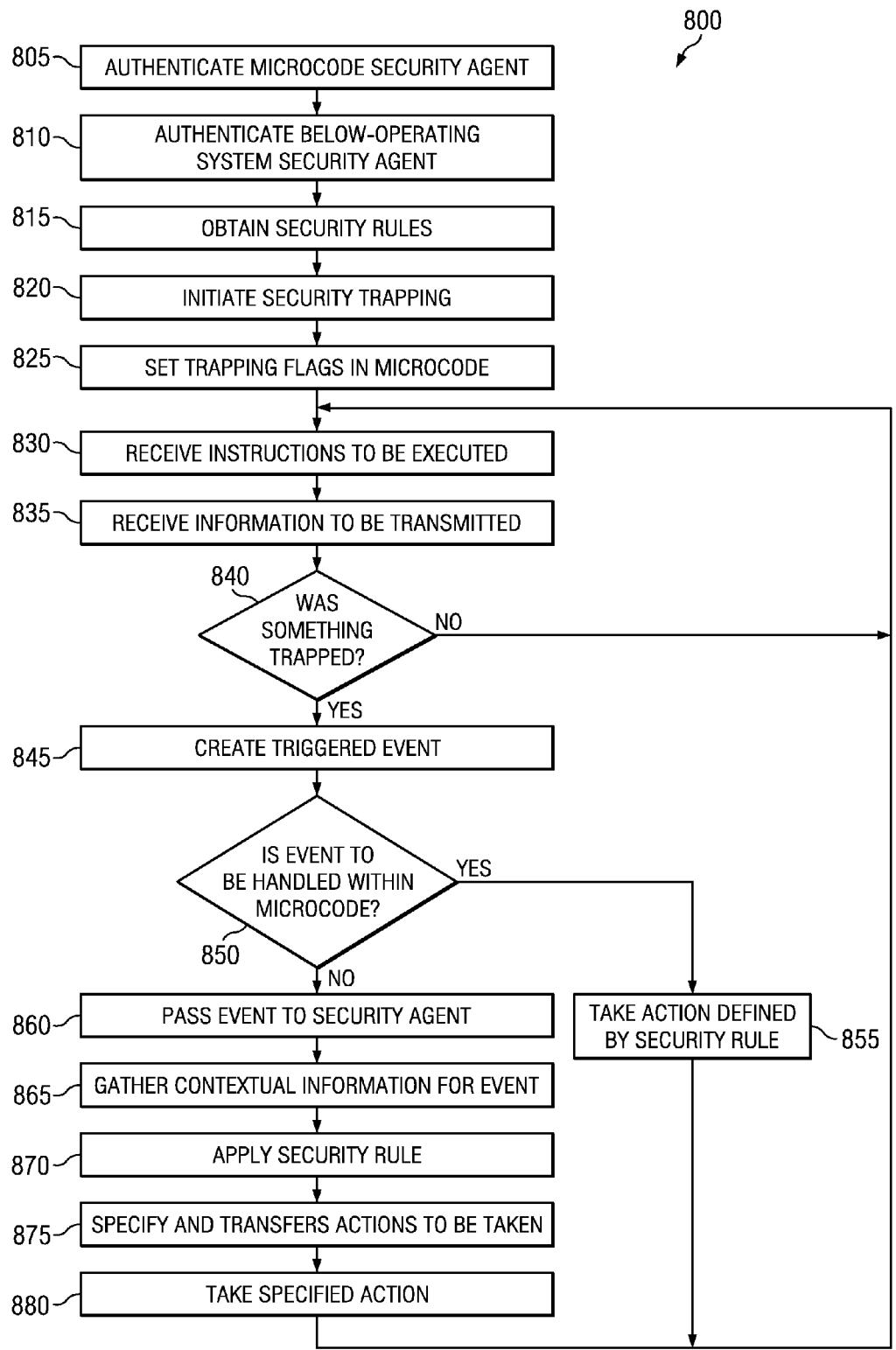
FIG. 8 is an example embodiment of a method for microcode-based protection for an electronic device from malware.

FIG. 8 is an example embodiment of a method 800 for microcode-based, personalized and configurable protection for an electronic device from malware. In step 805, an instance of a microcode security agent may be validated. In step 810, an instance of another security agent may be validated. Such a security agent may include a below-O/S security agent. In step 815, one or more security rules for trapping at microcode level within a processor may be obtained, sent or received. Such security rules may be communicated by, for example, function calls or by writing parameters to a shared memory space. In step 820, security trapping of resources at the microcode level may be initiated. In one embodiment, such initiation may arise from receiving a signal to begin security trapping. In such an embodiment, a signal may be received because a malicious attack on a system has been detected, or because sensitive data may be present in a system. In another embodiment, such initiation may arise from consultation of a security rule. In yet another embodiment, such initiation may arise from the startup of a processor.

In step 825, flags corresponding to operations to be trapped may be set in microcode. Such flags may correspond to specific instructions, operands to such instructions, target addresses, source addresses, or any combination thereof. Such flags may be defined by security rules that were received. In step 830, instructions to be executed may be received and compared against the trapping flags. In step 835, information generated and to be sent from microcode may be received and compared against the trapping flags. Steps 830 and 835 may be implemented by way of a state machine, wherein the steps may be repeated, and the results from multiple iterations of step may be remembered and compared together against a flag or security rule.

In step 840, it may be determined whether an instruction or information has been trapped. If nothing was trapped, the method may return to monitoring instructions and generated information in steps 830 and 835. If something was trapped, then in step 845 a triggered event associated with the trapping may be created. Such a triggered event may contain information about the trapping, including contextual information such as the instruction trapped, parameters used, originating memory locations, and target memory locations.

In step 850, it may be determined whether the triggered event is to be handled within microcode, or whether a security agent outside microcode should handle the triggered event. If the triggered event is to be handled within microcode, then in step 855 an appropriate action for the triggered event may be taken. Such an action may be defined by consulting a security rule. Such an action may include allowing an instruction to be executed or information to be sent, denying the instruction or communication, replacing values in memory or in parameters, or any other corrective action required. The method 800 may then continue security monitoring in steps 830 and 835.

If the triggered event is to be handled outside of the microcode, then in step 860 the triggered event may be sent to a security agent for handling the triggered event. In step 865, additional information related to the triggered event may be gathered. Such information may include settings, preferences, contextual information, or malware status. Such information may be used in step 870 to apply a security rule to the triggered event. Such an application may yield a course of action to be taken with respect to the triggered event. In step 875 such a course of action may be specified and transferred to various security agents which may implement the specified action. Such actions may include corrective actions, allowing an operation or communication to take place, reporting the event to a protection sever, or any other suitable result. In step 880, the actions specified in step 875 may be taken. The method 800 may then continue security monitoring in steps 830 and 835.

Figure 9:
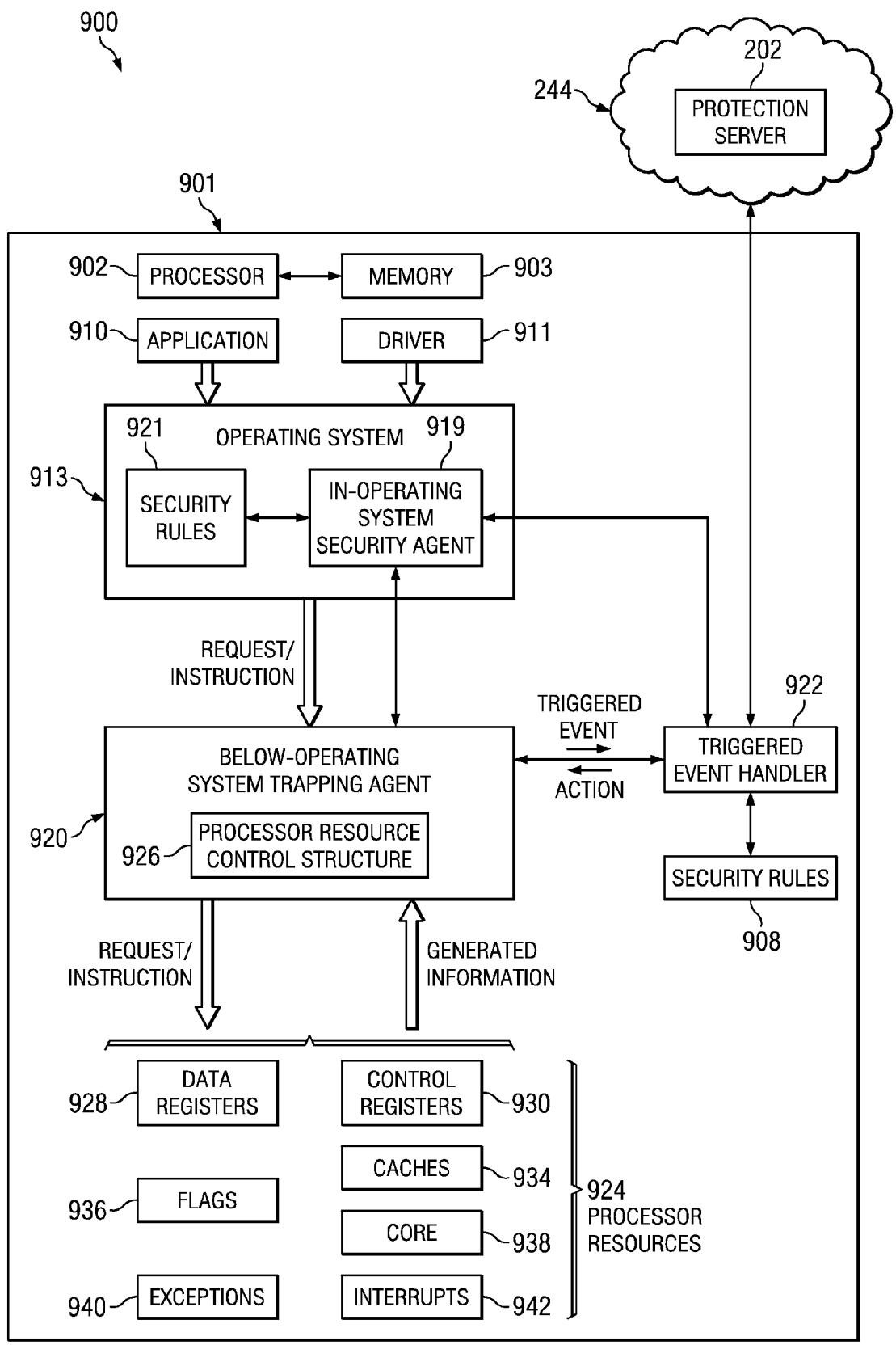
FIG. 9 is an example embodiment of a system for regulating software access to security-sensitive processor resources on an electronic device.

FIG. 9 is an example embodiment of a system 900 for regulating software access to security-sensitive processor resources on an electronic device 901. System 900 may include a below-O/S trapping agent 920 and a triggered event handler 922 configured to operate on electronic device 901 to detect malicious attempts to access processor resources 924 from software-based entities running in operating systems of electronic device 901 such as operating system 913. Furthermore, below-O/S trapping agent 920 and triggered event handler 922 may be configured to use one or more security rules 908 to determine what attempted operations or generation of information to trap and how to handle a triggered event created corresponding to the trapped operation or information. Below-O/S trapping agent 920 and triggered event handler 922 may be configured to allow, deny, or take other corrective action for the triggered event.

Electronic device 901 may be implemented wholly or in part by or configured to implement the functionality of the electronic device 103 of FIG. 1, electronic device 204 of FIG. 2, electronic device 404 of FIG. 4, electronic device 701 of FIG. 7, and/or any combination thereof. Electronic device 901 may include one or more processors 902 coupled to a memory 903. Processor 902 may be implemented wholly or in part by or configured to implement the functionality of processor 208 of FIG. 2, processor 408 of FIG. 4, processor 702 of FIG. 7, or any combination thereof. Memory 903 may be implemented wholly or in part by or configured to implement the functionality of memory 206 of FIG. 2, memory 406 of FIG. 4, memory 703 of FIG. 7, and/or any combination thereof. Electronic device 901 may include an operating system 913, which may include an in-O/S security agent 919 coupled to one or more security rules 921. Operating system 913 may be implemented wholly or in part by or configured to implement the functionality of operating systems 112 of FIG. 1, operating system 212 of FIG. 2, operating system 412 of FIG. 4, operating system 713 of FIG. 7, and/or any combination thereof. In-O/S security agent 919 may be implemented wholly or in part by or configured to implement the functionality of in-O/S security agent 218 of FIG. 1, in-O/S security agent 418 of FIG. 4, and/or in-O/S security agent 719 of FIG. 7, or any suitable combination thereof.

Below-O/S trapping agent 920 may be implemented by or configured to implement the functionality of below-O/S trapping agent 104 of FIG. 1, SVMM 216 of FIG. 2, firmware security agents 440, 442 or PC firmware security agent 444 of FIG. 4, firmware security agent 516 of FIG. 5, microcode security agent 708 of FIG. 7, and/or any combination thereof. Triggered event handler 922 may be implemented by or configured to implement the functionality of triggered event handler 108 of FIG. 1, SVMM security agent 217 of FIG. 2, below-O/S agent 450 of FIG. 4, below-O/S agent 712 of FIG. 7, and/or any combination thereof. In various embodiments, some of the functionality of below-O/S trapping agent 920 may be accomplished by triggered event handler 922, or some of the functionality of triggered event handler 922 may be accomplished by below-O/S trapping agent 920. Furthermore, below-O/S trapping agent 920 and triggered event handler 922 may be implemented in the same software module.

Security rules 908 may be implemented by or configured to implement the functionality of security rules 114 of FIG. 1, security rules 222 of FIG. 2, security rules 434, 436, 438 of FIG. 4, security rules 518 of FIG. 5, security rules 707, 723 of FIG. 7, and/or any combination thereof. Security rules 921 may be implemented by or configured to implement the functionality of security rules 220 of FIG. 2, security rules 420 of FIG. 4, security rules 721 of FIG. 7, and/or any combination thereof.

Below-O/S trapping agent 920 may be configured to intercept access to or information from any suitable resource, such as processor resources 924. For example, processor resources 924 may be implemented by or configured to implement the functionality of resource 106 of FIG. 1, system resources 214 of FIG. 2, portions of components such as display 424 and storage 426 of FIG. 4, or system resources of FIG. 7. Processor resources 924 may include resources available to a processor such as processor 902 for enabling the processor to load and execute instructions. Such resources may include, for example, data registers 928, control registers 930, caches 934, processor flags 936, processor cores 938, processor exceptions 940, or processor interrupts 942. An attempted access of such a resource may include an instruction such as an assembly language instruction with operands. The processor resources 924 on which trapping may be available may depend upon the resources exposed by the processor 902. For example, if below-O/S trapping agent 920 is implemented in a virtual machine monitor, the processor resources 924 available for the below-O/S trapping agent 920 to trap may be limited to processor resources 924 exposed by processor 902 for the purposes of virtualization. In such a case, processor 902 may include virtualization extensions for some of processor resources 924. In another example, if below-O/S trapping agent 920 is implemented in a microcode security agent, then processor 902 may have made nearly all resources of the processor 902 available for trapping.

Below-O/S trapping agent 920 may include a processor resource control structure ("PRCS") 926. PRCS 926 may be implemented in a record, data structure, table, or any other suitable structure. PRCS 926 may contain information specifying which instructions, information, or attempted access of processor resources 924 are to be trapped. Below-O/S trapping agent 920 or triggered event handler 922 may be configured to set flags in PRCS 926 corresponding to sensitive operations, information, or resources that are to be trapped. Below-O/S trapping agent 920 or triggered event handler 922 may be configured to set such flags in PRCS 926 according to information contained within security rules 908.

FIG. 10 is an example embodiment of a PRCS 1000. PRCS 1000 may be an example embodiment of the PRCS 926 of FIG. 9. PRCS 1000 may include a table of entries 1014 of various processor resources that are to be trapped. Each entry may have one or more fields 1004, 1006, 1008, 1010, 1012 identifying the resource and the conditions which may yield a triggered event. For example, PRCS 1000 may have fields for a trigger flag 1002, an identifier 1004 of a resource, a type 1006 associated with the resource, a trigger type 1008, when-to-trigger conditions 1010 about when to trigger an event, and an execution stage 1012 in which to trigger an event. The implementation of PRCS 1000 may depend upon the nature of the processor whose resources are identified, including the architecture (such as Industry Standard Architecture "ISA") or the resources exposed by the processor 902.

Trigger flag 1002 may include an indication of whether trapping and triggering for the associated entry 1014 is turned on or off. Such a flag may allow a trapping condition to be loaded in PRCS 1000 as an entry 1014 but yet remain dormant. Thus, PRCS 1000 may be loaded with embodiments of security rules without actively enforcing them. Trigger flag 1002 may be configured to be set by an entity such as the below-O/S trapping agent 920 of FIG. 9. Such an operation may enable an anti-malware system using PRCS 1000 to operate much faster in contrast to a system which would require PRCS 1000 to be populated and depopulated each time trapping for a particular resource or condition was to be enabled or disabled. The ability to turn on and turn off an entry 1014 may enable an anti-malware system to selectively trap certain operations. Such selectivity may be advantageous if a particular trapping operation is expensive in terms of time or execution, and thus an entry 1014 might be enabled only when particular conditions are detected. For example, if a system normally writes many times to a particular register, trapping on access to that register may be turned off until another part of the antimalware system detects suspicious behavior indicating a possible malware infection. In such a case, the trigger flag 1002 of an entry 1014 corresponding to writes of the register may be set to "ON" to catch any additional malicious attempts to attack resources.

Resource identifiers 1004 may include an identification of a particular resource of the processor that is to be trapped. For example, an identifier 1004 may show that the resource is a register such as a particular data register, address registers such as EAX, a stack register, a control register, a vector register, stack pointers such as ESP, an instruction register, a program counter, an instruction register, a program status word, a constant register, a floating point register, or a conditional register. As other examples, identifier 1004 may identify that the resource is an instruction such as "JMP," "JZ" (jump if condition is equal to zero), "JNZ" (jump if condition is not equal to zero), "MOV" (move a value), or "SysEnter" (a fast call to a Ring 0 procedure). As yet further examples, identifier 1004 may identify that the resource is one of other resources like a cache such as a translation lookaside buffer; a counter such as a time stamp counter; a logical core such as processor0, processor1 . . . processorN of the system; or processor exceptions such as "DIV/0" or interrupts such as an interprocessor interrupt or other global variables. Resource identifier 1004 may be translated into a representation of the address of the instruction, register, or other resource represented by resource identifier 1004. Resource type 1006 may include an identification of the class or type of resource that the entry 1014 includes. Some entries of PRCS 1000 may apply to all resources of a particular type.

Trigger type 1008 may include an identification of whether the handling of a resulting triggered event is synchronous or asynchronous. Synchronous triggers may cause the execution or communication of the trapped resource to halt until, for example, it is determined whether the attempt is indicative of malware. Asynchronous triggers may allow the execution or communication of the trapped resource to continue, while the trigger is, for example, recorded for future evaluation. In one embodiment, attempted accesses of resources triggered asynchronously may be used to build an evaluation of a larger series of actions, and the proper evaluation of such a series of actions may require multiple data points before a determination can be made. For example, whether a particular read of an instruction pointer register may not itself be malicious, but a subsequent use of the information returned may be malicious. Thus, a state machine may be used to first asynchronously trap the read of the instruction pointer register, but then synchronously trap its usage in another instruction.

When-to-trigger conditions 1010 may include logical rules or conditions under which a triggered event will be generated based on the access of the resource. For example, triggered events may be generated for a register when the resource is written to or read. Triggered events may be generated for an instruction such as "JMP" when the instruction is executed. Triggered events may be generated for a cache such as a Translation Lookaside Buffer when the cache is invalidated. Triggered events may be generated for a processor core depending upon the state of the processor, such as when the core is idle. An processor exception or processor flag may be triggered when the flag or exception is set or written. When-to-trigger conditions 1010 may include compound logical conditions, such as multiple conditions on a single resource (such as a value range), conditions on multiple resource (thus tying in multiple entries 1014), or a combination of both.

When-to-trigger conditions 1010 may contain conditions according to the type of resource that is to be trapped. For example, a register may be triggered when it is written, written with a particular value, or read. In another example, a cache or pointer may be similarly triggered when it is written, written with a particular value, or read. In yet another example, a processing core may be triggered when the core is idle. In still yet another example, interprocessor interrupts such as one used to command processor cores to halt, sleep, or activate may be triggered before the interrupt is sent (upon attempted access of the global space of the interrupt table) or after the interrupt is sent (after the interrupt table is written).

Execution stage to trigger 1012 may include an indication of in which stage of the execution of an instruction the attempted access will be trapped and a triggered event generated. Execution stage to trigger 1012 may be used in combination with when-to-trigger conditions 1010 as an additional requirement to trap a given resource. To trap a given entry, when-to-trigger conditions 1010 may be evaluated when the associated instruction reaches the stage of execution specified in execution stage to trigger 1012. Execution stage to trigger 1012 may include entries corresponding to, for example, five stages or steps of the execution of an instruction by a processor. In one embodiment, five such stages of execution of an instruction may include 1) fetching the instruction, 2) decoding of the instruction, 3) execution, 4) accessing a memory location for the results, and 5) writing a return value back to memory, register, or another location. In such an embodiment, execution stage to trigger 1012 may include the ability to trigger before or after any of the five stages. This provides a total of six different example triggering options— before fetching, after decoding (and thus before execution), after execution (and thus before accessing a memory location), after accessing a memory location (and thus before writing a return value), and after writing a return value. The ability to trap based upon the stage of execution may provide significant flexibility unavailable in other anti-malware systems. For example, the result of executing a particular instruction may be unknown beforehand, and thus an anti-malware system may set the value of execution stage to trigger 1012 to be after accessing a memory location for the results, but before writing a return value back to a register as commanded by the instruction. This may allow the anti-malware system to evaluate the results of the operation without allowing it to be written. If the results indicate a malicious operation, then a dummy value may be written back to the register instead of the value returned from the fourth stage of execution. Information about the attempted execution may be provided to a handler of the triggered event based on the attempted execution to help determine whether the attempt is malicious.

Each resource 1004 of PRCS 1000 may have multiple entries corresponding to combinations of the access of the resource 1004 with another 1004. Such combination of accesses may include a two-step or more process to be trapped. For example, entries 1014 may include separate entries for a) the access of a memory location corresponding to an interrupt descriptor table ("IDT") in combination with an access of control registers, and b) the access of a memory location corresponding to an interrupt descriptor table in combination with an access of general purpose registers. Furthermore, in FIG. 9 such separate entries may be handled by separate portions of system 900. For example, specific in-O/S trapping agents 919 may handle gathering contextual information for trapped IDT-general register access, while other in-O/S trapping agents 919 may handle gathering contextual information for trapped IDT-control register access.

Returning to FIG. 9, below-O/S trapping agent 920 may be configured to set flags or add entries in PRCS 926. Below-O/S trapping agent 920 may be configured to access one or more security rules such as security rules 908 to determine such flags or entries. In one embodiment, below-O/S trapping agent 920 may be configured to receive instructions to set such flags or entries from triggered event handler 922, which may call below-O/S trapping agent 920 after consulting security rules 908 or protection server 202. A set of specific privileged routines may be provided by processor 902 and/or below-O/S trapping agent 920 for setting flags or adding entries to PRCS 926.

If electronic device 901 includes more than one processor, each such processor may have a corresponding PRCS 926. In one embodiment, system 900 may include a below-O/S trapping agent 920 for each such PRCS 926. In another embodiment, below-O/S trapping agent 920 may be configured to trap resources represented in each such PRCS 926.

If system 900 supports virtualization, then PRCS 926 itself may be virtualized. The contents of a virtualized PRCS 926 may be limited to those resources which are virtualized by the corresponding processor 902. Such a virtualized PRCS 926 may be included in a virtual machine monitor. In such a case, below-O/S trapping agent 920 or triggered event handler 922 may be configured to control PRCS 926 in such a virtual machine monitor. In another embodiment, below-O/S trapping agent 920 may be configured to trap resources represented in each such PRCS 926. Furthermore, entries 1014 may be created in and trigger flags 1002 set in each such virtualized PRCS 926, on a per-PRCS or per-virtualized processor basis.

Below-O/S trapping agent 920 may be configured to send a triggered event resulting from a trapped attempt or communication to triggered event handler 922. Triggered event handler 922 may be configured to perform any suitable subsequent action based on the information of the triggered event and one or more security rules 908. For example, triggered event handler 922 may be configured to allow execution of an attempted instruction, but require notification of the results after execution. In another example, triggered event handler 922 may be configured to skip the execution of a command or communication altogether. Such an example may be applied if no return value is required. In yet another example, execution may be transferred to a new location by, for example, by using a "JMP" instruction to send execution to the address of a repair routine.

In operation, below-O/S trapping agent 920 and triggered event handler 922 may be operating on electronic device 901. Below-O/S trapping agent 920 may be operating below the level of the operating systems of electronic device 901. Furthermore, triggered event handler 922 may also be operating below the level of the operating systems of electronic device 901. Triggered event handler 922 may consult security rules 908 or protection server 202 to determine what flags 1002 or entries 1014 to set in PRCS 926. Triggered event handler 922 may instruct below-O/S trapping agent 920 what flags 1002 or entries 1014 to set in PRCS 926. Depending upon various conditions detected, such as applications 910 in use, other indications of malware detected, previously triggered events, or administrator settings for electronic device 901, below-O/S trapping agent 920 and triggered event handler 922 may change the trigger flags 1002 or add new entries 1014 in PRCS 926 dynamically during the operation of electronic device 901. Information to base such dynamic changes may come from, for example, below-O/S trapping agent 920 or in-O/S agent 919. Entries 1014 in PRCS 926 may be identified according to the resource 1004 or resource type 1006. The trigger type 1008 may be set to configure a subsequent trapped event to be synchronous or asynchronous. When-to-trigger conditions 1010 may be set to configure under what circumstances an intercepted request will generate a triggered event, as may execution stage to trigger 1012.

Entries in PRCS 926 may be dynamically enabled or disabled, depending upon various conditions encountered by system 900. For example, below-O/S trapping agent 920 may disable a trapping operation that is expensive because the attempted access that is trapped occurs frequently with many false-positives, until such a time that triggered event handler 922 receives an indication that the electronic device 901 is under a malware attack. Then, below-O/S trapping agent 920 may enable the trapping operation. In one embodiment, under such conditions extensive trapping on one or more processor resources 924 may be enabled to prevent unknown malware actions from harming electronic device 901 further. Such extensive trapping may extend to essentially shutting down the entire execution environment of a processor, virtualized processor, thread, process or application.

A request for a processor resource 924 may arise from an entity at the level of operating systems in system 900, such as from application 910, driver 911, or operating system 913. The request may be passed through to processor resources 924 but intercepted by below-O/S trapping agent 920. Furthermore, information or communication may be generated from the processor through various processor resources 924. The information or communication may be intercepted by below-O/S trapping agent 920.

Below-O/S trapping agent 920 may use PRCS 926 to trap an access of a resource if the information or communication matches any when-to-trigger 1010 fields of entries 1014 in PRCS 926, and subsequently generate a triggered event. Entries 1014 which have been enabled by trigger flags 1002 being set to "ON" may be matched to the attempted access or information or communication. The resource to be accessed may be compared to the resource field 1004 and/or resource type field 1006. If the resource to be accessed matches such fields, then when-to-trigger conditions 1010 may be evaluated. If the when-to-trigger conditions 1010 match system information or information about the request, then PRCS 926 may generate a triggered event. Execution stage to trigger 1012 may be used to determine when to generate the triggered event. For example, the triggered event may be created before an instruction fetch, after an instruction fetch, after execution, after memory is accessed for a subsequent write, or after another resource such as a register is accessed for a write back. Furthermore, a triggered event may be generated for an attempted communication or generation of information such as an interprocessor interrupt like "Interrupt_Sleep" before or after the interrupt is sent or written to an interrupt table. A generated triggered event may be synchronous or asynchronous, depending upon trigger type 1008. Below-O/S trapping agent 920 may halt execution of the attempted access of the resource or generation of the communication if a synchronous triggered event is generated, pending handling of the event. Below-O/S trapping agent 920 may allow execution of the attempted access of the resource or generation of the communication if an asynchronous triggered event is generated. Below-O/S trapping agent 920 may add additional context information about the attempt into the triggered event, such as the memory address from which the attempt originated, where results were to be written, or any other suitable information.

Below-O/S trapping agent 920 may include information related to the triggered event for the purposes of deciding whether the triggered event is suspicious. For example, below-O/S trapping agent 920 may determine information such as determining from what portion of memory the attempted access was made. The portion of memory may be correlated by triggered event handler 922 against known processes, applications, or programs running on electronic device 903. If the attempted access arose from an unknown or unauthorized process, application or program, then the attempt may be suspicious. Triggered event handler 922 may use information from in-O/S security agent 919 to determine such a correlation. In another example, below-O/S trapping agent 920 may provide information regarding previously triggered events, such as those recorded in a state machine. Such previously triggered events that are related to the presently triggered events may provide contextual information about whether the attempts are suspicious.

Below-O/S trapping agent 920 may pass the triggered event to triggered event handler 922, which may handle the event by evaluating information in the triggered event and/or contextual information from in-O/S agent 919 according to security rules 908. A resulting appropriate action may be determined and sent back to below-O/S trapping agent 920 to apply to the trapped attempt. Such an action may include allowing the attempt, denying execution of an instruction, or substituting different data or instructions to circumvent operation of malware.

Below-O/S trapping agent 920 may store triggered events for subsequent reference in trapping future attempted access. For example, a malicious operation may require multiple instructions to be executed by processor resources 924. Thus, each step of such malicious behavior may be reflected in a separate entry 1014 in PRCS 926. Below-O/S trapping agent 920 may trap a first step of a malicious operation, which by itself may not be malicious but only when in combination with subsequent steps. In such a case, the entry 1014 for such a step may be set to trigger asynchronously, as the condition is merely recorded into a state machine so that below-O/S trapping agent 920 or PRCS 926 may be aware of previously handled attempts. The trapping of a second step of a malicious operation may have as a when-to-trigger condition 1010 the trapping of the first step.

Figure 11:
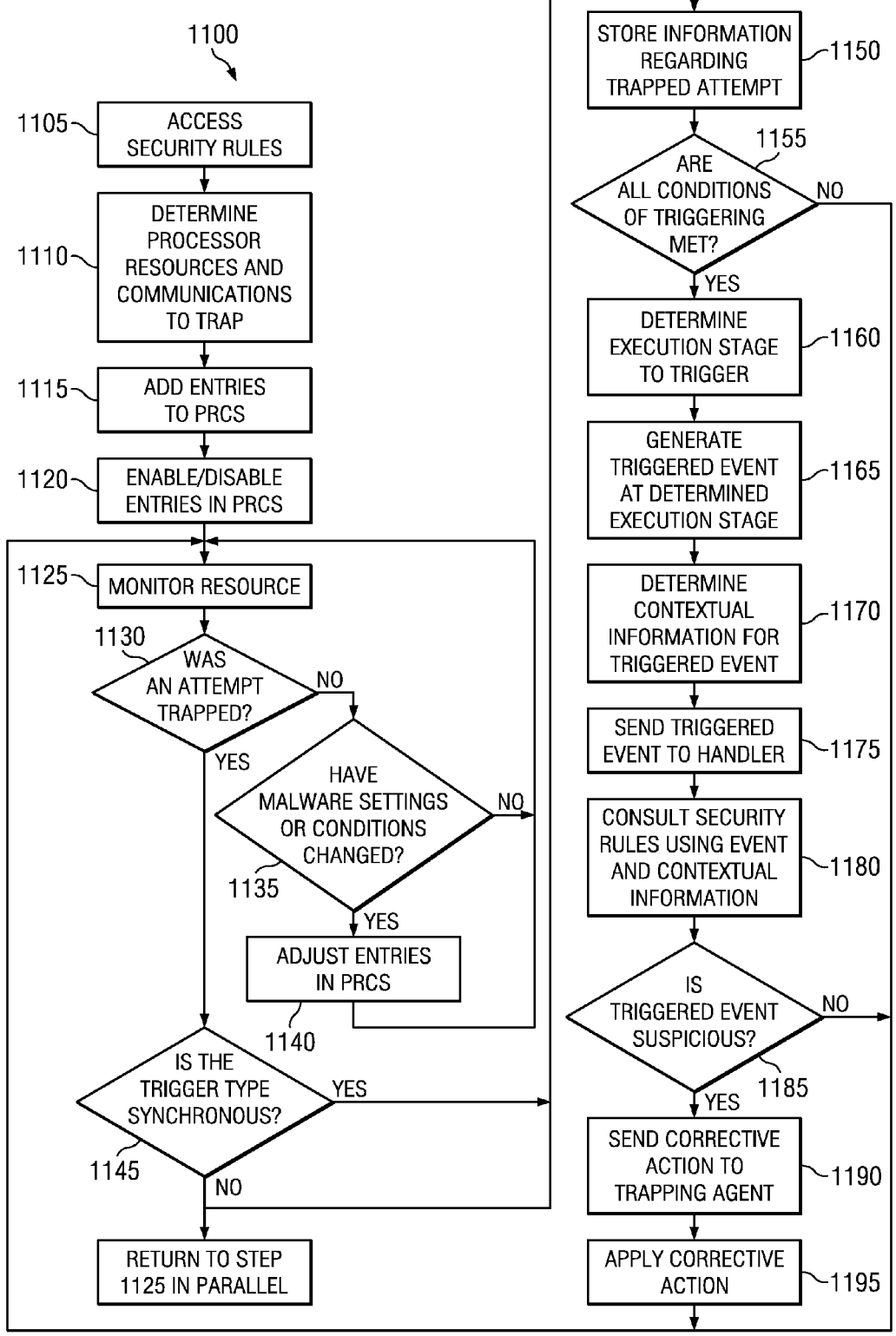
FIG. 11 is an example embodiment of a method for regulating software access to security sensitive processor resources of an electronic device.

FIG. 11 is an example embodiment of a method 1100 for regulating software access to security sensitive processor resources of an electronic device. In step 1105, security rules may be accessed to determine in step 1110 what processor resources or processor communications are to be secured. A trapping agent operating below the level of operating systems in the electronic device may determine what resources and communications to trap. Such a trapping agent may operate in, for example, a virtual machine monitor, firmware, or microcode of a processor.

In step 1115, entries corresponding to the resources or communications to be trapped may be written to a processor resource control structure, which may be configured to trap the operation, access, or other use of designated resources or communications under specified conditions. The entries in the PRCS may be written with identifications of the resource, the resource type, the conditions under which an event will be triggered, whether the trigger would be asynchronous or synchronous, and in/at what, if any, execution stage the attempted access or communication should yield a triggered event. In step 1120, entries in the PRCS may also be written with a trigger or enablement flag which indicates whether or not the entry is activated for trapping or not. If the trigger flag is not set, then the entry may be dormant and not be used to trap attempted accesses of resources.

In step 1125, access to resources or generation of communications may be monitored. Such a monitoring may take place through the PRCS. Entities in the electronic device may try to attempt to generate processor communications or attempt to access a processor resource. Such attempts to access a resource may originate from the level of operating systems of the electronic device. If an instruction, command, or other attempt to access the resource matches a resource identifier of an entry in the PRCS wherein the entry has been activated, then the attempt may be trapped. Similarly, if a processor communication is generated that matches a resource identifier of an entry in the PRCS wherein the entry has been activated, then the attempt may be trapped. In one embodiment, the attempt to access a resource or generate communication may be trapped if the additional criteria specifying when to trigger are met. For example, an attempted write of a control register may be trapped when the control register is ever written. In another example, an attempted write of a control register may be trapped when the control register is written with a specific value.

In step 1130, it may be determined whether an attempted access or communication was trapped. If no attempt has been trapped, then in step 1140 it may be determined whether entries in PRCS need to be adjusted. Such an adjustment may include enabling or disabling such entries, adding new entries, or adjusting criteria or settings of entries. Method 1100 may then return to step 1125. Such adjustment could be based on, for example, new malware threats detected in the electronic device, passage of time, previously trapped attempts, or an administrator's settings.

In step 1145, if an attempt has been trapped, it may be determined whether a resulting triggered event should be synchronous or asynchronous. If the trigger type is not synchronous, then method 1100 may return to step 1125 in parallel with proceeding to step 1150. If the trigger type is synchronous, then in step 1150 information about the trapped attempt may be stored. Such information may be used, for example, by a state machine in a future determination of whether a trapped attempt should yield a triggered event. In step 1155, it may be determined whether all conditions of the trigger are met. Such conditions may require, for example, certain values to be written to the resource, or the request originate (or not originate) from particular locations in memory. Furthermore, such conditions may require that other attempts were previously trapped. Information about such attempts may be accessed and stored in a state machine. If all conditions of triggering are not met, then method 1100 may return to step 1125.

If all conditions of triggering are met, then in step 1155 it may be determined in which, if any, specific stage of execution should the triggered event be generated. Such stages may include, for example, before an instruction in the attempt is fetched, after the instruction is fetched, after the instruction is executed, after memory is accessed to read a result, or after a value is written back. Furthermore, such stages may include before or after an interprocessor interrupt is executed. Once the designated execution stage is accomplished, a triggered event for the attempt may be generated in step 1165. Contextual information, such as source or destination address of the attempt, or the resources involved may be included with the triggered event in step 1170 for delivery to a handler in step 1175.

In step 1180, security rules may be consulted to determine in step 1185 whether the triggered event is suspicious, not permitted by administrator settings, or indicative of malware. Contextual information, such as that of the triggered event, other events in the operating system of the electronic device, or administrator settings may be used to evaluate the application of the security rules to the triggered event. If the triggered event is not suspicious, then in step 1187 the trapping agent may be notified and method 1100 may return to step 1125. If the triggered event is suspicious, then in step 1190 a resulting corrective action may be sent to the trapping agent. Such a corrective action may depend upon the specific attempt to access resources or generate processor communication. For example, a malicious instruction may have a value to be read or written spoofed, or a jump instruction may be redirected to a repair routine. In step 1195, the corrective action may be applied. The method 1100 may return to step 1125.

Figure 12:
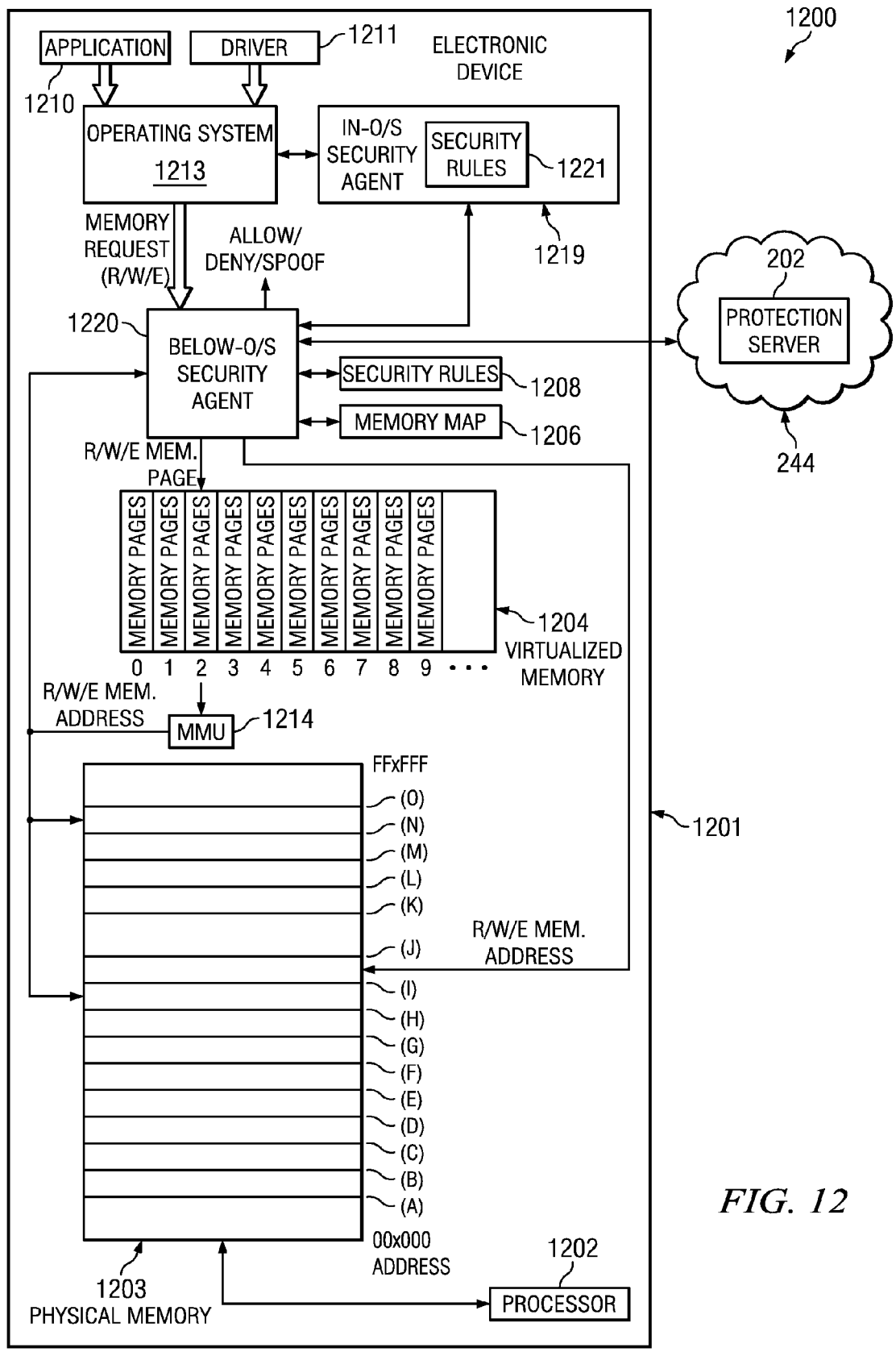
FIG. 12 an example embodiment of a system for regulating software access for securing memory using below-operating system trapping on an electronic device.

FIG. 12 is an example embodiment of a system 1200 for regulating software access for securing memory using below-operating system trapping on an electronic device 1201. System 1200 may include a below-O/S security agent 1220 configured to operate on electronic device 1201 to detect malicious attempts to access memory from software-based entities running in operating systems of electronic device 1201, such as operating system 1213. Furthermore, below-O/S security agent 1220 may be configured to use one or more security rules 1208 and a memory map 1206 to determine what attempted accesses of memory to trap and how to handle a triggered event created corresponding to the trapped operation. Below-O/S security agent 1220 may be configured to allow, deny, or take other corrective action for the triggered event.

Electronic device 1201 may be implemented wholly or in part by or configured to implement the functionality of the electronic device 103 of FIG. 1, electronic device 204 of FIG. 2, electronic device 404 of FIG. 4, electronic device 701 of FIG. 7, electronic device 901 of FIG. 9, and/or any combination thereof. Electronic device 1201 may include one or more processors 1202 coupled to a memory such as physical memory 1203. Processor 1202 may be implemented wholly or in part by or configured to implement the functionality of processor 208 of FIG. 2, processor 408 of FIG. 4, processor 702 of FIG. 7, processor 902 of FIG. 9, or any combination thereof. Physical memory 1203 may be implemented wholly or in part by or configured to implement the functionality of memory 206 of FIG. 2, memory 406 of FIG. 4, memory 703 of FIG. 7, memory 903 of FIG. 9, and/or any combination thereof. Electronic device 1201 may include an operating system 1213, which may include an in-O/S security agent 1219 coupled to one or more security rules 1221. Operating system 1213 may be implemented wholly or in part by or configured to implement the functionality of operating systems 112 of FIG. 1, operating system 212 of FIG. 2, operating system 412 of FIG. 4, operating system 713 of FIG. 7, operating system 913 of FIG. 9, and/or any combination thereof. In-O/S security agent 1219 may be implemented wholly or in part by or configured to implement the functionality of in-O/S security agent 218 of FIG. 1, in-O/S security agent 418 of FIG. 4, and/or in-O/S security agent 719 of FIG. 7, in-O/S security agent 919 of FIG. 9, or any suitable combination thereof.

Below-O/S security agent 1220 may be implemented by or configured to implement the functionality of below-O/S trapping agent 104 or triggered event handler 108 of FIG. 1, SVMM 216 or SVMM security agent 217 of FIG. 2, firmware security agents 440, 442, below-O/S agent 450, or PC firmware security agent 444 of FIG. 4, firmware security agent 516 of FIG. 5, or microcode security agent 708 or below-O/S agent 712 of FIG. 7, below-O/S trapping agent 920 or triggered event handler 922 of FIG. 9, and/or any combination thereof.

Security rules 1208 may be implemented by or configured to implement the functionality of security rules 114 of FIG. 1, security rules 222 of FIG. 2, security rules 434, 436, 438 of FIG. 4, security rules 518 of FIG. 5, security rules 707, 723 of FIG. 7, security rules 908 of FIG. 9, and/or any combination thereof. Security rules 1221 may be implemented by or configured to implement the functionality of security rules 220 of FIG. 2, security rules 420 of FIG. 4, security rules 721 of FIG. 7, security rules 921 of FIG. 9, and/or any combination thereof.

Below-O/S security 1220 may be configured to intercept access to memory of electronic device 1201. Such memory may include, for example, attempted access of addresses of physical memory 1203 or attempted access of pages of virtualized memory 1204. Such an attempted access may originate from operating system 1213 or entities utilizing operating system 1213 to run on electronic device 1201, such as application 1210 or driver 1211.

In one embodiment, memory secured by below-O/S security 1220 may include virtualized memory 1204. Virtualized memory 1204 may include memory available to entities, such as operating system 1213, application 1210, or driver 1211, that have been abstracted from physical memory and/or storage. Virtualized memory 1204 may appear as a contiguous block of memory to entities such as operating system 1213, application 1210, or driver 1211, although the actual spaces used may be spread disparately across actual physical memory, such as physical memory 1203, and/or in storage such as on a disk. Virtualized memory 1204 may be virtualized according to extensions of processor 1202. The address space of virtualized memory 1204 may be divided into memory pages. The memory pages may be each of equal size, such as four kilobytes. Electronic device 1201 may be configured to use page tables to translate the virtual addresses of virtualized memory 1204 into physical addresses of memory such as physical memory 1203 or addresses of storage. Electronic device 1201 may include a memory management unit 1214 ("MMU") configured to translate virtual addresses of virtual memory 1204 into physical addresses of memory such as physical memory 1203 and/or into addresses of a storage. The pages of virtual memory 1204 may be indexed. An attempted access of virtual memory 1204 pages may include an attempted read, write, or execution of the page, and below-O/S security agent 1220 may be configured to trap the attempt. In one embodiment, a page of virtual memory 1204 may correspond to a physical memory address or an address of a storage. In another embodiment, each page of virtual memory 1204 may correspond to a physical memory address.

In yet another embodiment, pages containing certain contents such as specific portions of operating system 1213 may be pinned and may not change during the operation of electronic device 1201.

In another embodiment, memory secured by below-O/S security agent 1220 may include physical memory 1203. Physical memory 1203 may be accessed through addresses of the physical memory, as shown by markers (A), (B), (C), (D), (E), (F), (G), (H), (I), (J), and (K), which denote specific addresses in physical memory 1203 that may be the base address of a memory range containing a defined element. Physical memory 1203 may be accessed through an attempted read, write, or execution of a specific memory address, and below-O/S security agent 1220 may be configured to trap the attempt. For example, an attempted write may take the form of an instruction "MOV Addr1, Value" wherein a value represented by the variable "Value" is written to a specific memory address represented by "Addr1." Any instruction writing to a physical memory 1203 address may be used. An attempted read may take the form of an instruction such as "MOV Value, Addr1" wherein a value represented by the variable "Value" is read from a specific memory address represented by "Addr1." Any instruction reading from a physical memory 1203 address may be used. An attempted execution may take the form of an instruction at a given address such as "Addr1." Any instruction for executing an address in memory may be used.

Below-O/S security agent 1220 may be configured to intercept attempted access to virtual memory 1204. Furthermore, below-O/S security agent 1220 may be configured to intercept attempted access to physical memory 1203. In one embodiment, a request for virtual memory 1204 may not be intercepted, but a subsequent corresponding attempted access of physical memory 1203 after MMU has translated the virtual memory 1204 page to a physical memory 1203 address, below-O/S security agent 1220 may be configured to intercept the attempted access to physical memory. In another embodiment, an attempted access may be made directly of physical memory 1203 without being translated through virtual memory 1204, and below-O/S security agent 1220 may be configured to intercept the attempted access. In still yet another embodiment, an attempted access made to virtual memory 1204 may be intercepted, but below-O/S security agent 1220 may not be configured to intercept a subsequent access of a physical memory 1203 address.

Below-O/S security agent 1220 may be communicatively coupled to in-O/S security agent 1219. Below-O/S security agent 1220 may be configured to receive contextual information about an attempted access of memory of electronic device 1201 from in-O/S security agent 1219. The contextual information provided by in-O/S security agent 1219 may include the identity of entities that have attempted a particular access of memory of electronic device 1201.

Below-O/S security agent 1220 may be communicatively coupled to or include a memory map 1206. Memory map 1206 may be implemented in a file, record, data structure, or other suitable entity. Memory map 1206 may include information regarding the location of various entities of electronic device 1201 in memory. For example, if a process is loaded in memory of electronic device 1201 for execution, memory map 1206 may include information regarding which memory pages in virtualized memory 1204 or address ranges in physical memory 1203 contain the process. Depending upon the implementation of virtualization of memory in electronic device 1201, all of the contents of the process may or may not be loaded in physical memory 1203, as some contents may be loaded in storage such as a disk. For such contents to be accessed, they may be loaded into physical memory 1203. In such a case, memory map 1206 may contain information about addresses where the contents are stored, whether in physical memory 1203 or in a storage such as a disk. Below-O/S security agent 1220 may be configured to use memory map 1206 to determine the identity or the owner of any given content in a virtual memory 1204 page or a physical memory 1203 address. Below-O/S security agent 1220 may build memory map 1206 by, for example, profiling the operation of the operating system 1213, and then determining where in memory various sensitive components are located. As attempts to access memory are made—such as loading the operating system 1213 kernel, or executing kernel mode instructions—below-O/S security agent 1220 may be configured to communicate with in-O/S security agent 1219 to determine what portion of operating system 1213 is loading or being executed. In another example, below-O/S security agent 1220 may be configured to determine a hash or digital signature of the contents of a memory range of such a virtual memory 1204 page. The hash or digital signature may be compared against known values, which may be contained in security rules 1208 or obtained from protection server 202. The known values may be the result of a previous characterization, in which portions of, for example, operating system 1213 have been identified. Elements to be mapped may be determined by security rules 1208. Below-O/S security agent 1220 may be configured to track the movement of elements in memory map 1206 as the elements are copied from one place to another in the memory of electronic device 1201.

Figure 13:
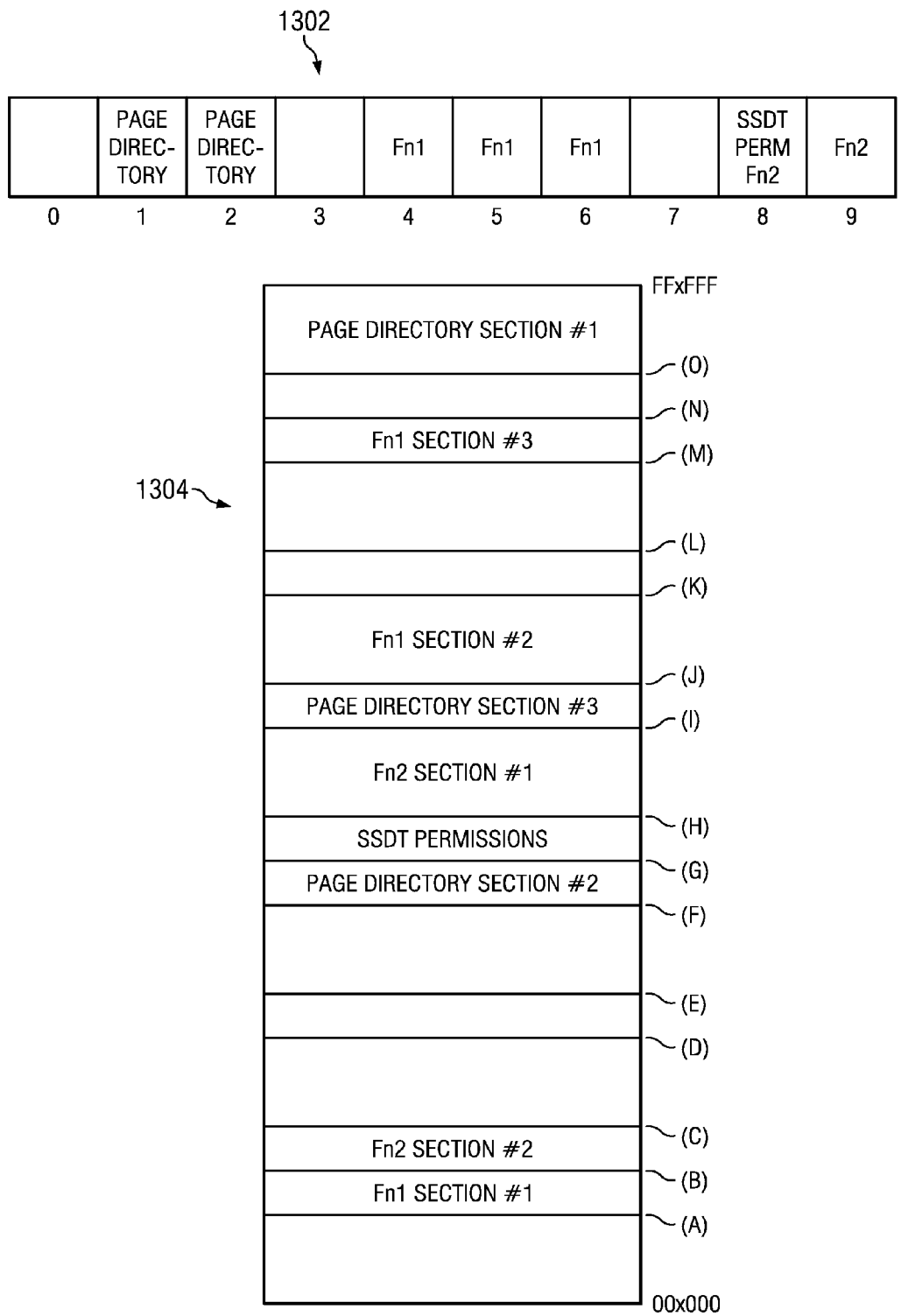
FIG. 13 is an illustration of example embodiments of memory maps.

FIG. 13 is an illustration of example embodiments of memory maps. In one embodiment, virtual memory map 1302 may include a mapping of elements to be tracked through their position in virtual memory. In another embodiment, physical memory map 1304 may include a mapping of elements to be tracked through their position in physical memory. In various embodiments, virtual memory map 1302 and physical memory map 1304 may be mapped together so that an element may be tracked in both mappings.

Virtual memory map 1302 may reflect ten different virtual memory pages. Virtual memory map 1302 may illustrate, for example, that a kernel operating system data structure such a page directory may be found in memory page 1 and memory page 2. In another example, the elements of a particular process, function, or routine called "Fn1," may be found in memory pages 4-6. In yet another example, data structures for permissions for a system service dispatch table ("SSDT") may be found in page 8. In still yet another example, elements of a particular process, function or routine called "Fn2" may be found in memory page 8 and memory page 9.

Physical memory map 1304 may reflect the location of elements with physical memory. Portions of elements in physical memory may be spread across the memory in non-contiguous segments or blocks. Furthermore, portions of elements in physical memory may be spread across the memory in arbitrary order. The size of each segment may vary in size. The segment may begin at an address at an offset from the base address. The example base address shown in FIG. 13 is 00x000, terminating at address FFxFFF. Addresses denoting the start of various segments of the physical memory are denoted (A)-(O). For elements that are contained within multiple segments of the physical memory, the order of the elements may be noted. In physical memory multiple segments of an element may be linked together by pointers where the end of one segment of an element may point to the next segment of the element.

For example, Fn1 may be mapped to the segments between (A) and (B), (J) and (K), and (M) and (N). In another example, SSDT permissions may be mapped to the segment between (G) and (H). In yet another example, the page directory data structure may be mapped to the segments between (O) and FFxFFF, (F) and (G), and (I) and (J). In still yet another example, Fn2 may be mapped to the segments between (H) and (I), and (B) and (C).

Returning to FIG. 12, below-O/S security agent 1220 may be configured to consult security rules 1208 to determine what portions of memory to protect, and how to protect them. For example, security rules 1208 may be configured to indicate that the page directory data structure may only be written to by certain privileged entities of electronic device 1201. Thus, attempts to write to the page directory data structure may be trapped, and elements attempting the write may be examined to determine whether they are safe, unknown, or known to be unsafe. Below-O/S security agent 1220 may be configured to consult memory map 1206 to determine where the page directory data structure is located in memory. If below-O/S security agent 1220 is implemented, for example, fully or in part in a virtual machine monitor, below-O/S security agent 1220 may be configured to set a flag in a control structure to trap any attempted write to memory pages 1 and/or 2 of virtual memory 1204. If below-O/S security agent 1220 is implemented, in another example, fully or in part in microcode, below-O/S security agent 1220 may be configured to set a flag in a control structure to trap any attempted write to memory addresses within the address ranges between addresses (O) and FFxFFF, (F) and (G), and (I) and (J) of physical memory 1203.

In another example, security rules 1208 may be configured to indicate that Fn1 may only be called by certain privileged entities of electronic device. Thus, attempts to execute Fn1 may be trapped, and elements calling Fn1 may be examined to determine whether they are safe, unknown, or known to be unsafe. Below-O/S security agent 1220 may be configured to consult memory map 1206 to determine where Fn1 resides in memory. If below-O/S security agent 1220 is implemented, for example, fully or in part in a virtual machine monitor, below-O/S security agent 1220 may be configured to set a flag in a control structure to trap an attempted execution of memory pages 4, 5, and/or 6 of virtual memory 1204. If below-O/S security agent 1220 is implemented, in another example, fully or in part in microcode, below-O/S security agent 1220 may be configured to set a flag in a control structure to trap any attempted execution of memory address (A) of physical memory 1203. In some cases, wherein different portions of Fn1 may be separately executed, below-O/S security agent 1220 may be configured to trap attempted execution of any memory address within the ranges between (A) and (B), (M) and (N), the addresses (O) and FFxFFF, (F) and (G), (J) and (K), or (I) and (J) of physical memory 1203.

In one embodiment, below-O/S security agent 1220 may be configured to consult in-O/S security agent 1219 to determine what entity has made the call to write to memory, which is then used to determine whether the entity is authorized or not to make the write. In another embodiment, below-O/S security agent 1220 may be configured to determine the memory page of virtualized memory 1204 from which the request came and consult memory map 1206 to determine whether such a memory page is associated with any elements mapped therein. In yet another embodiment, below-O/S security agent 1220 may be configured to determine a hash or signature of a memory page of the requesting element and compare it against hashes and signatures of known entities.

If below-O/S security agent 1220 is implemented fully or in part by microcode, below-O/S security agent 1220 may be configured to determine the address of the instruction which attempted the write. In one embodiment, below-O/S security agent 1220 may be configured to make such a determination by examining an instruction pointer to determine where in physical memory 1203 the instruction was made. In another embodiment, by accessing memory map 1206, below-O/S security agent 1220 may be configured to determine an element from the memory map 1206 associated with the address. In yet another embodiment, below-O/S security agent 1220 may be configured to determine a hash or signature of the requesting element and compare it against hashes and signatures of known entities.

Once an attempted access of memory has been trapped, below-O/S security agent 1220 may be configured to access security rules 1208 to determine how to handle the trapped attempt based on the identified requesting entity. Security rules 1208 may define that, for example, only certain specified kernel portions of operating system 1213 may call and execute Fn1 or that only entities that are known to be safe and on a whitelist may write to the permissions of the SSDT. Below-O/S security agent 1220 may then be configured to take any appropriate action, such as allowing the request to proceed, denying the request, spoofing a response or written value, or executing a corrective process.

In operation, below-O/S security agent 1220 may be running below the level of operating systems of electronic device 1201 such as operating system 1213. Below-O/S security agent 1220 may access security rules 1208 to determine what memory resources of electronic device 1201 to protect. Below-O/S security agent 1220 may determine, develop, and/or populate the contents of memory map 1206. To do so, below-O/S security agent 1220 may access security rules 1208, protection server 202, or any other suitable source of information for populating information in memory map 1206. Below-O/S security agent 1220 may intercept requests of physical memory 1203 or virtual memory 1204 from entities at the operating system level, such as operating system 1213, application 1210, or driver 1211, to map the ownership and contents of memory in memory map 1206. Below-O/S security agent 1220 may access in-O/S security agent 1219 to determine what entities are being loaded into memory so that memory map 1206 may be populated. Memory map 1206 may contain memory mapping for physical memory 1203, virtual memory 1204, and/or mappings between the two.

Below-O/S security agent 1220 may consult security rules 1208 to determine what portions of virtual memory 1204 and/or physical memory 1203 to protect. Security rules 1208 may specify that some portions of memory are to be secured on a dynamic basis, wherein protection for the memory may be enabled or disabled by below-O/S security agent 1220 depending upon a variety of considerations. Such considerations may include, for example, administrator settings, detection of malicious or suspicious behavior, time, previously detected accesses of memory, or any other suitable criteria. If protecting memory of electronic device 1201 is expensive in terms of computational resources, such dynamic enabling and disabling may allow below-O/S security agent 1220 to better secure critical portions of the memory of electronic device 1201 while lessening side affects on the ability of electronic device 1201 to carry out other tasks. For example, memory containing the contents of the kernel code of operating system 1213 may always be protected by below-O/S security agent 1220, while the memory containing the contents of the code of a third-party application 1210 may be protected only upon other indications that malware is present or may affect the third-party application 1210.

Below-O/S security agent 1220 may set a flag in a control structure to trap attempted access of physical memory 1203 and/or virtual memory 1204. In one embodiment, as a request is made from an entity in operating system 1213 for a memory page in virtual memory 1204 designated to be trapped, below-O/S security agent 1220 may intercept the attempted request. In another embodiment, as a request is made for a memory page in virtual memory 1204, below-O/S security agent may allow the request to be translated by MMU 1214 into a request for an address in physical memory 1203, whereupon below-O/S security agent may intercept the attempted request. In yet another embodiment, as a request from an entity in operating system 1213 may be made for an address in physical memory 1203 directly, below-O/S security agent 1220 may intercept the attempted request.

Once a request has been intercepted, below-O/S security agent 1220 may use any suitable mechanism to evaluate the intercepted request of memory. Security rules 1208 may be used to determine whether the attempt is suspicious, indicating a malicious attempt by malware to use the resources of electronic device 1201. Security rules 1208 may include considerations of, for example, whether a read, write, or execution was attempted; what entity made the attempt; the memory address or page that was accessed; previous attempts or actions by the same requestor; security settings by an administrator of electronic device 1201, such as rules that are more or less restrictive based upon the user of electronic device 1201; or the identity of the requestor, as determined by memory location and/or digital signature or hash, or upon related pages or memory addresses.

For example, an attempted write of the page directory data structure in page 2 of virtual memory 1204 or at address (J) of physical memory 1203 may be intercepted by below-O/S security agent 1220. If the write has come from a portion of memory of a process that is unknown, the write may be determined to be suspicious by below-O/S security agent 1220. However, if the attempted write has come from a known, verified part of the operating system 1213 kernel, then the attempt may be determined to not be suspicious. Likewise, an attempted execution of Fn2 at page 8 of virtual memory 1204 or at address (H) of physical memory 1203 may be intercepted. If the attempted execution was made from a user input, then the execution may be determined to not be suspicious. If the attempted execution was made from the memory of another program, and the program is not on an approved list, then the attempt may be determined to be malicious.

In another example, if Fn1 is a web browser that normally exposes its cache to other applications for purposes of interoperability, below-O/S security agent 1220 may allow a specified portion of the memory pages or memory addresses of Fn1 to be read by other applications. However, if Fn1 contains metadata or other information that should be kept private, then below-O/S security agent 1220 may secure those portions of the memory pages or memory addresses of Fn1 from being read from any process other than Fn1 itself.

Once a program has been determined to be suspicious, malicious, or otherwise indicative of malware, then below-O/S security agent 1220 may take any suitable corrective action. Below-O/S security agent 1220 may, for example, deny a write request to memory page 2 of virtual memory 1204 or address (J) of physical memory 1203, yet return a result indicating that the value was written. The process generating the request may be monitored for additional attempts to access the resources of electronic device 1201, may be stopped, or may be cleaned from electronic device 1201. In another example, the attempted execution of page 8 of virtual memory 1204 or address (H) of physical memory 1203 may instead be directed to the execution of a honeypot process or a cleanup process.

The contents of the memory which are secured by below-O/S security agent 1220 may include data, code, or any other useful system resources which may be attacked by malware. Below-O/S security agent 1220 may protect the contents of memory against malware attempting to, for example, read, write, or hook mechanisms showing the processes running on electronic device 1201, inject its code into portions of applications loaded in memory, or change permission and access flags of mapping tables for virtual memory 1204. By operating below the level of operating system 1213, below-O/S security agent 1220 may avoid malware running at the kernel mode level in operating system 1213. Below-O/S security agent 1220 may accomplish zero-day detection, as in some cases it may not need knowledge that the identity of a requesting entity has been previously determined to be malicious—the fact that the entity is unknown may be used to deny access to some parts of the memory of electronic device 1201. If the operating system 1213 or antivirus or antimalware measures running in the operating system 1213 are completely compromised, the memory may be completely locked from entities running at the level of the operating system.

One application of below-O/S security agent 1220 may be to detect an attempted access of the contents of virtual memory 1204 even before a read, write, or execute of the specific contents is attempted by detecting a change to the permissions of the particular memory page. The memory tables used by MMU 1214 may be resident in memory, in a page of virtual memory 1204 itself, and/or address of physical memory 1203. An attempt to change the values of the memory table, for example, to change the permissions of a code section of a process from "read" to "write," may itself be trapped by below-O/S security agent 1220. The memory page of virtual memory 1204 or the address of physical memory 1203 may be secured by below-O/S security agent 1220, and upon a trapped attempt to write a new value to the permissions in such a location, below-O/S security agent 1220 may determine whether the requestor of the attempt is allowed to make such changes. For example, if the request to change the permissions of a code section of a process arose from a different process, the attempted change in permissions may be denied.

Figure 14:
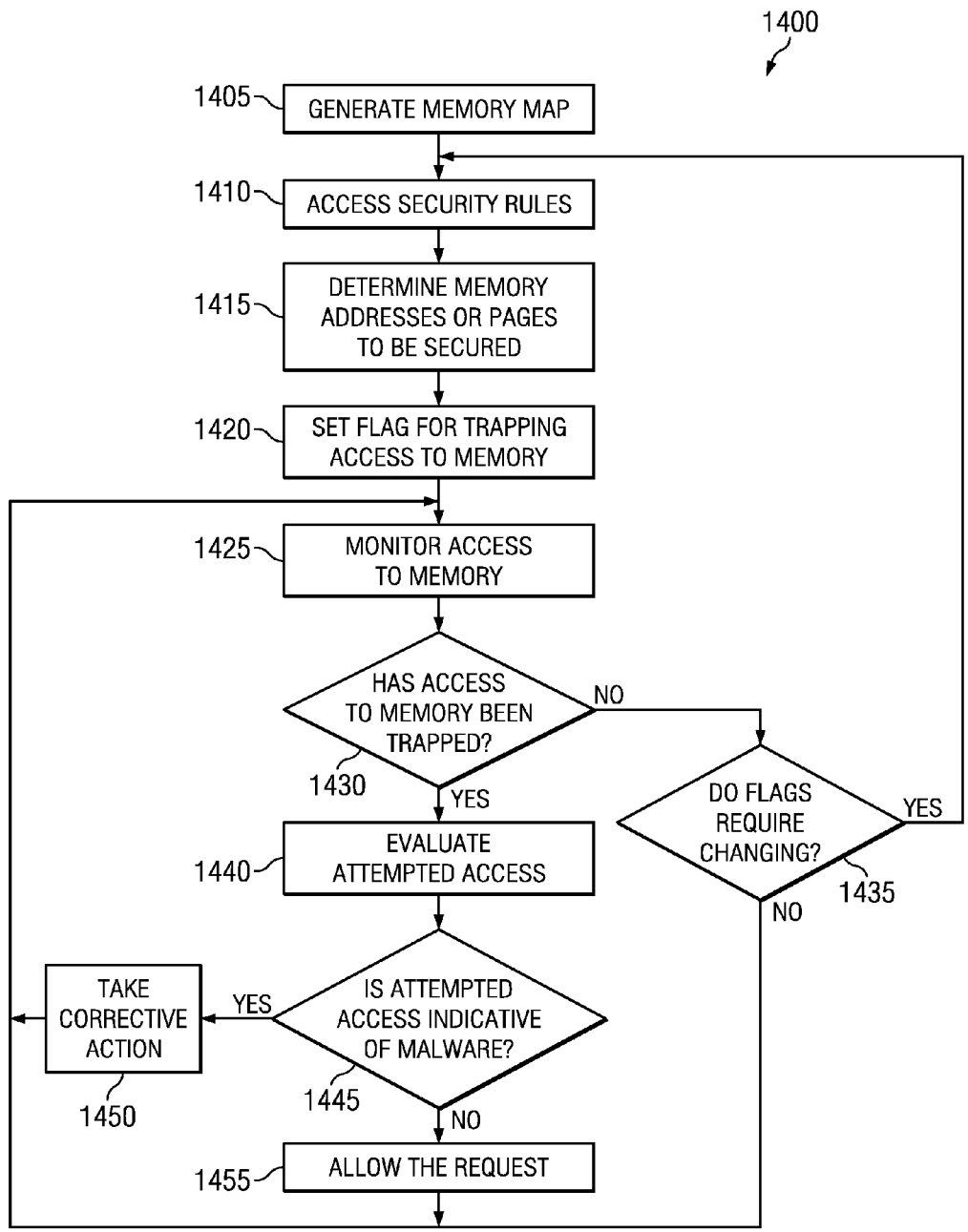
FIG. 14 is an example embodiment of a method for securing memory using below-operating system trapping of attempted access of an electronic device.

FIG. 14 is an example embodiment of a method 1400 for securing memory using below-operating system trapping of attempted access of an electronic device. In step 1405, the virtual or physical memory of the electronic device may be mapped to determine the identity or owner of the contents of memory. In order to map the memory, for example, a protection server may be accessed; reads, writes, and execution of memory may be tracked; and/or contents of memory scanned and signatures generated for the contents.

In step 1410, security rules may be accessed to determine in step 1415 addresses of physical memory or pages of virtual memory to be secured. The memory to be secured may depend, for example, upon the security rules, the user of the electronic device, other observed behavior in electronic device such as indications of malware, previous attempts to access secured memory, or administrator settings. The memory to be secured may change dynamically, as conditions of the operation of the electronic device may change. The security rules may specify entities of electronic device to be protected, and the location in physical or virtual memory of the entities may be determined by accessing the memory map.

In step 1420, flags may be set in a control structure to trap attempted access of memory according to the requirements of the security rules. Such flags may be set for pages of virtual memory and/or addresses of physical memory. Flags may contain an indication of the memory that is to be secured, as well as the kind of access method (for example—read, write, or execute) that is to be flagged. In step 1425, access to the secured memory may be monitored to see if an attempted access of the designated type has been made to a designated address or page. In step 1430, it may be determined whether an attempt to access the memory has been trapped. If not, then in step 1435 it may be determined whether flags of the memory to be secured require changing. If so, then the method 1400 may return to step 1410 to access security rules to update the flags for guarding access to memory. If not, then the method 1400 may return to step 1425 to monitor for attempted access of secured memory.

If an attempt to access the memory has been trapped, then beginning in step 1440 the trapped attempt may be evaluated. To evaluate the attempt, the memory map may be consulted to determine from where the request was made, and identify the requestor. The values of data to be written may be determined and evaluated for their contents. The nature of the attempt—read, write, or execute—may be considered. These example considerations may be used in conjunction with the security rules to determine whether or not the attempted access is indicative of malware in step 1445. If the attempted access is indicative of malware, then in step 1450, corrective action may be taken. Such corrective action may include denying the requested access, returning a spoofed value, or initiating a honeypot or corrective process. If the attempted access in not indicative of malware, then in step 1455 the request may be allowed. Method 1400 may return to step 1425 as required to continue securing the memory of the electronic device.

Figure 15:
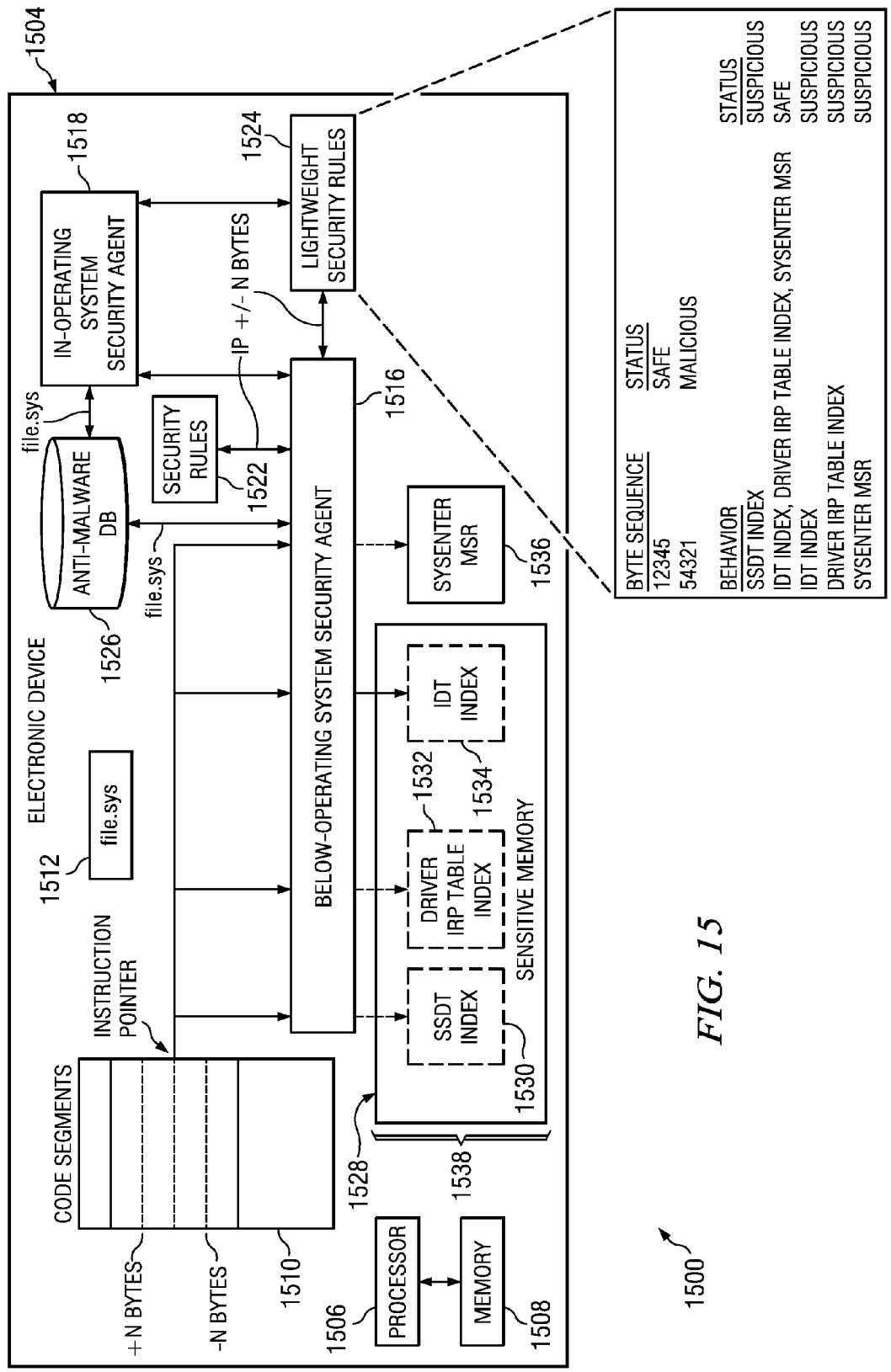
FIG. 15 is an example embodiment of a system for anti-malware light-weight rules for preventing false positive identification.

FIG. 15 is an example embodiment of a system 1500 for anti-malware light-weight rules for preventing false positive identification. System 1500 may detect malware and prevent such false positive identification on an electronic device 1504. System 1500 may include a below-O/S security agent 1516 configured to operate on electronic device 1504 to protect against attempts by malware to access sensitive system resources, such as memory, processor components, functions, data, kernel objects, kernel structures, operating system components, or drivers. Furthermore, below-O/S security agent 1516 may be configured to use one or more security rules 1522 to determine what attempted operations to trap and how to respond to such trapped operation. Below-O/S security agent 1516 may be configured to allow, deny, or take other corrective action for the trapped operation. System 1500 may include an in-O/S security agent 1518 configured to handle trapped operations. Below-O/S security agent 1516 may be configured to offload some analysis to in-O/S security agent 1518. Below-O/S security agent 1516, although illustrated as a single module, may be implemented in multiple modules. Some of such modules may be operating in user mode, kernel mode, or both.

As shown in FIG. 15, electronic device 1504 may include a processor 1506 coupled to a memory 1508, one or more code segments 1510, below-O/S security agent 1516, in-O/S security agent 1518, security rules 1522, light-weight security rules 1524, one or more files 1512, anti-malware database 1526, and sensitive system resources 1538.

Electronic device 1504 may be implemented wholly or in part by or configured to implement the functionality of electronic device 103 of FIG. 1, electronic device 204 of FIG. 2, electronic device 404 of FIG. 4, electronic device 701 of FIG. 7, electronic device 901 of FIG. 9, electronic device of FIG. 1201, and/or any combination thereof. Processor 1506 may be implemented wholly or in part by or configured to implement the functionality of processor 208 of FIG. 2, processor 408 of FIG. 4, processor 702 of FIG. 7, processor 902 of FIG. 9, processor 1202 of FIG. 12, and/or any combination thereof. Memory 1508 may be implemented wholly or in part by or configured to implement the functionality of memory 206 of FIG. 2, memory 406 of FIG. 4, memory 703 of FIG. 7, memory 903 of FIG. 9, physical memory 1203 or virtualized memory of FIG. 12, and/or any combination thereof. Below-O/S security agent 1516 may be implemented wholly or in part by or configured to implement the functionality of below-O/S trapping agent 104 of FIG. 1, SVMM security agent 217 or SVMM 216 of FIG. 2, firmware security agents 440, 442, PC firmware security agent 444, or below-O/S system agent 450 of FIG. 4, firmware security agent 516 of FIG. 5, microcode security agent 708 of FIG. 7, below-O/S trapping agent 920 of FIG. 9, below-O/S security agent 1220 of FIG. 12, and/or any combination thereof. In-O/S security agent 1518 may be implemented wholly or in part by or configured to implement the functionality of in-O/S security agent 218 of FIG. 1, in-O/S security agent 418 of FIG. 4, and/or in-O/S security agent 719 of FIG. 7, in-O/S security agent 919 of FIG. 9, in-O/S security agent 1219 of FIG. 12, or any suitable combination thereof. Security rules 1522 may be implemented by or configured to implement the functionality of security rules 114 of FIG. 1, security rules 222 of FIG. 2, security rules 434, 436, 438 of FIG. 4, security rules 518 of FIG. 5, or security rules 707, 723 of FIG. 7, security rules 908 of FIG. 9, security rules 1208 of FIG. 12, and/or any combination thereof. Security rules 1522 may be established in any suitable manner (e.g., policies set by a user of electronic device 1504, policies set by an administrator of an enterprise including electronic device 1504, policies set by a creator of below-O/S security agent 1516, etc.). In some embodiments, below-O/S security agent 1516 or in-O/S security agent 1518 may request and/or receive updates or modifications to security rules 1522 from a protection server.

Anti-malware database 1526 may contain signatures, hashes, or other computed indications of malware. Anti-malware database 1526 may be configured to be accessible by security agents so that, given a signature or hash of a file under evaluation for malware, anti-malware database 1526 may provide an indication of whether or not the file is known to be malicious. Anti-malware database 1526 may be implemented in any suitable database, table, or similar data structure, and may reside on electronic device 1504 or another suitable entity accessible by security agents monitoring electronic device 1504. Anti-malware database 1526 and security rules 1522 may be implemented in similar or the same structures. Operation of security agents to access anti-malware database 1526 and security rules 1522 may be operationally intensive. Such intensive requirements may be prohibitive for evaluation of some trapping operations by below-O/S security agent 1516.

Light-weight security rules 1524 may include a set of rules, policies, code segments, and other indications that are more efficiently applied than security rules 1522 or anti-malware database 1526. Light-weight security rules 1524 may be configured to be accessible by below-O/S security agent 1516 and in-O/S security agent 1518. Light-weight security rules 1524 may be implemented by a table or other suitable data structure.

System 1500 may be configured to intercept and evaluate attempted access of sensitive system resources 1538. For example purposes, several such possible sensitive system resources are shown in FIG. 15, such as portions of kernel or sensitive memory 1528, including the image of a System Service Dispatch Table ("SSDT") index 1530 as it resides in memory, the image of a driver Interrupt Process ("IRP") table 1532 as it resides in memory, the image of an interrupt descriptor table ("IDT") index 1534 as it resides in memory, or a SYSENTER model-specific register ("MSR"). Access of any such sensitive system resource 1538 may be considered suspicious, intercepted by below-O/S security agent 1516, and evaluated to determine if the access indicates malware.

Attempted access of sensitive system resources 1538 may be attempted by various processes running on electronic device 1504. Evaluation of the malicious nature of an attempt to access sensitive system resources 1538 may include analysis by below-O/S security agent 1516 or in-O/S security agent 1518 about the attempted access and/or the identity of the entity attempting the access. Using a signature or hash of the entity attempting the access, below-O/S security agent 1516 or in-O/S security agent 1518 may attempt to identify whether security rules 1522 or anti-malware database 1526 identify the hash or signature as malicious. Such analysis may require that the entity making the attempt is known. For example, given an attempted access of sensitive system resources 1538, such analysis using a hash or signature may require that below-O/S security agent 1516 or in-O/S security agent 1518 determine that the attempt was made by a process that was spawned by a file on disk or loaded into memory, such as file.sys 1512. The signature or hash used to access security rules 1522 or anti-malware database 1526 may be made from such a file. The determination of the responsible file may not be possible. Furthermore, such determination, calculation of hash or signature, and subsequent lookup may be resource intensive.

Below-O/S security agent 1516 and in-O/S security agent 1518 may be configured to determine the value of an instruction pointer associated with the attempted access of sensitive system resources 1538. The instruction pointer may indicate an address in code to be presently executed on electronic device 1504. Such code may include code segment 1510. Code segment 1510 may include one or more contiguous subsections of code of processes that are loaded into memory of electronic device 1504. A given process or module may include a plurality of contiguous subsections of code spread across various locations loaded within memory, wherein each such subsection may not be immediately adjacent to other subsections of the same process. Below-O/S security agent 1516 or in-O/S security agent 1518 may be unable to determine, for a given process, all such code subsections. Thus, below-O/S security agent 1516 or in-O/S security agent 1518 may be unable to determine the owning process or module process responsible for the attempted access of sensitive system resources 1538. Furthermore, below-O/S security agent 1516 or in-O/S security agent 1518 may be unable to determine the original source of the process, such as file.sys 1512. Thus, below-O/S security agent 1516 or in-O/S security agent 1518 may be able to determine code segment 1510 but unable to determine the responsible process or file so that a hash or digital signature may be calculated to use in security rules 1522 or anti-malware database 1526. In some cases, such determinations may be resource-intensive and thus avoided if possible.

In one embodiment, below-O/S security agent 1516 or in-O/S security agent 1518 may be configured to determine a byte string corresponding to a range including the instruction pointer address that caused an attempted access of sensitive system resources 1538. In a further embodiment, such a byte string may include at least certain number of bytes, 2*N. In another further embodiment, such a byte string may include the byes surrounding the instruction pointer which caused the attempt, plus or minus N bytes. Such a byte string may represent contiguous code bytes within the same process that made the attempt. In another embodiment, below-O/S security agent 1516 or in-O/S security agent 1518 may be configured to compare the byte string against known safe or known malicious byte strings without attempting to determine a signature or hash of the byte string, the larger process, or the responsible source file.

In yet another embodiment, below-O/S security agent 1516 or in-O/S security agent 1518 may access lightweight security rules 1524 to make a determination of whether the determined byte code is malicious, safe, or unknown. Lightweight security rules 1524 may contain byte sequences representing unsafe operations performed by malware. Below-O/S security agent 1516 or in-O/S security agent 1518 may be configured to access lightweight security rules 1524 and compare the byte code against the known byte sequences. If the byte code matches a byte sequence within lightweight security rules 1524 known to be malicious, below-O/S security agent 1516 or in-O/S security agent 1518 may block the attempted access. If the byte code matches a byte sequence within lightweight security rules 1524 known to be safe, below-O/S security agent 1516 or in-O/S security agent 1518 may allow the attempted access. In one embodiment, if the byte code matches no sequences within lightweight security rules 1524, the byte code status may include an unknown malware status according to lightweight security rules 1524. Below-O/S security agent 1516 or in-O/S security agent 1518 may be configured to access anti-malware database 1526 or security rules 1522 for more detailed or intensive analysis or may perform default actions. In such an embodiment, below-O/S security agent 1516 or in-O/S security agent 1518 may determine the file or process responsible for the attempt in order to conduct such further analysis. In another embodiment, if the byte code matches no sequences within lightweight security rules 1524 and the file or process responsible for the attempt cannot be determined, below-O/S security agent 1516 or in-O/S security agent might be configured to take no action with regards to the attempt. The suspicious attempt with an unknown malware status may be denied by default. Denying the suspicious attempt may yield false positive malware identification and block legitimate actions. The suspicious attempt with an unknown malware status may be allowed by default. Allowing the suspicious attempt may yield false negative malware identification and allow malicious actions Furthermore, such attempts to access sensitive system resources 1538 may be considered suspicious such that the attempted access may be trapped by below-O/S security agent 1516 and subsequently further analyzed by below-O/S security agent 1516 or in-O/S security agent 1518 to determine whether the attempt is indicative of malware. Such analysis may be conducted, for example, if use of lightweight security rules 1524 has not resulted in a definitive determination of malware status. Suspicious attempts may include attempts to access the elements, among others, illustrated in sensitive system resources 1538 as illustrated in FIG. 15. In addition, such an attempt may be allowed or denied based upon such determinations or analysis. The additional analysis may indicate that the attempt is known to be malicious, wherein the attempt may be denied or other corrective action taken. Furthermore, the additional analysis may indicate that the attempt is known to be safe, wherein the attempt may be allowed. In addition, the additional analysis may not sufficiently indicate that the attempt is known to be malicious, but may not sufficiently indicate that the attempt is known to be safe. In such a case, the suspicious attempt may be handled according to default rules. In one embodiment, the suspicious attempt with an unknown malware status may be denied by default. In such an embodiment, denying the suspicious attempt may yield false positive malware identification and block legitimate actions. In another embodiment, the suspicious attempt with an unknown malware status may be allowed by default. In such an embodiment, allowing the suspicious attempt may yield false negative malware identification and allow malicious actions. As described above, the analysis may be resource intensive for each such attempted access.

For example, attempts to access sensitive system resources 1538 reserved for the operating system may be malicious for the vast majority of non-operating system entities making such attempts. However, a relatively small number of entities, such as virtualization environments or hypervisors, may make such attempts. Such entities may be innocuous and not associated with malware.

In one embodiment, lightweight rules 1524 may include negative rules, wherein a sequence of individual attempts to access sensitive system resources 1538 may indicate that the entity making the attempts is safe or not associated with malware, and wherein such individual attempts may be individually considered suspicious or malicious. Thus, the negative rules may constitute a behavioral profile of a trusted entity or process, wherein the detected behavior would otherwise be considered suspicious or malicious. The rules may be considered "negative" because they allow behavior that is opposite to expected results, given that the negative rules define safe behavior and include requirements of suspicious or otherwise malicious attempts. For example, negative rules may include a sequence of suspicious act A, followed by suspicious act B, and followed by suspicious act C.

In a further embodiment, upon detecting a sequence of events defined within the negative rules, below-O/S security agent 1516 or in-O/S security agent 1518 may be configured to treat as safe the responsible code segment, owner of the code segment, or subsequent code to the code segment from the same owner. Thus, subsequent access of sensitive system resources 1538 from the same code may be allowed by below-O/S security agent 1516 or in-O/S security agent 1518. Furthermore, below-O/S security agent 1516 may be configured to stop intercepting attempts from the same code. For example, given suspicious act A, followed by suspicious act B, and followed by suspicious act C, all by code segment X, below-O/S security agent 1516 or in-O/S security agent 1518 may be configured to allow all future acts from code segment X. In another further embodiment, below-O/S security agent 1516 or in-O/S security agent 1518 may be configured to wait to define an attempt as safe or malicious until all negative rules are determined to be inapplicable. For example, given suspicious act A followed by suspicious act B, below-O/S security agent 1516 or in-O/S security agent 1518 may be configured to wait to determine whether suspicious act C is trapped before taking action with regards to suspicious act A or suspicious act B. In yet another further embodiment, below-O/S security agent 1516 or in-O/S security agent 1518 may be configured to take default actions on interim acts until a negative rule is determined to be applicable. For example, given suspicious act A followed by suspicious act B that are each unknown as to definitive malware status, below-O/S security agent 1516 or in-O/S security agent 1518 may be configured to take default action with regards to suspicious act A and suspicious act B until determination of the occurrence of suspicious act C, wherein it may be determined that the actions match a negative rule and are safe. Previously blocked actions may be undone and subsequent suspicious acts from the same entity may be allowed without determinations as to the malware status of the suspicious acts.

In one embodiment, negative rule sequences may include innocuous operations in between suspicious events. In another embodiment, negative rule sequences may include an operation limit, in which all matching suspicious acts of the sequence must occur within a threshold number of operations.

In operation, below-O/S security agent 1516 may trap upon attempted accesses to sensitive system resources 1538 in accordance with any trapping technique set forth in this disclosure. In some embodiments, below-O/S security agent 1516 may trap upon events in accordance with security rules 1522. In response to trapping an attempted access to sensitive system resources 1538, below-O/S security agent 1516 or in-O/S security agent 1518 may determine the instruction pointer of the code segment 1510 making the attempt.

Based on the instruction pointer, below-O/S security agent 1516 or in-O/S security agent 1518 may determine a byte sequence from code segment 1510. In one embodiment, below-O/S security agent 1516 or in-O/S security agent 1518 may determine a byte sequence of the instruction pointer plus or minus a number N bytes.

Below-O/S security agent 1516 or in-O/S security agent 1518 may compare the byte sequence against known byte sequences of lightweight security rules 1524. The byte sequence may be larger than the known byte sequences within lightweight security rules 1524. If the byte sequence is known to be safe, then the attempted access may be allowed. If the byte sequence is known to be unsafe, then the attempted access may be denied. In one embodiment, if the byte sequence is neither known to be safe or unsafe, then further analysis on the entity owning the byte sequence, such as file.sys 1512, may be conducted. Such further analysis may include below-O/S security agent 1516 or in-O/S security agent 1518 determining a signature, hash, or behavior of the entity, such as file.sys 1512, and evaluating it in view of anti-malware database 1526 or security rules 1522.

For example, if the determined byte sequence is "9123456" then lightweight security rules 1524 may match the byte sequence against a known byte sequence of "12345" which is known to be safe. Below-O/S security agent 1516 or in-O/S security agent 1518 may allow the attempt. Furthermore, below-O/S security agent 1516 or in-O/S security agent 1518 may allow owner of such a byte sequence to operate without further interruption. In another example, if the determined byte sequence is "95432122" then lightweight security rules 1524 may match the byte sequence against a known byte sequence of "54321" which is known to be malicious. Below-O/S security agent 1516 or in-O/S security agent 1518 may deny the attempt. Further, below-O/S security agent 1516 or in-O/S security agent 1518 may take corrective action against the owner of the byte sequence. In yet another example, if the determined sequence is "3333333" then lightweight security rules 1524 may match the byte sequence against no known byte sequences. Below-O/S security agent 1516 or in-O/S security agent 1518 may take default action, such as allowing or denying the byte sequence, wait for further operations and subsequent analysis, or access anti-malware database 1526 or security rules 1522 to conduct further or additional analysis.

Given a plurality of attempted accesses on sensitive system resources 1538, below-O/S security agent 1516 or in-O/S security agent 1518 may determine whether such a plurality matches any negative rules or behavior noted within lightweight security rules 1524. For example, lightweight security rules 1524 may include rules that an individual attempt to access SSDT index 1530, an individual attempt to access driver IRP table index 1532, an individual attempt to access IDT index 1534, or an individual attempt to access SYSENTER MSR 1536 are suspicious or malicious. Such individual attempts, when considered by themselves, may be suspicious by way of making an attempted access on sensitive system resources 1538 that may indicate malware. However, such individual attempts may not be definitively determined to be malicious. Below-O/S security agent 1516 or in-O/S security agent 1518 may take default action, such as allowing by default or denying by default, such suspicious attempts with an unknown malware status. In one embodiment, lightweight security rules 1524 may include negative rules that the combination of the individual attempts to access IDT index 1534, driver IRP table index 1532, and SYSENTER MSR 1536 is safe and represents the behavior of a trusted process, if such attempts are made from the same code segment 1510 or entity such as file.sys 1512. In a further embodiment, a subsequent attempt to, for example, access SSDT index 1530 by the same code segment 1510 or entity such as file.sys 1512 will be determined by below-O/S security agent 1516 or in-O/S security agent 1518 to be safe. In another further embodiment, lightweight rules 1524 may include negative rules that the sequence of events of individual attempts to access IDT index 1534, driver IRP table index 1532, and SYSENTER MSR 1536 must be conducted in such a sequence in order to match the rule.

Given such a sequence of attempted accesses of sensitive system resources 1538 that matches a negative rule of lightweight security rules 1524, below-O/S security agent 1516 or in-O/S security agent 1518 may allow the attempted access. Below-O/S security agent 1516 or in-O/S security agent 1518 may further analyze attempts not matching such rules with anti-malware database 1526 or security rules 1522. Any suitable corrective action may be taken for attempted accesses determined to be associated with malware, whether using lightweight security rules 1524 or anti-malware database 1526 or security rules 1522.

Figure 16:
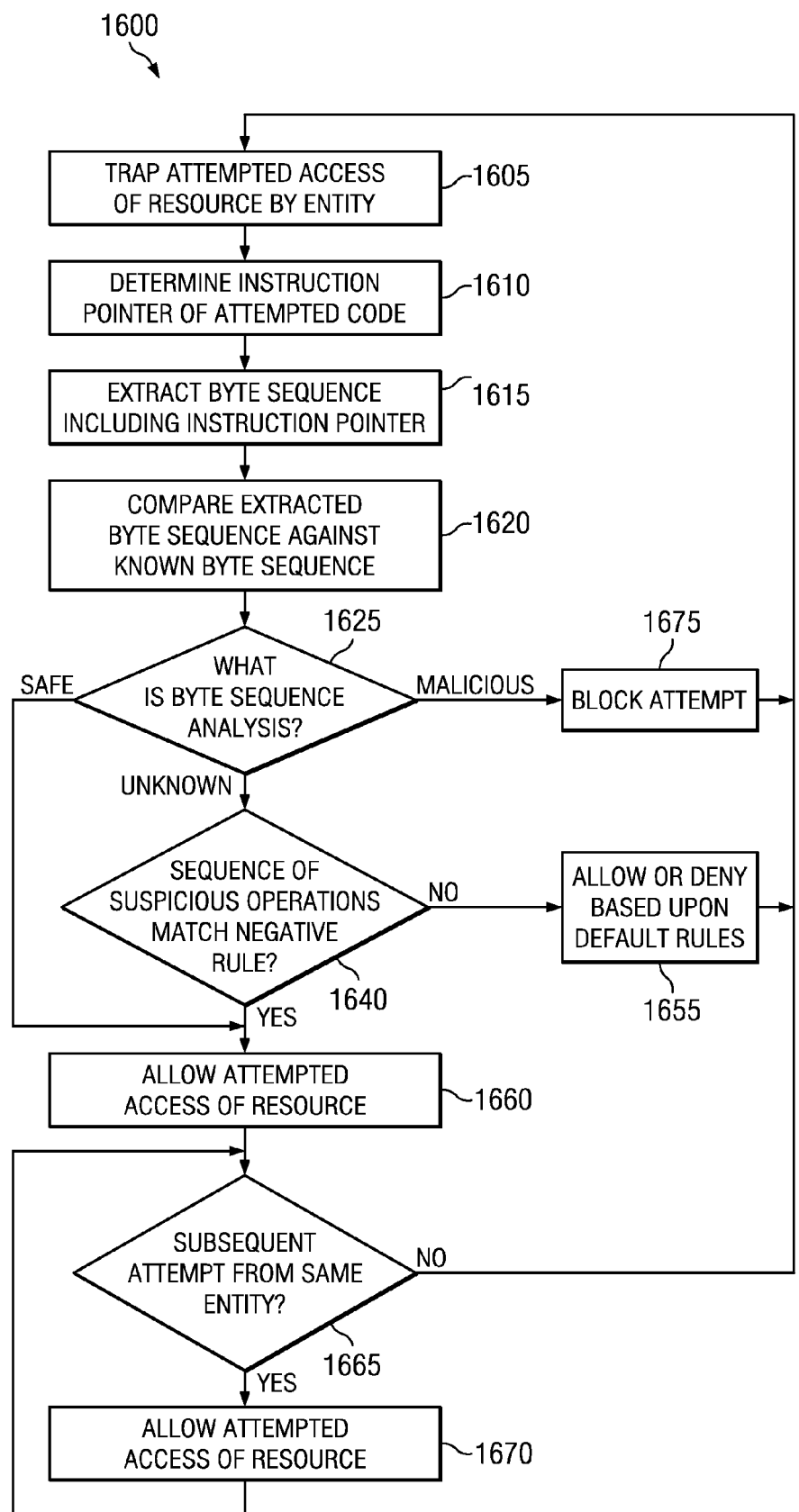
FIG. 16 is an example embodiment of a method for anti-malware light-weight rules for preventing false positive identification.

FIG. 16 is an example embodiment of a method 1600 for using anti-malware light-weight rules for preventing false positive identification.

In step 1605, a below-O/S security agent monitoring access of sensitive system resources of an electronic device may trap accesses to the sensitive system resources. In step 1610, a security agent monitoring the electronic device may determine the instruction pointer address from which the access was made. In step 1615, the security agent may determine a byte sequence from the code segment including the instruction pointer address. The byte sequence may include contiguous instructions from the same source or entity that made the attempt. In one embodiment, the byte sequence may be centered or nearly centered around the instruction pointer.

In step 1620, the security agent may compare the byte sequence against known byte sequences in lightweight rules. In one embodiment, other mechanisms for malware identification, such as digital signatures, hashes, or other identifying information may be used to determine malware status of the entity. In step 1625, the results may be determined. If the byte sequence appears in any known code sequences for malicious code or if the entity is otherwise known to be associated with malware, then method 1600 may proceed to step 1675. If the byte sequence appears in any known code sequences for safe code or if the entity is otherwise known to be safe, then method 1600 may proceed to step 1660. If the byte sequence has a malware status that is not definitively determined to be either safe or malicious, or if the entity owning the byte sequence is not definitively determined to be either safe or malicious, then method 1600 may proceed to step 1640.

In step 1640, the security agent may determine whether the attempted access, in combination with other determined attempts, forms a sequence of suspicious attempts that match a negative rule. A negative rule may define that a sequence of suspicious attempts are in fact safe. If the sequence matches such a rule determining that a sequence of otherwise suspicious operations is safe, then method 1600 may proceed to step 1660. If the sequence does not match such a rule, then in step 1655, the security agent may allow or deny the attempt based on default rules or other suitable criteria. The attempt may be recorded for use in another iteration of step 1640. The method 1600 may repeat at step 1605.

In step 1660, the security agent may allow the attempted access. In step 1665, it may be determined whether a subsequent attempt to access sensitive system resources has been made by the same entity which made the attempt allowed in step 1660. If so, then in step 1670 the subsequent attempt may be allowed and method 1600 may repeat step 1660. If not, then method 1600 may repeat at step 1605.

in step 1675, the security agent may block the attempted access. Method 1600 may repeat at step 1605.

Although FIGS. 3, 6, 8, 11, 14, and 16 disclose a particular number of steps to be taken with respect to example methods 300, 600, 800, 1100, 1400, and 1600, methods 300, 600, 800, 1100, 1400, and 1600 may be executed with more or fewer steps than those depicted in FIGS. 3, 6, 8, 11, 14, and 16. In addition, although FIGS. 3, 6, 8, 11, 14, and 16 disclose a certain order of steps to be taken with respect to methods 300, 600, 800, 1100, 1400, and 1600, the steps comprising these methods may be completed in any suitable order. Furthermore, some or all steps of methods 300, 600, 800, 1100, 1400, and 1600 may be combined with steps from other methods of methods 300, 600, 800, 1100, 1400, and 1600.

Methods 300, 600, 800, 1100, 1400, and 1600 may be implemented using the systems of FIGS. 1-2, 4-5, 7, 9, 12, 13, and 15-18. In certain embodiments, methods 300, 600, 800, 1100, 1400, and 1600 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as non-transitory communications media; and/or any combination of the foregoing.

One or more of systems 100, 200, 400, 500, 700, 900, 1200, 1300, and 1500 may be combined with other portions of systems 100, 200, 400, 500, 700, 900, 1200, 1300, and 1500.

Although the present disclosure has been described in detail, it should be understood that various changes, substitutions, and alterations can be made hereto without departing from the spirit and the scope of the disclosure as defined by the appended claims.

What is claimed is:

1. A method for securing an electronic device, comprising:
   trapping, at a level below all of the operating systems of an electronic device, a first attempt to access sensitive system resources of the electronic device;
   identifying the first attempt as malicious;
   trapping, at a level below all of the operating systems of an electronic device, a second attempt to access sensitive system resources of the electronic device, the second attempt trapped after the first attempt, the first attempt and second attempt originating from code of the same operating entity;
   identifying the second attempt as malicious;
   comparing the sequence of the first attempt and second attempt against a first anti-malware rule, the first anti-malware rule including a requirement of a sequence of attempts including the first attempt followed by the second attempt; and
   based on the comparison of the sequence of the first attempt and second attempt against the first anti-malware rule, allowing the second attempt.

2. The method according to claim 1, further comprising:
   trapping, at a level below all of the operating systems of an electronic device, a third attempt to access sensitive system resources of the electronic device, the third attempt trapped after the second attempt, the third attempt and second attempt originating from code of the same operating entity;
   based on the comparison of the sequence of the first attempt and second attempt against the first anti-malware rule, allowing the third attempt.

3. The method according to claim 1, further comprising:
   trapping, at a level below all of the operating systems of an electronic device, a third attempt and a fourth attempt to access sensitive system resources of the electronic device, the third and fourth attempt originating from code of the same operating entity;
   identifying the third attempt and fourth attempt as potential malware attacks on the electronic device;
   determining that a malware status of the fourth attempt is unknown;
   comparing the sequence of the third attempt and fourth attempt against a second anti-malware rule, the anti-malware rule including a requirement of a sequence of attempts including the third attempt followed by the fourth attempt followed by a fifth attempt, the fifth attempt identified as accessing a designated portion of the sensitive system resources of the electronic device;
   determining that the fifth attempt has not occurred; and
   based upon the determination that the fifth attempt has not occurred and upon the determination that the malware status of the fourth attempt is unknown and upon the second anti-malware rule, taking a default action upon the fourth attempt.

4. The method according to claim 1, further comprising determining that the first attempt and the second attempt are not known to be safe.

5. The method according to claim 1, wherein the sequence of attempts included within the first anti-malware rule is an ordered sequence of attempts.

6. The method according to claim 1, further comprising, based on the comparison of the sequence of the first attempt and second attempt against the first anti-malware rule, determining that a source of the first attempt and the second attempt is not malicious.

7. A system for securing an electronic device, comprising:
   a memory;
   a processor;
   a plurality of sensitive system resources; and
   one or more security agents including instructions resident in the memory and operable for execution by the processor, wherein:
   one of the security agents is configured to:
      trap, at a level below all of the operating systems of the electronic device, a first attempt to access one of the sensitive system resources; and trap, at a level below all of the operating systems of the electronic device, a second attempt to access one of the sensitive system resources, the second attempt trapped after the first attempt, the first attempt and second attempt originating from code of the same operating entity; and one of the security agents is configured to:

identify the first attempt as malicious;

identify the second attempt as malicious;

compare the sequence of the first attempt and second attempt against a first anti-malware rule, the first anti-malware rule including a requirement of a sequence of attempts including the first attempt followed by the second attempt; and based on the comparison of the sequence of the first attempt and second attempt against the first anti-malware rule, allow the second attempt.

8. The system according to claim 7, wherein:

one of the security agents is further configured to trap, at a level below all of the operating systems of the electronic device, a third attempt to access one of the sensitive system resources, the third attempt trapped after the second attempt, the third attempt and second attempt originating from code of the same operating entity; and one of the security agents is configured to, based on the comparison of the sequence of the first attempt and second attempt against the first anti-malware rule, allow the third attempt.

9. The system according to claim 7, wherein:

one of the security agents is further configured to:

trap, at a level below all of the operating systems of the electronic device, a third attempt and a fourth attempt to the access sensitive system resources, the third attempt and fourth attempt originating from code of the same operating entity; and one of the security agents is further configured to:

identify the third attempt and fourth attempt as representing a potential malware attack on the electronic device;

determine that a malware status of the fourth attempt is unknown;

compare the sequence of the third attempt and fourth attempt against a second anti-malware rule, the anti-malware rule including a requirement of a sequence of attempts including the third attempt followed by the fourth attempt followed by a fifth attempt, the fifth attempt identified as accessing a designated portion of the sensitive system resources of the electronic device;

determine that the fifth attempt has not occurred; and based upon the determination that the fifth attempt has not occurred and upon the determination that the malware status of the fourth attempt is unknown and upon the second anti-malware rule, take a default action upon the fourth attempt.

10. The system according to claim 7, wherein one of the security agents is configured to determine that the first attempt and the second attempt are not known to be safe.

11. The system according to claim 7, wherein the sequence of attempts included within the first anti-malware rule is an ordered sequence of attempts.

12. At least one non-transitory computer readable medium, comprising computer-executable instructions, the instructions readable by a processor, the instructions, when executed, for causing the processor to:

trap, at a level below all of the operating systems of an electronic device, a first attempt to access one of a plurality of sensitive system resources of the electronic device; and trap, at a level below all of the operating systems of the electronic device, a second attempt to access one of the sensitive system resources, the second attempt trapped after the first attempt, the first attempt and second attempt originating from code of the same operating entity; and identify the first attempt as malicious;

identify the second attempt as malicious;

compare the sequence of the first attempt and second attempt against a first anti-malware rule, the first anti-malware rule including a requirement of a sequence of attempts including the first attempt followed by the second attempt; and based on the comparison of the sequence of the first attempt and second attempt against the first anti-malware rule, allow the second attempt.

13. The medium according to claim 12, wherein the processor is further caused to:

trap, at a level below all of the operating systems of the electronic device, a third attempt to access one of the sensitive system resources, the third attempt trapped after the second attempt, the third attempt and second attempt originating from code of the same operating entity; and based on the comparison of the sequence of the first attempt and second attempt against the first anti-malware rule, allow the third attempt.

14. The medium according to claim 12, wherein the processor is further caused to:

trap, at a level below all of the operating systems of the electronic device, a third attempt and a fourth attempt to the access sensitive system resources, the third attempt and fourth attempt originating from code of the same operating entity; and identify the third attempt and fourth attempt as representing a potential malware attack on the electronic device;

determine that a malware status of the fourth attempt is unknown;

compare the sequence of the third attempt and fourth attempt against a second anti-malware rule, the anti-malware rule including a requirement of a sequence of attempts including the third attempt followed by the fourth attempt followed by a fifth attempt, the fifth attempt identified as accessing a designated portion of the sensitive system resources of the electronic device;

determine that the fifth attempt has not occurred; and based upon the determination that the fifth attempt has not occurred and upon the determination that the malware status of the fourth attempt is unknown and upon the second anti-malware rule, take a default action upon the fourth attempt.

15. The medium according to claim 12, wherein the processor is further caused to determine that the first attempt and the second attempt are not known to be safe.

16. The medium according to claim 12, wherein the sequence of attempts included within the first anti-malware rule is an ordered sequence of attempts.

* * * * *